United States Patent
Pankratov et al.

(10) Patent No.: US 12,299,633 B2
(45) Date of Patent: *May 13, 2025

(54) STORAGE AND RETRIEVAL SYSTEM

(71) Applicant: Symbotic LLC, Wilmington, MA (US)

(72) Inventors: Kirill K. Pankratov, Acton, MA (US);
Juergen D. Conrad, York, PA (US);
Robert Hsiung, Cambridge, MA (US);
Larry M. Sweet, Atlanta, GA (US)

(73) Assignee: Symbotic LLC, Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,282

(22) Filed: Feb. 6, 2024

(65) Prior Publication Data
US 2024/0177111 A1 May 30, 2024

Related U.S. Application Data

(63) Continuation of application No. 18/158,882, filed on Jan. 24, 2023, now Pat. No. 11,893,533, which is a continuation of application No. 16/950,383, filed on Nov. 17, 2020, now Pat. No. 11,562,321, which is a continuation of application No. 16/718,918, filed on
(Continued)

(51) Int. Cl.
*G06Q 10/087* (2023.01)
*B65G 1/04* (2006.01)
*B65G 1/06* (2006.01)

(52) U.S. Cl.
CPC ............. *G06Q 10/087* (2013.01); *B65G 1/04* (2013.01); *B65G 1/0492* (2013.01); *B65G 1/06* (2013.01)

(58) Field of Classification Search
CPC ...... G06Q 10/087; B65G 1/04; B65G 1/0492; B65G 1/06
See application file for complete search history.

(56) References Cited

U.S. PATENT DOCUMENTS

| 583,341 A | 5/1897 | Stevenson |
|---|---|---|
| 2,945,604 A | 7/1960 | Kroll et al. |
| (Continued) | | |

FOREIGN PATENT DOCUMENTS

| AT | 506221 | 7/2009 |
|---|---|---|
| CA | 1252430 | 4/1989 |
| (Continued) | | |

*Primary Examiner* — Kyle O Logan
(74) *Attorney, Agent, or Firm* — Perman & Green, LLP

(57) ABSTRACT

A product order fulfillment system includes multiple decks arrayed at different levels and defining multilevel decks, at least one autonomous transport vehicle on each of the decks, and configured for holding and transporting a pickface on each deck, at least one lift, traversing and connecting more than one level of the decks, and arranged for lifting and lowering the pickface from the decks, and at least one pickface transfer station on each deck interfacing between the transport vehicle and the at least one lift to effect transfer of the pickface between the transport vehicle and the at least one lift, the at least one lift defines a fulfillment stream of mixed case pickfaces outbound from the multilevel decks to a load fill, at least one stream of the fulfillment stream has an ordered sequence of streaming pickfaces wherein the ordered sequence of streaming pickfaces is based on another fulfilment stream.

16 Claims, 28 Drawing Sheets

Related U.S. Application Data

Dec. 18, 2019, now Pat. No. 10,839,347, which is a continuation of application No. 16/162,247, filed on Oct. 16, 2018, now Pat. No. 10,521,767, which is a continuation of application No. 14/997,925, filed on Jan. 18, 2016, now Pat. No. 10,102,496.

(60) Provisional application No. 62/104,531, filed on Jan. 16, 2015.

(56) References Cited

U.S. PATENT DOCUMENTS

| | | |
|---|---|---|
| 2,996,621 A | 8/1961 | Barret, Jr. |
| 3,455,468 A | 7/1969 | Saul |
| 3,554,390 A | 1/1971 | Saul |
| 3,677,421 A | 7/1972 | Kinter et al. |
| 3,737,056 A | 6/1973 | Hathcock, Jr. |
| 3,802,580 A | 4/1974 | Castaldi |
| 3,970,840 A | 7/1976 | De Bruine |
| 4,001,139 A | 1/1977 | Long |
| 4,406,570 A | 9/1983 | Duncan et al. |
| 4,428,708 A | 1/1984 | Burt |
| 4,492,504 A | 1/1985 | Hainsworth |
| 4,595,329 A | 6/1986 | Marques |
| 4,678,390 A | 7/1987 | Bonneton et al. |
| 4,679,149 A | 7/1987 | Merz |
| 4,692,876 A | 9/1987 | Tenma et al. |
| 4,716,530 A | 12/1987 | Ogawa et al. |
| 4,786,229 A | 11/1988 | Henderson |
| 4,811,229 A | 3/1989 | Wilson |
| 4,936,738 A | 6/1990 | Brennan et al. |
| 5,134,353 A | 7/1992 | Kita et al. |
| 5,134,940 A | 8/1992 | Fujita et al. |
| 5,135,344 A | 8/1992 | Kita et al. |
| 5,179,329 A | 1/1993 | Nishikawa et al. |
| 5,273,392 A | 12/1993 | Bernard, II et al. |
| 5,333,982 A | 8/1994 | Tanizawa et al. |
| 5,370,492 A | 12/1994 | Gleyze et al. |
| 5,379,229 A | 1/1995 | Parson et al. |
| 5,380,139 A | 1/1995 | Pohjonen et al. |
| 5,403,147 A | 4/1995 | Tanaka |
| 5,425,612 A | 6/1995 | Ebstein |
| 5,472,309 A | 12/1995 | Bernard, II et al. |
| 5,525,884 A | 6/1996 | Sugiura et al. |
| 5,529,165 A | 6/1996 | Shupert |
| 5,601,395 A | 2/1997 | Lichti, Sr et al. |
| 5,718,551 A | 2/1998 | Ebstein |
| 5,764,014 A | 6/1998 | Jakeway et al. |
| 5,801,506 A | 9/1998 | Netzler |
| 5,839,872 A | 11/1998 | Goto et al. |
| 5,908,283 A * | 6/1999 | Huang ............... G06Q 10/043 414/21 |
| 5,988,306 A | 11/1999 | Ooishi |
| 6,036,427 A | 3/2000 | Kita et al. |
| 6,061,607 A | 5/2000 | Bradley et al. |
| 6,272,406 B2 | 8/2001 | Alofs et al. |
| 6,325,586 B1 | 12/2001 | Loy |
| 6,341,269 B1 | 1/2002 | Burrows |
| 6,345,217 B1 | 2/2002 | Zeitler et al. |
| 6,721,638 B2 | 4/2004 | Zeitler |
| 6,748,292 B2 | 6/2004 | Mountz |
| 6,923,612 B2 | 8/2005 | Hansl |
| 6,929,440 B1 | 8/2005 | Grond |
| 6,950,722 B2 | 9/2005 | Mountz |
| 7,008,164 B2 | 3/2006 | Rokkaku |
| 7,025,191 B2 | 4/2006 | Litchi et al. |
| 7,266,422 B1 | 9/2007 | Demotte et al. |
| 7,329,081 B2 | 2/2008 | Baker et al. |
| 7,402,018 B2 | 7/2008 | Mountz et al. |
| 7,495,561 B2 | 2/2009 | Bodin et al. |
| 7,931,431 B2 | 4/2011 | Benedict et al. |
| 8,425,173 B2 | 4/2013 | Lert et al. |
| 8,480,347 B2 | 7/2013 | Schafer |
| 8,594,835 B2 | 11/2013 | Lert et al. |
| 8,596,952 B2 | 12/2013 | Wolkerstorfer |
| 8,740,542 B2 | 6/2014 | Wolkerstorfer |
| 8,790,061 B2 | 7/2014 | Yamashita |
| 8,894,344 B2 | 11/2014 | Merry et al. |
| 8,954,188 B2 | 2/2015 | Sullivan et al. |
| 8,956,099 B2 | 2/2015 | Olszak et al. |
| 8,974,168 B2 | 3/2015 | Yamashita |
| 9,008,884 B2 | 4/2015 | Toebes et al. |
| 9,037,286 B2 | 5/2015 | Lert |
| 9,315,323 B2 | 4/2016 | Schubilske |
| 9,321,591 B2 | 4/2016 | Lert et al. |
| 9,409,728 B2 | 8/2016 | Bastian, II |
| 9,499,338 B2 | 11/2016 | Toebes et al. |
| 9,505,556 B2 | 11/2016 | Razumov |
| 9,555,967 B2 | 1/2017 | Stevens |
| 9,856,083 B2 | 1/2018 | Conrad et al. |
| 10,155,623 B2 | 12/2018 | Conrad et al. |
| 10,377,585 B2 * | 8/2019 | Cyrulik ............... B65G 1/1373 |
| 10,521,767 B2 | 12/2019 | Pankratov et al. |
| 10,850,921 B2 | 12/2020 | Conrad et al. |
| 11,004,033 B1 | 5/2021 | Theobald et al. |
| 11,078,017 B2 | 8/2021 | Toebes et al. |
| 11,130,631 B2 | 9/2021 | Pankratov et al. |
| 2002/0029719 A1 | 3/2002 | Matsukawa |
| 2002/0076307 A1 | 6/2002 | Fallin et al. |
| 2003/0033217 A1 | 2/2003 | Cutlip |
| 2003/0185656 A1 | 10/2003 | Hansl |
| 2003/0200129 A1 | 10/2003 | Klaubauf et al. |
| 2004/0093116 A1 | 5/2004 | Mountz |
| 2004/0197171 A1 | 10/2004 | Freudelsperger |
| 2004/0238326 A1 | 12/2004 | Litchi |
| 2005/0158154 A1 | 7/2005 | Leerintveld et al. |
| 2006/0245862 A1 | 11/2006 | Hansl et al. |
| 2006/0257236 A1 | 11/2006 | Stingel, III et al. |
| 2007/0021864 A1 | 1/2007 | Mountz et al. |
| 2007/0068700 A1 | 3/2007 | Ohtsuki et al. |
| 2007/0177011 A1 | 8/2007 | Lewin et al. |
| 2007/0288123 A1 | 12/2007 | D'Andrea et al. |
| 2007/0290040 A1 | 12/2007 | Wurman et al. |
| 2007/0293978 A1 | 12/2007 | Wurman et al. |
| 2008/0001372 A1 | 1/2008 | Hoffman et al. |
| 2008/0131241 A1 | 6/2008 | King |
| 2008/0166217 A1 | 7/2008 | Fontana |
| 2008/0215180 A1 | 9/2008 | Kota |
| 2009/0074545 A1 | 3/2009 | Lert, Jr. et al. |
| 2009/0114115 A1 | 5/2009 | Minges |
| 2009/0185884 A1 | 7/2009 | Wurman et al. |
| 2009/0308000 A1 | 12/2009 | Corcoran |
| 2010/0222915 A1 * | 9/2010 | Kuehnemann ......... G06Q 10/08 706/14 |
| 2010/0272546 A1 | 10/2010 | Wolkerstorfer |
| 2010/0316468 A1 | 12/2010 | Lert |
| 2010/0316469 A1 | 12/2010 | Lert |
| 2010/0322746 A1 * | 12/2010 | Lert ................... B65G 1/1378 414/277 |
| 2010/0322747 A1 * | 12/2010 | Lert ................... B65G 1/065 414/807 |
| 2012/0101627 A1 | 4/2012 | Lert |
| 2012/0141236 A1 | 6/2012 | Korner |
| 2012/0185082 A1 | 7/2012 | Toebes et al. |
| 2012/0185122 A1 | 7/2012 | Sullivan et al. |
| 2012/0186192 A1 * | 7/2012 | Toebes ................. B65G 65/08 53/235 |
| 2012/0189409 A1 | 7/2012 | Toebes et al. |
| 2012/0189416 A1 | 7/2012 | Toebes |
| 2012/0195720 A1 | 8/2012 | Sullivan et al. |
| 2012/0197431 A1 | 8/2012 | Toebes et al. |
| 2012/0200259 A1 | 8/2012 | Sullivan et al. |
| 2012/0328397 A1 | 12/2012 | Yamashita |
| 2012/0330458 A1 | 12/2012 | Weiss |
| 2013/0129453 A1 | 5/2013 | Salichs |
| 2013/0209202 A1 | 8/2013 | Schmit et al. |
| 2013/0245810 A1 | 9/2013 | Sullivan et al. |
| 2014/0044506 A1 | 2/2014 | De Vries |
| 2014/0056672 A1 | 2/2014 | Mathys et al. |
| 2014/0088748 A1 | 3/2014 | Woodtli et al. |
| 2014/0100999 A1 | 4/2014 | Mountz et al. |
| 2014/0124462 A1 | 5/2014 | Yamashita |
| 2014/0197171 A1 | 7/2014 | Taylor |
| 2014/0277692 A1 | 9/2014 | Buzan et al. |

(56) References Cited

U.S. PATENT DOCUMENTS

| | | |
|---|---|---|
| 2014/0350717 A1 | 11/2014 | Dagle et al. |
| 2015/0098775 A1 | 4/2015 | Razumov |
| 2015/0225187 A1 | 8/2015 | Razumov |
| 2016/0016731 A1 | 1/2016 | Razumov |
| 2016/0167880 A1 | 6/2016 | Pankaratov et al. |
| 2016/0207709 A1 | 7/2016 | Pankratov et al. |
| 2016/0207710 A1 | 7/2016 | Conrad et al. |
| 2016/0207711 A1 | 7/2016 | Pankratov et al. |
| 2016/0214797 A1 | 7/2016 | Pankratov et al. |
| 2016/0214808 A1 | 7/2016 | Cyrulik et al. |
| 2018/0111770 A1 | 4/2018 | Cyrulik et al. |

FOREIGN PATENT DOCUMENTS

| | | |
|---|---|---|
| CN | 102822073 | 12/2012 |
| CN | 203294644 | 11/2013 |
| CN | 103442997 | 12/2013 |
| CN | 203794044 | 8/2014 |
| CN | 102887319 | 1/2018 |
| DE | 4104527 | 8/1992 |
| DE | 20011661 | 12/2000 |
| DE | 10142395 | 11/2002 |
| DE | 2011106677 | 1/2013 |
| DE | 102011106677 | 1/2013 |
| EP | 0169156 | 1/1986 |
| EP | 737630 | 4/1996 |
| EP | 1598291 | 11/2005 |
| EP | 1627830 | 2/2006 |
| EP | 1775240 | 4/2007 |
| EP | 3245145 | 11/2017 |
| FR | 2730715 | 8/1996 |
| GB | 2407565 | 5/2005 |
| JP | 4723489 | 8/1977 |
| JP | 5231548 | 8/1977 |
| JP | 0672512 | 3/1994 |
| JP | 2001220002 | 8/2001 |
| JP | 2003012119 | 1/2003 |
| JP | 2004123240 | 4/2004 |
| JP | 3102245 | 7/2004 |
| JP | 2013086891 | 5/2013 |
| JP | 2013522144 | 6/2013 |
| JP | 2014503440 | 2/2014 |
| JP | 2014508082 | 4/2014 |
| JP | 2014091698 | 5/2014 |
| JP | 6102603 | 2/2015 |
| JP | 2020203799 | 12/2020 |
| KR | 20130086236 | 7/2013 |
| KR | 20130129412 | 11/2013 |
| TW | 201328951 | 7/2013 |
| WO | 9534491 | 12/1995 |
| WO | 2004103883 | 12/2004 |
| WO | 2005009324 | 2/2005 |
| WO | 2005056943 | 6/2005 |
| WO | 2006095047 | 9/2006 |
| WO | 2009150684 | 12/2009 |
| WO | 2012156355 | 11/2012 |
| WO | 2013004695 | 1/2013 |
| WO | 2014145450 | 9/2014 |
| WO | 2016115565 | 7/2016 |
| WO | 20160115565 | 7/2016 |

\* cited by examiner

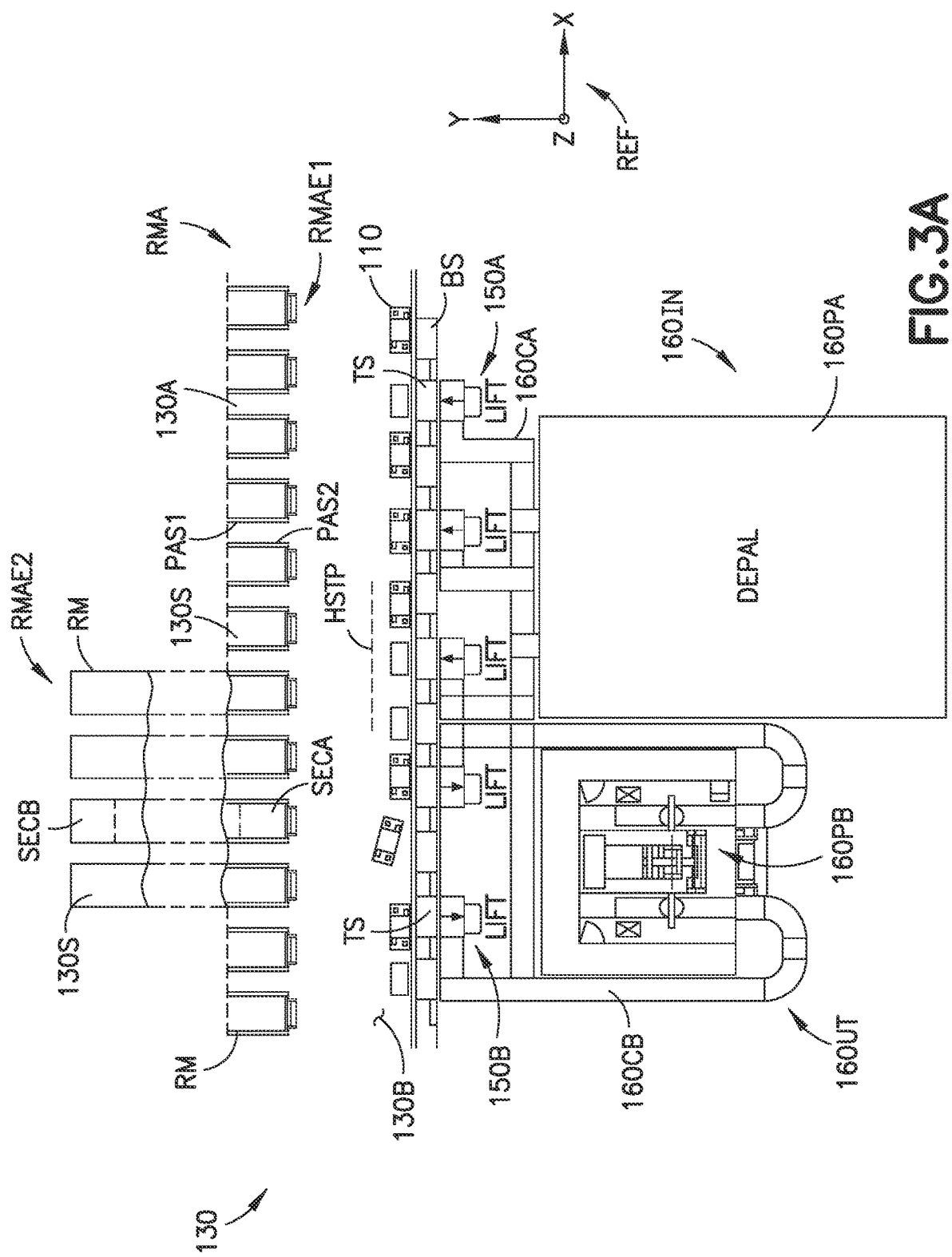

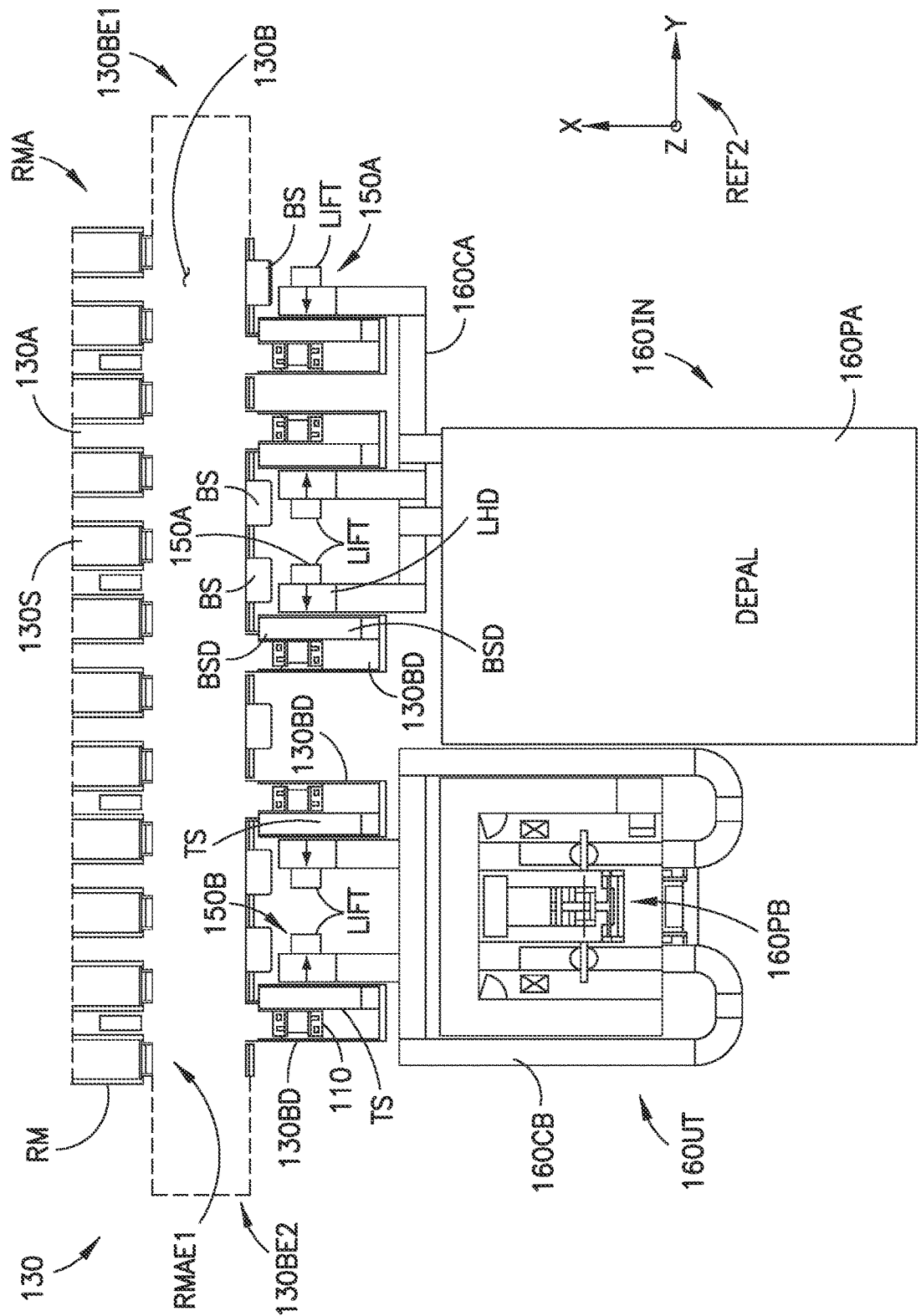

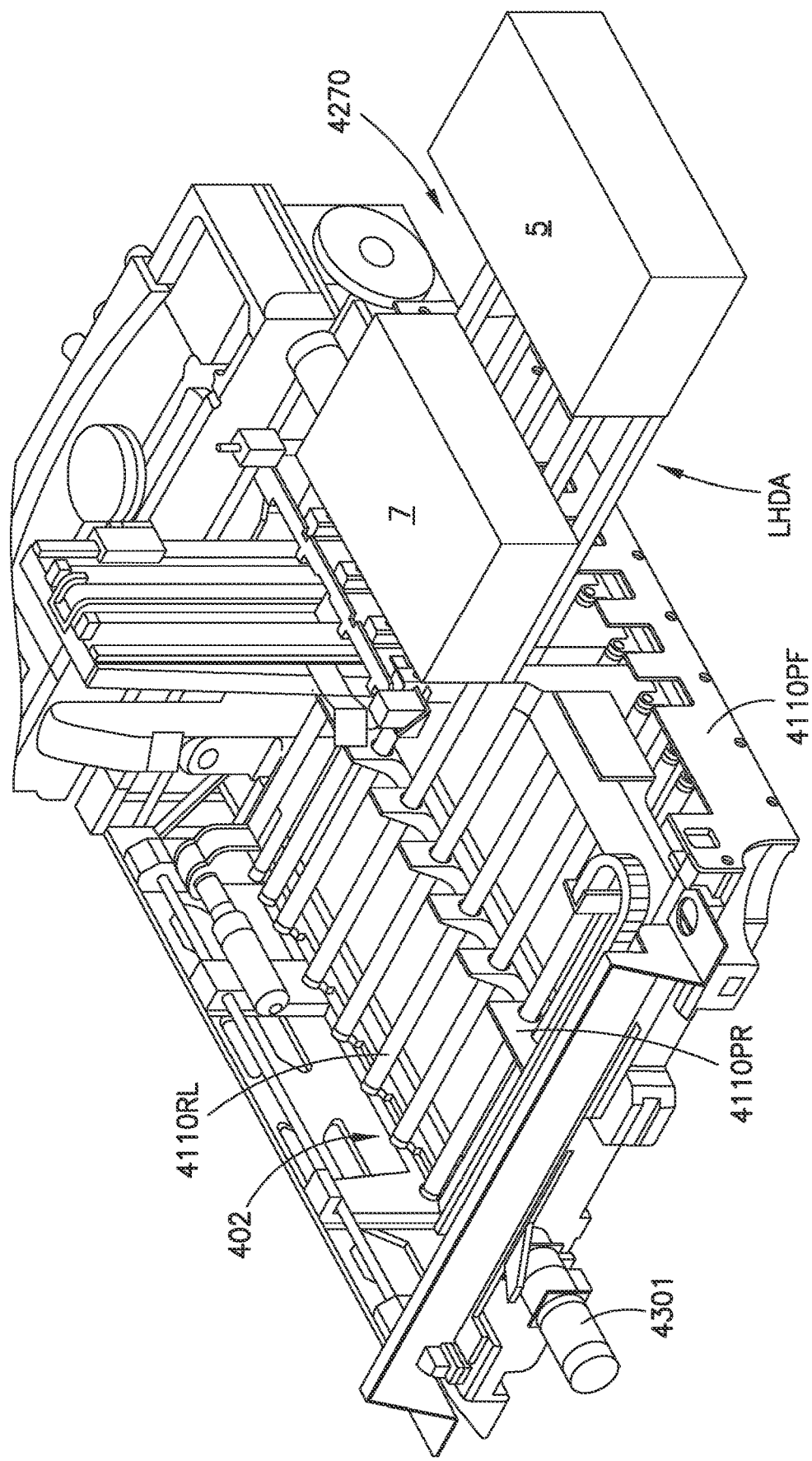

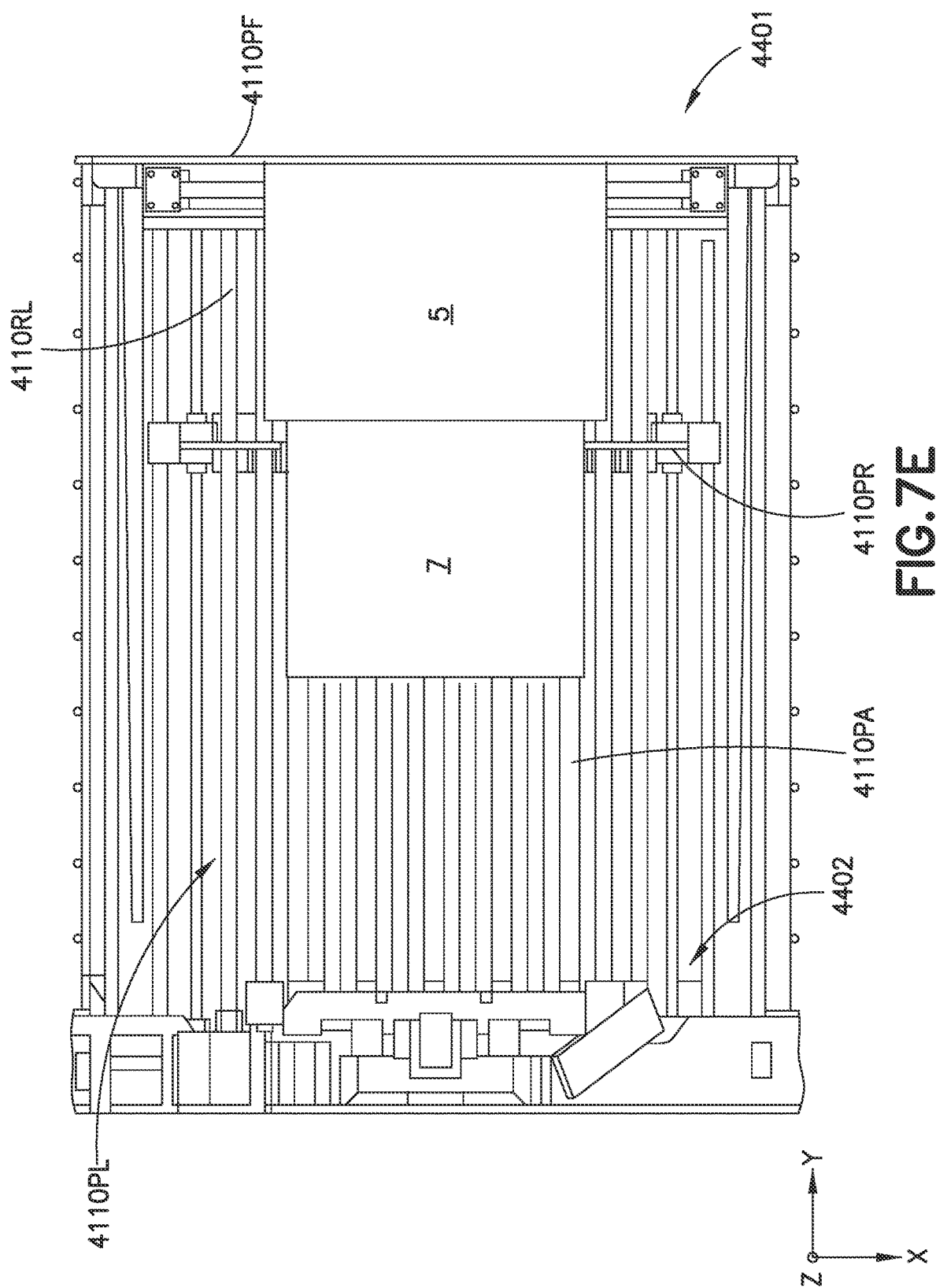

STORAGE AND RETRIEVAL SYSTEM

CROSS-REFERENCE TO RELATED APPLICATIONS

This application is a continuation of U.S. non-provisional patent application Ser. No. 18/158,882, filed on Jan. 24, 2023, (now U.S. Pat. No. 11,893,533), which is a continuation of U.S. non-provisonal patent application Ser. No. 16/950,383, filed on Nov. 17, 2020, (now U.S. Pat. No. 11,562,321), which is a continuation of U.S. non-provisonal patent application Ser. No. 16/718,918, filed on Dec. 18, 2019, (now U.S. Pat. No. 10,839,347), which is a continuation of U.S. non-provisonal patent application Ser. No. 16/162,247, filed on Oct. 16, 2018, (now U.S. Pat. No. 10,521,767), which is a continuation of U.S. non-provisonal patent application Ser. No. 14/997,925, filed on Jan. 18, 2016, (now U.S. Pat. No. 10,102,496), which claims priority from and the benefit of U.S. Provisional Patent Application No. 62/104,531 filed on Jan. 16, 2015, the disclosures of which are incorporated by reference herein in their entireties.

This application is also related to U.S. patent application Ser. No. 15/890,088 filed on Feb. 6, 2018, which is a continuation of U.S. patent application Ser. No. 14/966,978, filed on Dec. 11, 2015, (now U.S. Pat. No. 9,884,719 issued on Feb. 6, 2018); U.S. patent application Ser. No. 14/997,892, filed on Jan. 18, 2016; U.S. patent application Ser. No. 14/997,902, filed on Jan. 18, 2016; U.S. patent application Ser. No. 15/848,809, filed on Dec. 20, 2017, which is a continuation of U.S. patent application Ser. No. 14/997,920, filed on Jan. 18, 2016 (now U.S. Pat. No. 9,856,083 issued on Jan. 2, 2018); and U.S. Provisional Patent Application No. 62/107,135, filed on Jan. 23, 2015, the disclosures of which are incorporated herein by reference in their entireties.

BACKGROUND

1. Field

The exemplary embodiments generally relate to material handling systems and, more particularly, to transport and storage of items within the material handling system.

2. Brief Description of Related Developments

Multilevel storage and retrieval systems may be used in warehouses for the storage and retrieval of goods. Generally the transportation of goods into and out of the storage structure is done with lifts for transfer to a vehicle on a storage level, vehicles travelling up ramps to a predetermined storage level, or with vehicles that include lifts traveling along guide ways. Goods stored within the storage and retrieval system are generally stored in storage spaces on each storage level such that a transport vehicle disposed on that level has access to one level of storage spaces. Generally, the lifts that transfer items to and from the storage spaces carry the vehicles between different storage levels, are incorporated into the vehicles (such as with a gantry crane) or have a paternoster configuration where the lift payload shelves continually circulate around a frame at a predetermined rate.

Generally sequencing of items picked from storage is performed by the vehicles picking the items or by a dedicated sorter that sorts the items during an outbound flow after being transported by the gantry crane or paternoster lift. The sorting of outbound items in this manner may result in the lifts performing multiple lift strokes to pick the items needed for a load-out or additional steps sorting thereby decreasing throughput of the storage and retrieval system.

It would be advantageous to increase a rate of item transfer to and from the different storage levels within a storage and retrieval system where items of a load-out are sorted at a lift interface and picked with a common lift stroke and where an order of sorted items at the lift interface is matched to a load stream of a common load, lift interface and/or lift.

BRIEF DESCRIPTION OF THE DRAWINGS

The foregoing aspects and other features of the disclosed embodiment are explained in the following description, taken in connection with the accompanying drawings, wherein:

FIGS. 3A and 3B are schematic illustrations of portions of the storage and retrieval system in accordance with aspects of the disclosed embodiment;

FIGS. 4A and 4B are schematic illustrations of portions of the storage and retrieval system in accordance with aspects of the disclosed embodiment;

FIGS. 7, 7A-7E are schematic illustrations of a portion of the storage and retrieval system in accordance with aspects of the disclosed embodiment;

DETAILED DESCRIPTION

Figure 1:
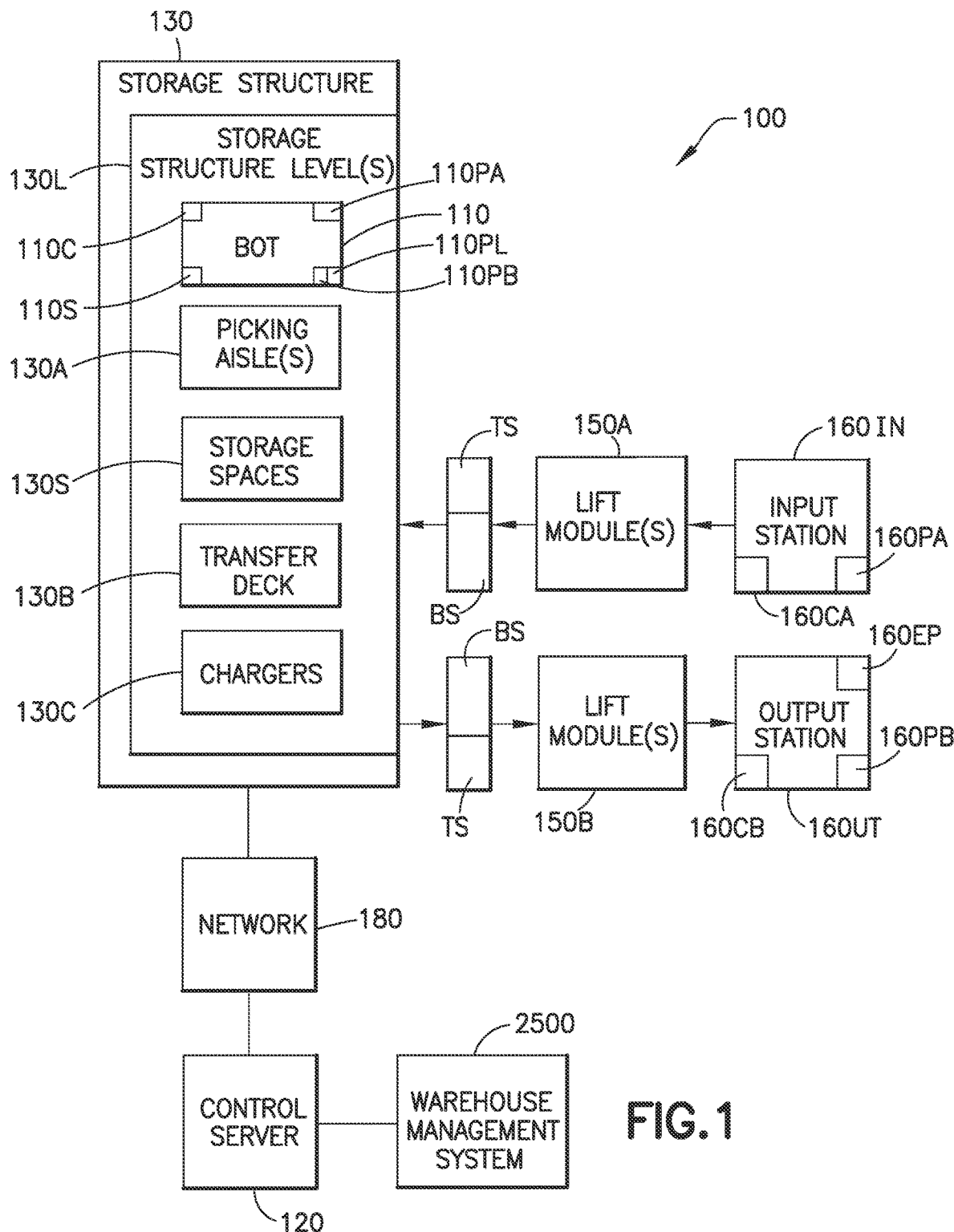
FIG. 1 is a schematic illustration of an automated storage and retrieval system in accordance with aspects of the disclosed embodiment.

FIG. 1 is a schematic illustration of an automated storage and retrieval system 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

In accordance with aspects of the disclosed embodiment the automated storage and retrieval system 100 may operate in a retail distribution center or warehouse to, for example, fulfill orders received from retail stores for case units such as those described in U.S. patent application Ser. No. 13/326,674 filed on Dec. 15, 2011, the disclosure of which is incorporated by reference herein in its entirety. For example, the case units are cases or units of goods not stored in trays, on totes or on pallets (e.g. uncontained). In other examples, the case units are cases or units of goods that are contained in any suitable manner such as in trays, on totes or on pallets. In still other examples, the case units are a combination of uncontained and contained items. It is noted that the case units, for example, include cased units of goods (e.g. case of soup cans, boxes of cereal, etc.) or individual goods that are adapted to be taken off of or placed on a pallet. In accordance with the aspects of the disclosed embodiment, shipping cases for case units (e.g. cartons, barrels, boxes, crates, jugs, or any other suitable device for holding case units) may have variable sizes and may be used to hold case units in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system in a load-out the pallets may contain any suitable number and combination of different case units (e.g. a mixed pallet where each mixed pallet holds different types of case units—a pallet holds a combination of soup and cereal) that are provided to, for example the palletizer in a sorted arrangement for forming the mixed pallet. In the embodiments the storage and retrieval system described herein may be applied to any environment in which case units are stored and retrieved.

Figure 1B:
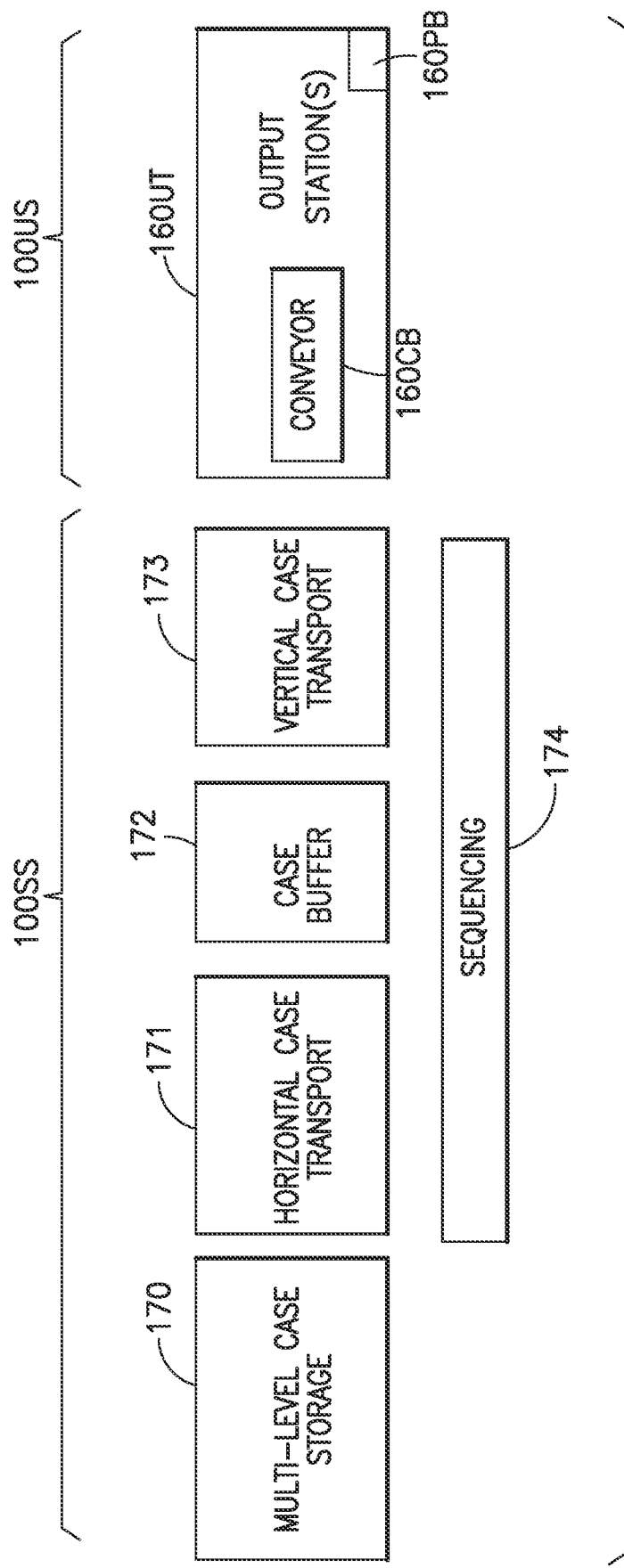
FIG. 1B is a schematic illustration of a portion of the storage and retrieval system in accordance with aspects of the disclosed embodiment.
Figure 2:
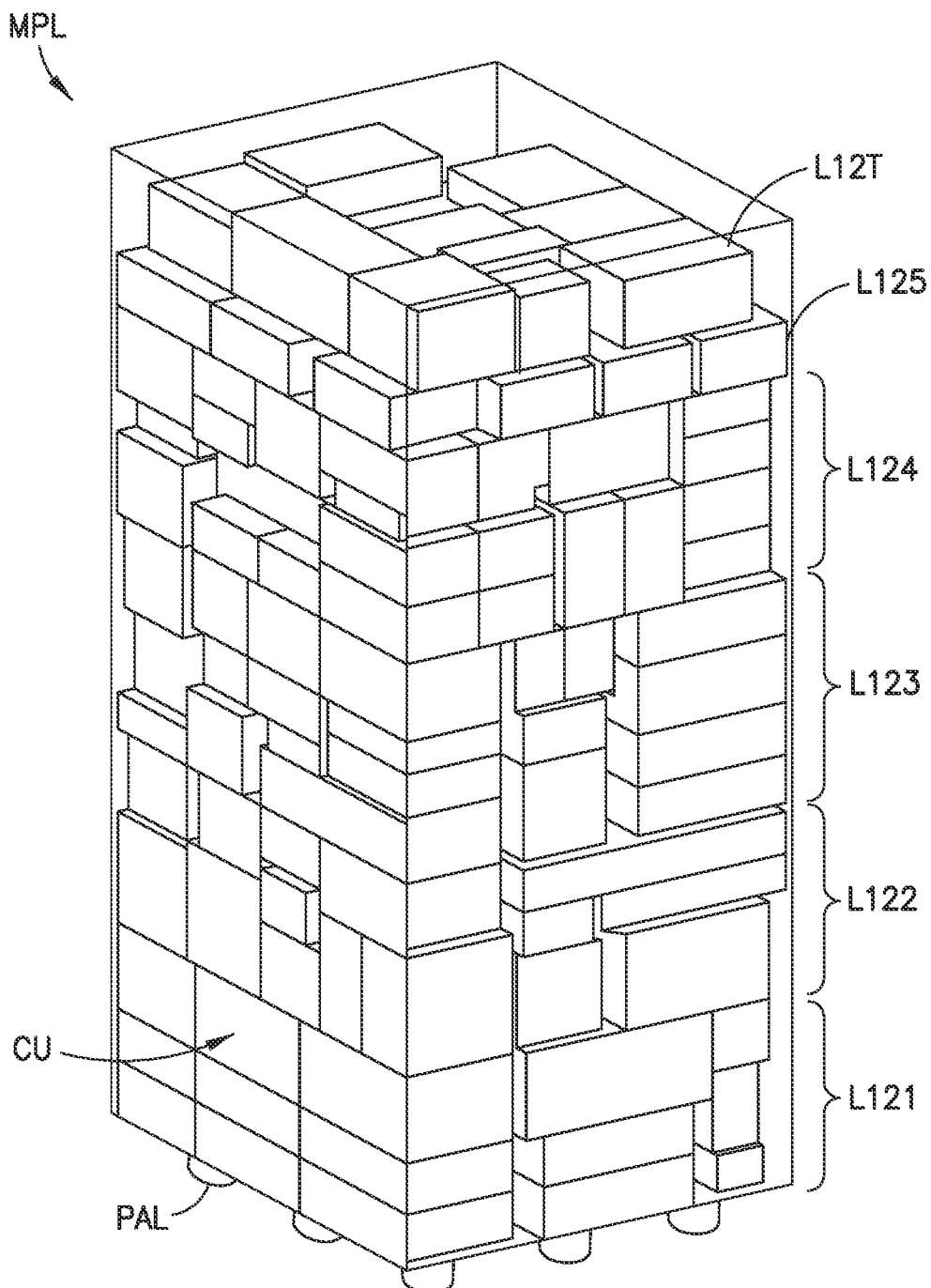
FIG. 2 is a schematic illustration of a mixed pallet load formed by the automated storage and retrieval system in accordance with aspects of the disclosed embodiment.
Figure 14:
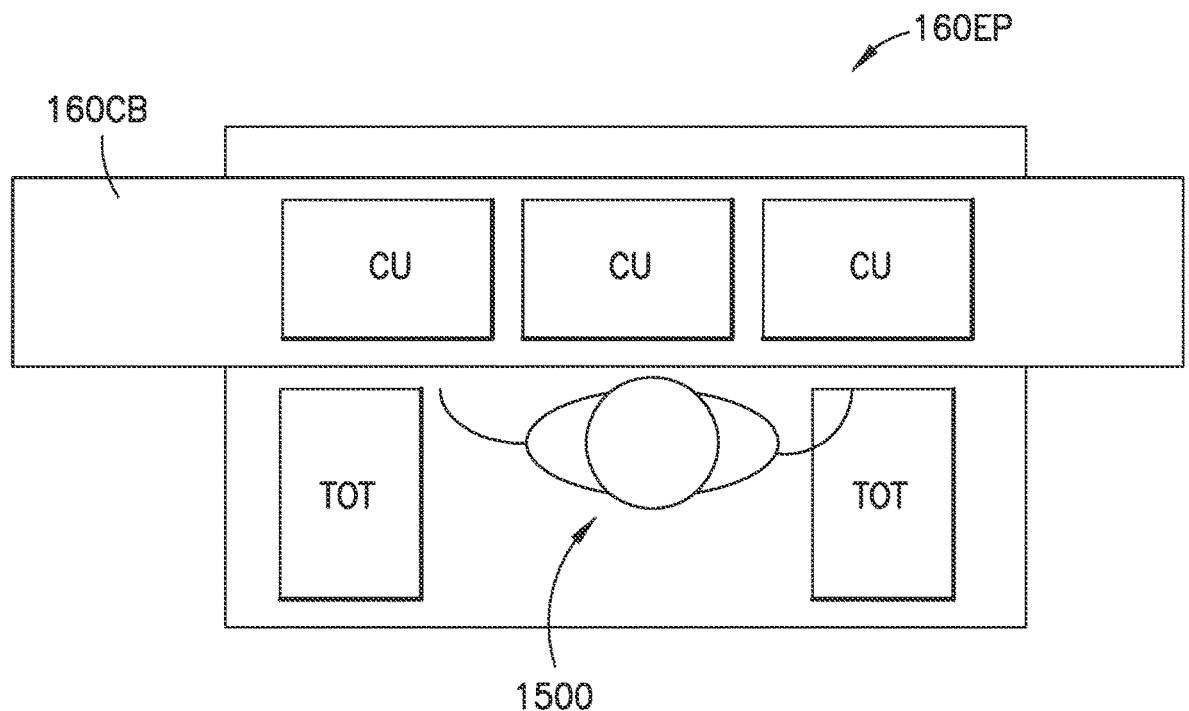
FIG. 14 is a schematic illustration of an operator station of the storage and retrieval system in accordance with aspects of the disclosed embodiment.

Also referring to FIG. 2, as noted above, when, for example, incoming bundles or pallets (e.g. from manufacturers or suppliers of case units arrive at the storage and retrieval system in a load-in for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets PAL leave the storage and retrieval system 100 in a load-out, with cases filling replenishment orders, the pallets PAL may contain any suitable number and combination of different case units CU (e.g. each pallet may hold different types of case units—a pallet holds a combination of canned soup, cereal, beverage packs, cosmetics and household cleaners). The cases combined onto a single pallet may have different dimensions and/or different SKU's. In the exemplary embodiment, referring also to FIG. 1B, the storage and retrieval system 100 is configured to generally include an in-feed section (including one or more input stations 160IN), a storage and sortation section 100SS (including, in one aspect, multilevel case storage 170, horizontal case transport 171, case buffering and vertical case transport 173) and an output section 100US (including one or more output stations 160UT) as will be described in greater detail below. In other aspects one or more of the case buffering 172 and vertical case transport 173 are included in the output section 100US while in still other aspects the case buffering 172 and vertical case transport 173 are common to both the storage and sortation section 100SS and the output section 100US. As may be realized, in one aspect of the disclosed embodiment, the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and assemble the corresponding groups of cases into what may be referred to as mixed case pallet loads MPL. As may also be realized, as illustrated in FIG. 14, in one aspect of the disclosed embodiment the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and sequence the corresponding groups of cases (in the manner described herein) at an operator station 160EP where items are picked from the different case units CU, and/or the different case units CU themselves, are placed in one or more bag(s), tote(s) or other suitable container(s) TOT by an operator 1500, or any suitable automation, in a predetermined order sequence of picked items according to, for example, an order, fulfilling one or more customer orders, in which the case units CU are sequenced at the operator station 160EP in accordance with the predetermined order sequence, noting that the sequencing of the case units CU as described herein effects the sequencing of the case units CU at the operator station 160EP.

The in-feed section may generally be capable of pallet loads to individual cases, and resolving the uniform transporting the cases via suitable transport, for input to the storage and sortation section. The storage and sortation section in turn may receive individual cases, store them in a storage area and retrieve desired cases individually in accordance with commands generated in accordance to orders entered into a warehouse management system for sequenced 174 transport to the output section 100US. The sorting and grouping of cases according to order (e.g. an order or load out sequence) may be performed in whole or in part by either the storage and sortation section 100SS or the output section 100US, or both, the boundary between being one of convenience for the description and the sorting and grouping being capable of being performed any number of ways. For example, as noted above, while the case buffering 172 and vertical case transport 173 are shown in FIG. 1B as being included in the storage and sortation section 100SS, in other aspects one or more of the case buffering 172 and vertical case transport 173 are included in the output section 100US and/or are common to both the storage and sortation section 100SS and the output section 100US. The intended result is that the output section assembles the appropriate group of ordered cases, that may be different in SKU, dimensions, etc. into, in one aspect, mixed case pallet loads in the manner described in, for example, U.S. patent application Ser. No. 13/654,293 filed on Oct. 17, 2012 (now U.S. Pat. No. 8,965,559), the disclosure of which is incorporated herein by reference in its entirety, while in other aspects the output section assembles the appropriate group of ordered case units, that may be different in SKU, dimensions, etc. into bags, totes or other suitable containers according to the predetermined order sequence of picked items at the operator station 160E (such as to e.g., fill a customer order).

In one aspect of the exemplary embodiment, the output section 100US generates the pallet load in what may be referred to as a structured architecture of mixed case stacks. The structured architecture of the pallet load may be characterized as having several flat case layers L121-L125, L12T, at least one of which is formed of non-intersecting, free-standing and stable stacks of multiple mixed cases. The mixed case stacks of the given layer have substantially the same height, to form as may be realized substantially flat top and bottom surfaces of the given layer, and may be sufficient in number to cover the pallet area, or a desired portion of the pallet area. Overlaying layer(s) may be orientated so that corresponding cases of the layer(s) bridge between the stacks of the supporting layer. Thus, stabilizing the stacks and correspondingly the interfacing layer(s) of the pallet load. In defining the pallet load into a structured layer architecture, the coupled 3-D pallet load solution is resolved into two parts that may be saved separately, a vertical (1-D) part resolving the load into layers, and a horizontal (2-D) part of efficiently distributing stacks of equal height to fill out the pallet height of each layer. In other aspects the load fill of mixed cases may be configured in any other suitable ordered sequence and may be loaded on or in any suitable transport device such as, for example, a bag, tote, shopping carriage, a truck or other suitable container fill without palletization. As will be described below, the storage and retrieval system outputs case units to the output section so that the two parts of the 3-D pallet load solution are resolved, while in other aspects the storage and retrieval system outputs case units to the output section according to a sequence for filling non-palletized item picking sequence orders at the operator station 160EP. The term load fill or container fill as used herein refers to case units that are delivered to either a pallet load fill section/cell (such as for the creation of a mixed pallet load MPL) or an itemized load fill section/cell as described with respect to FIG. 14 where both the pallet load fill section/cell and the itemized load fill section/cell are referred to generally as load fill section/ station or cell.

In accordance with aspects of the disclosed embodiment, referring again to FIG. 1, the automated storage and retrieval system 100 includes input stations 160IN (which include depalletizers 160PA, operator stations 160EP and/or conveyors 160CA for transporting items to lift modules for entry into storage) and stations output 160UT (which include palletizers 160PB and/or conveyors 160CB for transporting case units from lift modules for removal from storage), input and output vertical lift modules 150A, 150B (generally referred to as lift modules 150—it is noted that while input and output lift modules are shown, a single lift module may be used to both input and remove case units from the storage structure), a storage structure 130, and a number of autonomous transport vehicles 110 (referred to herein as "bots"). As used herein at least the lift modules 150, storage structure 130 and bots 110 may be collectively referred to herein as the storage and sortation section noted above. It is also noted that the depalletizers 160PA may be configured to remove case units from pallets so that the input station 160IN can transport the items to the lift modules 150 for input into the storage structure 130. The palletizers 160PB may be configured to place items removed from the storage structure 130 on pallets PAL (FIG. 2) for shipping.

Also referring to FIG. 3A, the storage structure 130 may include multiple storage rack modules RM, configured in a three dimensional array RMA, that are accessible by storage or deck levels 130L. Each storage level 130L includes storage spaces 130S formed by the rack modules RM where the rack modules include shelves that are disposed along storage or picking aisles 130A which, e.g., extend linearly through the rack module array RMA and provide access to the storage spaces 130S and transfer deck(s) 130B over which the bots 110 travel on a respective storage level 130L for transferring case units between any of the storage spaces 130S of the storage structure 130 (e.g. on the level which the bot 110 is located) and any of the lift modules 150 (e.g. each of the bots 110 has access to each storage space 130S on a respective level and each lift module 150 on a respective storage level 130L). The transfer decks 130B are arranged/ arrayed at different levels and defining multilevel decks (corresponding to each level 130L of the storage and retrieval system) that may be stacked one over the other or horizontally offset, such as having one transfer deck 130B at one end or side RMAE1 of the storage rack array RMA or at several ends or sides RMAE1, RMAE2 of the storage rack array RMA as described in, for example, U.S. patent application Ser. No. 13/326,674 filed on Dec. 15, 2011, the disclosure of which is incorporated herein by reference in its entirety.

The transfer decks 130B are substantially open and configured for the undeterministic traversal of bots 110 across and along the transfer decks 130B. As may be realized, the transfer deck(s) 130B at each storage level 130L communicate with each of the picking aisles 130A on the respective storage level 130L. Bots 110 bi-directionally traverse between the transfer deck(s) 130B and picking aisles 130A on each respective storage level 130L to access the storage spaces 130S disposed in the rack shelves alongside each of the picking aisles 130A (e.g. bots 110 may access storage spaces 130S distributed on both sides of each aisle such that the bot 110 may have a different facing when traversing each picking aisle 130A, for example, referring to FIG. 6, drive wheels 202 leading a direction of travel or drive wheels trailing a direction of travel). As noted above, the transfer deck(s) 130B also provide bot 110 access to each of the lifts 150 on the respective storage level 130L where the lifts 150 feed and remove case units to and/or from each storage level 130L and where the bots 110 effect case unit transfer between the lifts 150 and the storage spaces 130S. Each storage level 130L may also include charging stations 130C for charging an on-board power supply of the bots 110 on that storage level 130L such as described in, for example, U.S. patent application Ser. No. 14/209,086 filed on Mar. 13, 2014 and Ser. No. 13/326,823 filed on Dec. 15, 2011 (now U.S. Pat. No. 9,082,112), the disclosures of which are incorporated herein by reference in their entireties.

The bots 110 may be any suitable independently operable autonomous transport vehicles that carry/hold and transfer case units/pickfaces throughout the storage and retrieval system 100. In one aspect the bots 110 are automated, independent (e.g. free riding) autonomous transport vehicles. Suitable examples of bots can be found in, for exemplary purposes only, U.S. patent application Ser. No. 13/326,674 filed on Dec. 15, 2011; U.S. patent application Ser. No. 12/757,312 filed on Apr. 9, 2010, (now U.S. Pat. No. 8,425,173); U.S. patent application Ser. No. 13/326,423 filed on Dec. 15, 2011; U.S. patent application Ser. No. 13/326,447 filed on Dec. 15, 2011, (now U.S. Pat. No. 8,965,619); U.S. patent application Ser. No. 13/326,505 Dec. 15, 2011, (now U.S. Pat. No. 8,696,010); U.S. patent application Ser. No. 13/327,040 filed on Dec. 15, 2011, (now U.S. Pat. No. 9,187,244); U.S. patent application Ser. No.

13/326,952 filed on Dec. 15, 2011; U.S. patent application Ser. No. 13/326,993 filed on Dec. 15, 2011; U.S. patent application Ser. No. 14/486,008 filed on Sep. 15, 2014; and U.S. provisional Patent Application No. 62/107,135 filed on Jan. 23, 2015, the disclosures of which are incorporated by reference herein in their entireties. The bots 110 (described in greater detail below) may be configured to place case units, such as the above described retail merchandise, into picking stock in the one or more levels of the storage structure 130 and then selectively retrieve ordered case units.

The bots 110, lift modules 150 and other suitable features of the storage and retrieval system 100 are controlled in any suitable manner such as by, for example, one or more central system control computers (e.g. control server) 120 through, for example, any suitable network 180. In one aspect the network 180 is a wired network, a wireless network or a combination of wireless and wired networks using any suitable type and/or number of communication protocols. In one aspect, the control server 120 includes a collection of substantially concurrently running programs (e.g. system management software) for substantially automatic control of the automated storage and retrieval system 100. The collection of substantially concurrently running programs, for example, being configured to manage the storage and retrieval system 100 including, for exemplary purposes only, controlling, scheduling, and monitoring the activities of all active system components, managing inventory (e.g. which case units are input and removed, the order in which the cases are removed and where the case units are stored) and pickfaces (e.g. one or more case units that are movable as a unit and handled as a unit by components of the storage and retrieval system), and interfacing with a warehouse management system 2500. The control server 120 may, in one aspect, be configured to control the features of the storage and retrieval system in the manner described herein. For simplicity and ease of explanation the term "case unit(s)" is generally used herein for referring to both individual case units and pickfaces (formed of multiple case units).

Figure 1A:
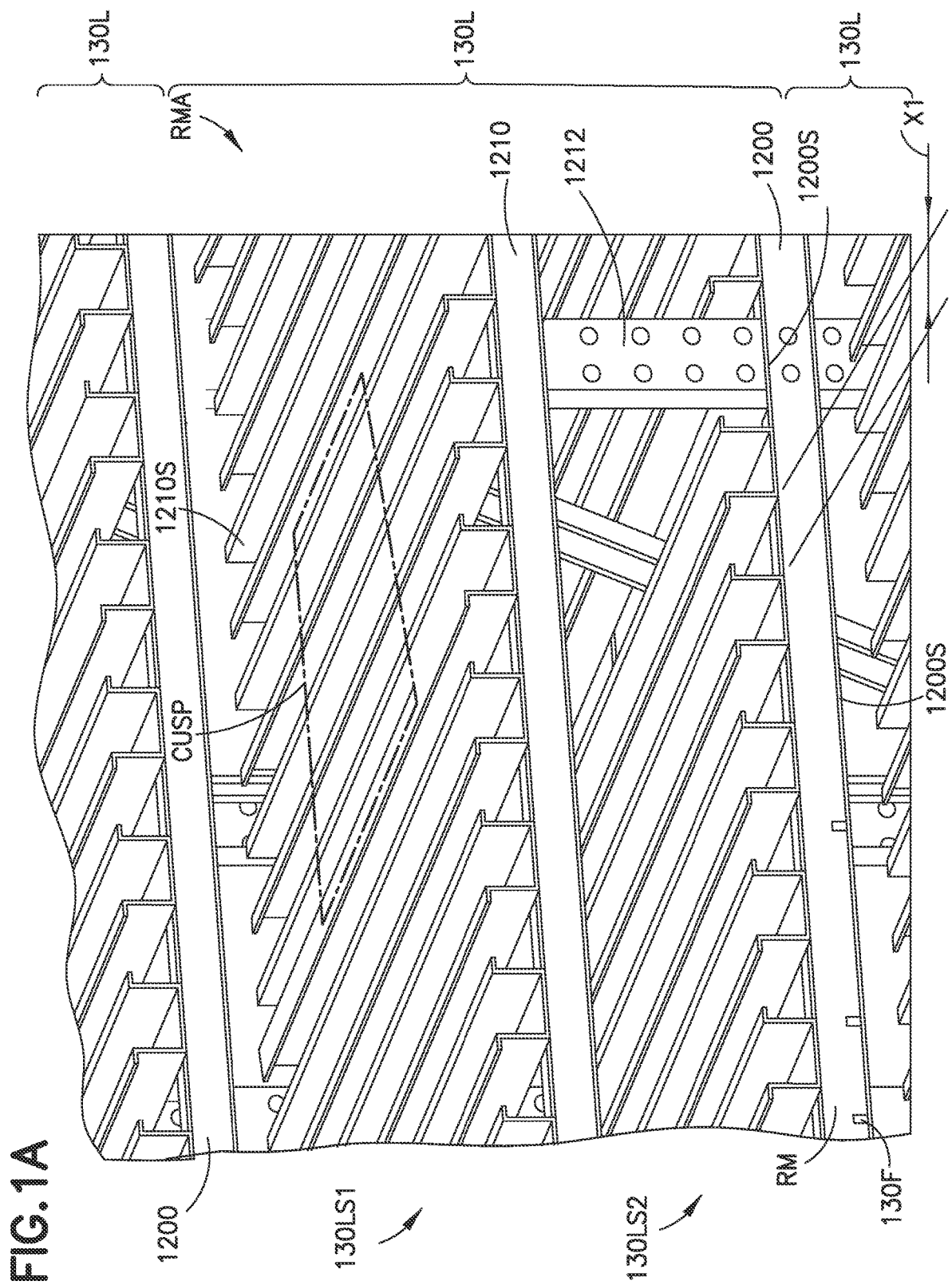
FIG. 1A is a schematic illustration of a portion of the storage and retrieval system in accordance with aspects of the disclosed embodiment.
Figure 1C:
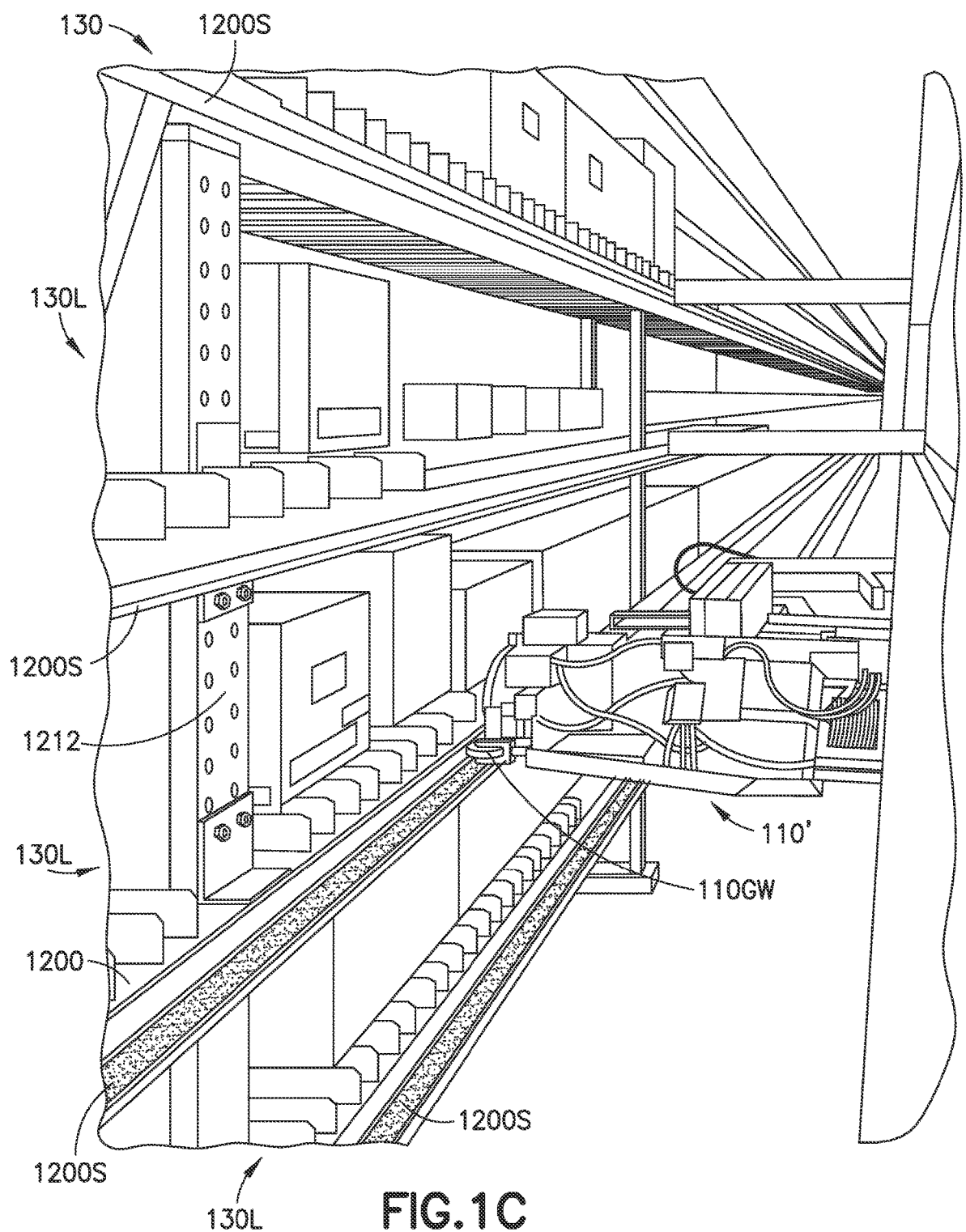
FIG. 1C is a schematic illustration of a portion of the automated storage and retrieval system in accordance with aspects of the disclosed embodiment.

Referring also to FIGS. 1 and 1A the rack module array RMA of the storage structure 130 includes vertical support members 1212 and horizontal support members 1200 that define a high density automated storage array such as described in, for example, U.S. patent application Ser. No. 14/997,892, filed on Jan. 18, 2016 and U.S. Provisional Patent Application No. 62/104,513, filed on Jan. 16, 2015, the disclosures of which are incorporated herein by reference in their entireties. Rails 1200S may be mounted to one or more of the vertical and horizontal support members 1212, 1200 in, for example, picking aisles 130A and be configured so that the bots 110 ride along the rails 1200S through the picking aisles 130A. At least one side of at least one of the picking aisles 130A of at least one storage level 130L may have one or more storage shelves (e.g. formed by rails 1210, 1200 and slats 1210S) provided at differing heights so as to form multiple shelf levels 130LS1-130LS2 (although two levels are illustrated any number of levels may be provided and the picking aisle can be divided into sections SECA, SECB each having a different number of levels or the same number of levels) between the storage or deck levels 130L defined by the transfer decks 130B (and the rails 1200S which form an aisle deck). Accordingly, there are multiple rack shelf levels 130LS1-130LS2, corresponding to each storage level 130L, extending along one or more picking aisles 130A communicating with the transfer deck 130B of the respective storage level 130L. As may be realized, the multiple rack shelf levels 130LS1-130LS2 effect each storage level 130L having stacks of stored case units (or case layers) that are accessible from a common deck 1200S of a respective storage level 130L (e.g. the stacks of stored cases are located between storage levels). In one aspect, referring to FIG. 1C each of the storage levels 130L includes a single level of storage shelves to store a single level of case units (e.g. each storage level includes a single case unit support plane CUSP) and the bots 110 are configured to transfer case units to and from the storage shelves of the respective storage level 130L.

As may be realized, bots 110 traversing a picking aisle 130A, at a corresponding storage level 130L, have access (e.g. for picking and placing case units) to each storage space 130S that is available on each shelf level 130LS1-130LS2, where each shelf level 130LS1-130LS2 is located between the storage levels 130L on one or more side(s) PAS1, PAS2 (see e.g. FIG. 3A) of the picking aisle 130A. As noted above, each of the storage shelf levels 130LS1-130LS2 is accessible by the bot 110 from the rails 1200S (e.g. from a common picking aisle deck 1200S that corresponds with a transfer deck 130B on a respective storage level 130L). As can be seen in FIG. 1A there are one or more shelf rails 1210 vertically spaced (e.g. in the Z direction) from one another to form multiple stacked storage spaces 130S each being accessible by the bot 110 from the common rails 1200S. As may be realized, the horizontal support members 1200 also form shelf rails (in addition to shelf rails 1210) on which case units are placed. Here the bots 110 includes a transfer arm 110PA having a vertical drive axis configured to transfer case units to each of the shelf levels 130LS1-130LS2 from the common picking aisle deck. A suitable example of bot that services multiple shelf levels from a common picking aisle deck can be found in, for example, U.S. patent application Ser. No. 14/997,892, filed on Jan. 18 2016 and U.S. Provisional Patent Application No. 62/104,513 filed on Jan. 16, 2015, the disclosures of which are incorporated herein by reference in their entireties. In other aspects, where each storage level 130L includes a single level of storage shelves as illustrated in FIG. 1B the bot, such as bot 110' (which is substantially similar to bot 110), is not provided with sufficient Z-travel of the transfer arm 110PA for placing case units on the multiple storage shelf levels 130LS1-130LS2 (e.g. accessible from a common rail 1200S) as described above. Here the transfer arm drive of the bots 110' includes only sufficient Z-travel for lifting the case units from the case unit support plane CUSP of the single level of storage shelves, for transferring the case units to and from the payload area 110PL and for transferring the case units between the transfer arm 110PA and the payload bed 110PB of the payload area 110PL. Suitable examples of bots 110' can be found in, for example, U.S. patent application Ser. No. 13/326,993 filed on Dec. 15, 2011, the disclosure of which is incorporated herein by reference in its entirety.

Each stacked shelf level 130LS1-130LS2 (and/or each single shelf level) of a corresponding storage level 130L defines an open and undeterministic two dimensional storage surface (e.g. having a case unit support plane CUSP as shown in FIG. 1A) that facilitates a dynamic allocation of pickfaces both longitudinally (i.e. along a length the aisle or coincident with a path of bot travel defined by the picking aisle) and laterally (i.e. transverse to the aisle or the path of bot travel). Dynamic allocation of the pickfaces and case units that make up the pickfaces is provided, for example, in the manner described in U.S. Pat. No. 8,594,835 issued on Nov. 26, 2013, the disclosure of which is incorporated by reference herein in its entirety. As such, case unit (or tote)

pickfaces of variable lengths and widths are positioned at each two dimensional storage location on the storage shelves (e.g. on each storage shelf level 130LS1-130LS2) with minimum gaps (e.g. that effect picking/placing of case units free from contact with other case units stored on the shelves) between adjacent stored case units/storage spaces. In one aspect, the storage space(s) 130S defined by the storage shelf levels 130LS1-130LS4 between the storage or deck levels 130L accommodates case units of different heights, lengths, widths and/or weights at the different shelf levels 130LS1-130LS2 as described in, for example, U.S. patent application Ser. No. 14/966,978, filed on Dec. 11, 2015 (now U.S. Pat. No. 9,884,719) and U.S. Provisional Patent Application No. 62/091,162 filed on Dec. 12, 2014, the disclosures of which are incorporated by reference herein in their entireties.

Referring again to FIGS. 3A and 3B each transfer deck 130B or storage level 130L includes one or more lift interface stations TS where case unit(s) (of single or combined case pickfaces) or totes are transferred between the lift load handling devices LHD and bots 110 on the transfer deck 130B. The interface stations TS (and buffer stations SB described herein) provide an interface between the bots 110 on a respective transfer deck 130B and at least one lift 150 to effect transfer of a pickface between the bots 110 and the at least one lift 150. The one or more lift interface stations TS of one or more of the transfer deck or storage levels 130L have multi-load stations MLS for positioning and/or buffering loads CU (such as the case units) for picking by the lifts 150B. As described herein, in one aspect, each load is a pickface of one or more case units picked/placed as a unit at the multi-load station MLS by one or more of the bots 110 and the load handling device(s) LHD of lifts 150B. In one aspect, the case units of each load/pickface are disposed in a load out as a unit or, in other aspects, are distributed in the load out. As will be described herein, each lift 150 includes a carriage 4001 that has a multi-load platform configured for a common multi-load lift/lower so as to, in one aspect, effect a multi-load pick (e.g. from a common interface station TS with a common/single load handling device LHD or with multiple independent load handling devices LHDs) or, in another aspect, effect multiple independent load picks (e.g. such as from interface stations TS at different deck levels) in a single lift pass. As may be realized, in one aspect, multi-loads (e.g. multiple pickfaces carried together as a single load or unit) are positioned at one or more of the interface stations TS (or buffer stations BS) for picking by the lifts 150.

The interface stations TS are located at a side of the transfer deck 130B opposite the picking aisles 130A and rack modules RM, so that the transfer deck 130B is interposed between the picking aisles and each interface station TS. As noted above, each bot 110 on each picking level 130L has access to each storage location 130S, each picking aisle 130A and each lift 150 on the respective storage level 130L, as such each bot 110 also has access to each interface station TS on the respective level 130L. In one aspect the interface stations are offset from high speed bot travel paths HSTP along the transfer deck 130B so that bot 110 access to the interface stations TS is undeterministic to bot speed on a high speed travel path HSTP. As such, each bot 110 can move a case unit(s) (or pickface, e.g. one or more cases, built by the bot) from every interface station TS to every storage space 130S corresponding to the deck level and vice versa.

In one aspect the interface stations TS are configured for a passive transfer of case units between the bot 110 and the load handing devices LHD of the lifts 150 (e.g. the interface stations TS have no moving parts for transporting the case units) which will be described in greater detail below. For example, also referring to FIG. 3B the interface stations include one or more stacked levels TL1, TL2 of transfer rack shelves RTS which in one aspect are substantially similar to the storage shelves described above (e.g. each being formed by rails 1210, 1200 and slats 1210S) such that bot 110 handoff (e.g. pick and place) as well as load handling device LHD handoff (e.g. pick and place) of case units (e.g. individual case units or pickfaces) and totes to the stacked rack shelves RTS (and/or the single level rack shelves) occurs in a passive manner substantially similar to that between the bot 110 and the storage spaces 130S (as described herein) where the case units or totes are transferred to and from the shelves. In other aspects the shelves may include any suitable transfer arms (substantially similar to the load handling devices LHD of the lifts 150 shown in FIGS. 5A-5E, although Z direction movement may be omitted when the transfer arm is incorporated into the interface station TS shelves) for picking and placing case units or totes from one or more of the bot 110 and load handling device LHD of the lift 150. Suitable examples of an interface station with an active transfer arm are described in, for example, U.S. patent application Ser. No. 12/757,354 filed on Apr. 9, 2010, the disclosure of which is incorporated by reference herein in its entirety.

In one aspect, the location of the bot 110 relative to the interface stations TS occurs in a manner substantially similar to bot location relative to the storage spaces 130S. For example, in one aspect, location of the bot 110 relative to the storage spaces 130S and the interface stations TS occurs in a manner substantially similar to that described in U.S. patent application Ser. No. 13/327,035 filed on Dec. 15, 2011, (now U.S. Pat. No. 9,008,884) and Ser. No. 13/608,877 filed on Sep. 10, 2012, (now U.S. Pat. No. 8,954,188), the disclosures of which are incorporated herein by reference in their entireties. For example, referring to FIGS. 1 and 1A, the bot 110 includes one or more sensors 110S that detect the slats 1210S or a locating feature 130F (such as an aperture, reflective surface, RFID tag, etc.) disposed on/in the rail 1200. The slats and/or locating features 130F are arranged so as to identify a location of the bot 110 within the storage and retrieval system, relative to e.g. the storage spaces and/or interface stations TS. In one aspect the bot 110 includes a controller 110C that, for example, counts the slats 1210S to at least in part determine a location of the bot 110 within the storage and retrieval system 100. In other aspects the location features 130F may be arranged so as to form an absolute or incremental encoder which when detected by the bot 110 provides for a bot 110 location determination within the storage and retrieval system 100.

Figure 3B:
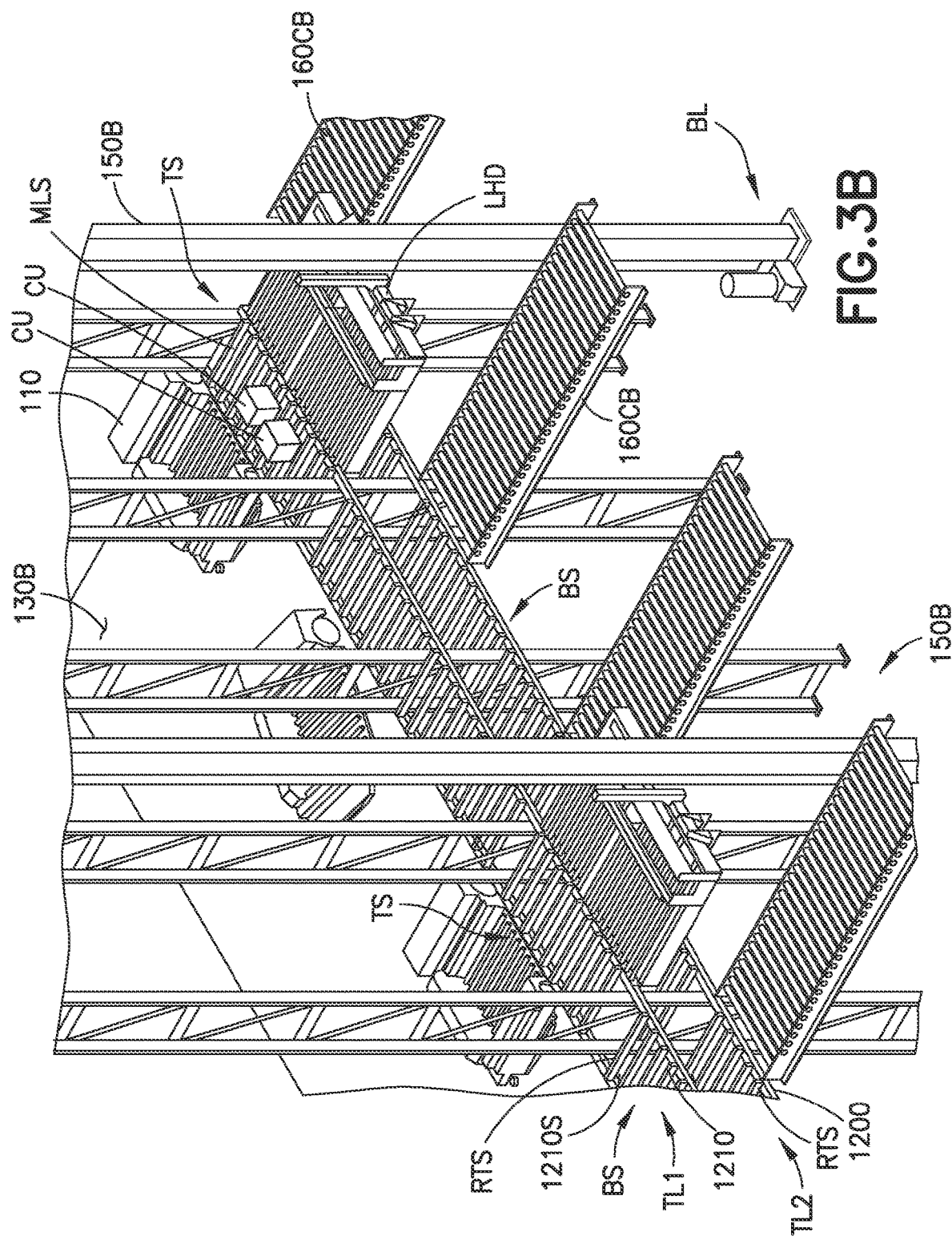

As may be realized, referring to FIG. 3B, the transfer rack shelves RTS at each interface station TS define the multi-load stations MLS (e.g. having one or more storage case unit holding locations for holding a corresponding number of case units or totes) on a common transfer rack shelf RTS. As noted above, each load of the multi-load station is a single case unit/tote or a multi-case pickface (e.g. having multiple case units/totes that are moved as a single unit) that is picked and paced by either the bot or load handling device LHD. As may also be realized, the bot location described above allows for the bot 110 to position itself relative to the multi-load stations MLS for picking and placing the case units/totes and pickfaces from a predetermined one of the holding locations of the multi-load station MLS. The interface stations TS define buffers where inbound and/or outbound case units/totes and pickfaces are temporarily stored when being transferred between the bots 110 and the load handling devices LHD of the lifts 150.

In one aspect one or more peripheral buffer stations BS (substantially similar to the interface stations) are also located at the side of the transfer deck 130B opposite the picking aisles 130A and rack modules RM, so that the transfer deck 130B is interposed between the picking aisles and each buffer station BS. The peripheral buffer stations BS are interspersed between or, in one aspect as shown in FIGS. 3A and 3B, otherwise in line with the interface stations TS. In one aspect the peripheral buffer stations BS are formed by rails 1210, 1200 and slats 1210S and are a continuation of (but a separate section of) the interface stations TS (e.g. the interface stations and the peripheral buffer stations are formed by common rails 1210, 1200). As such, the peripheral buffer stations BS also include one or more stacked levels TL1, TL2 of transfer rack shelves RTS as described above with respect to the interface stations TS. The peripheral buffer stations BS define buffers where case units/totes and/or pickfaces are temporarily stored for any suitable reasons such as when being transferred from one bot 110 to another different bot 110 on the same storage level 130L. As maybe realized, in one aspect the peripheral buffer stations BS are located at any suitable location of the storage and retrieval system including within the picking aisles 130A and anywhere along the transfer deck 130B.

Still referring to FIGS. 3A and 3B in one aspect the interface stations TS are arranged along the transfer deck 130B in a manner akin to parking spaces on the side of a road such that the bots 110 "parallel park" at a predetermined interface station TS for transferring case units to and from one or more shelves RTS at one or more levels TL1, TL2 of the interface station TS. In one aspect, a transfer orientation of the bots 110 (e.g. when parallel parked) at an interface station TS is the same orientation as when the bot 110 is travelling along the high speed bot transport path HSTP (e.g. the interface station is substantially parallel with a bot travel direction of the transfer deck and/or a side of the transfer deck on which the lifts 150 are located). Bot 110 interface with the peripheral buffer stations BS occurs by parallel parking so that a transfer orientation of the bots 110 (e.g. when parallel parked) at a peripheral buffer station BS is the same orientation as when the bot 110 is travelling along the high speed bot transport path HSTP.

Figure 4B:
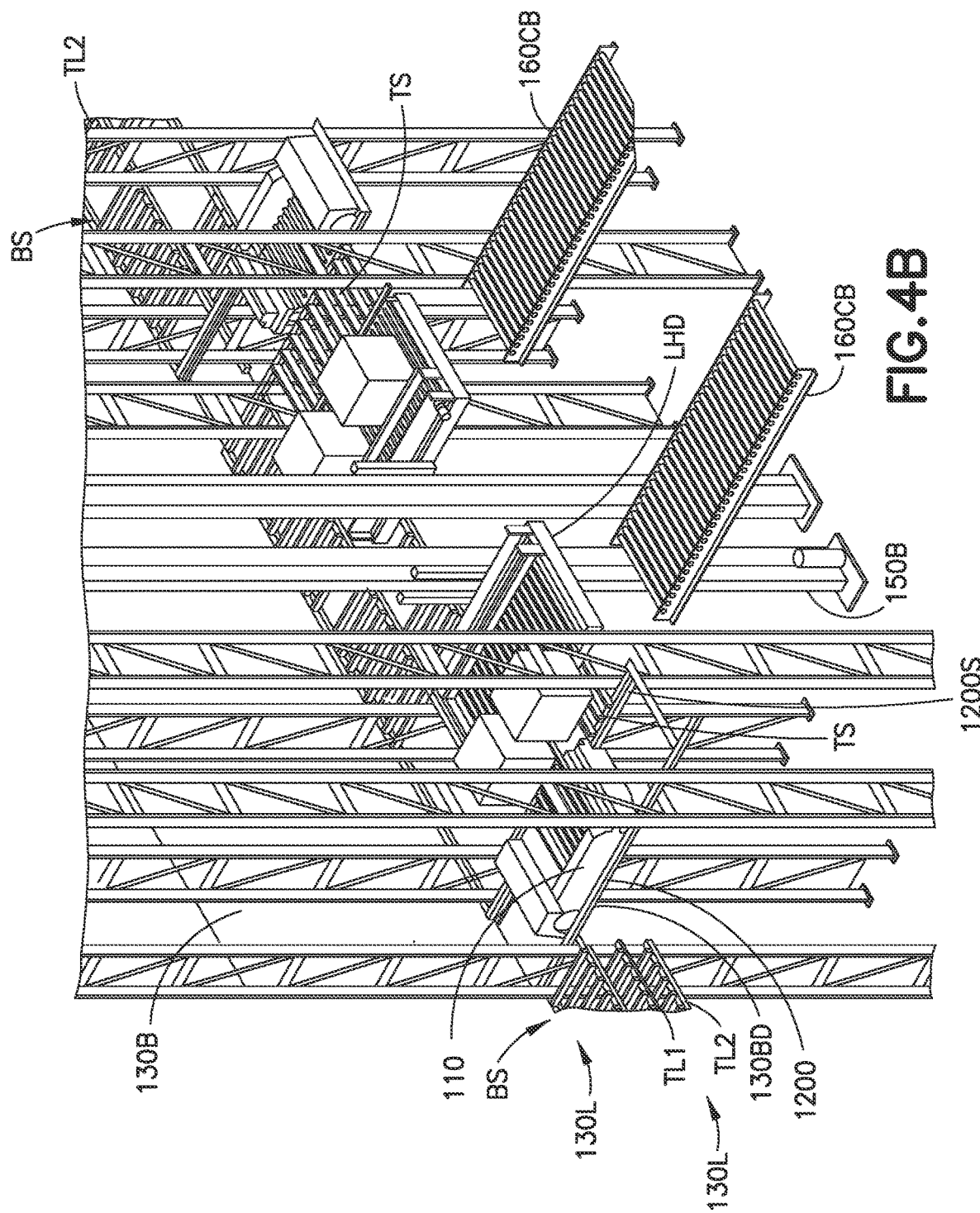

In another aspect, referring to FIGS. 4A and 4B, at least the interface stations TS are located on an extension portion or pier 130BD that extends from the transfer deck 130B. In one aspect, the pier 130BD is similar to the picking aisles where the bot 110 travels along rails 1200S affixed to horizontal support members 1200 (in a manner substantially similar to that described above). In other aspects, the travel surface of the pier 130BD may be substantially similar to that of the transfer deck 130B. Each pier 130BD is located at the side of the transfer deck 130B, such as a side that is opposite the picking aisles 130A and rack modules RM, so that the transfer deck 130B is interposed between the picking aisles and each pier 130BD. The pier(s) 130BD extends from the transfer deck at a non-zero angle relative to at least a portion of the high speed bot transport path HSTP. In other aspects the pier(s) 130BD extend from any suitable portion of the transfer deck 130B including the ends 130BE1, 130BE2 of the transfer deck 130BD. As may be realized, peripheral buffer stations BSD (substantially similar to peripheral buffers stations BS described above) may also be located at least along a portion of the pier 130BD.

Figure 5A:
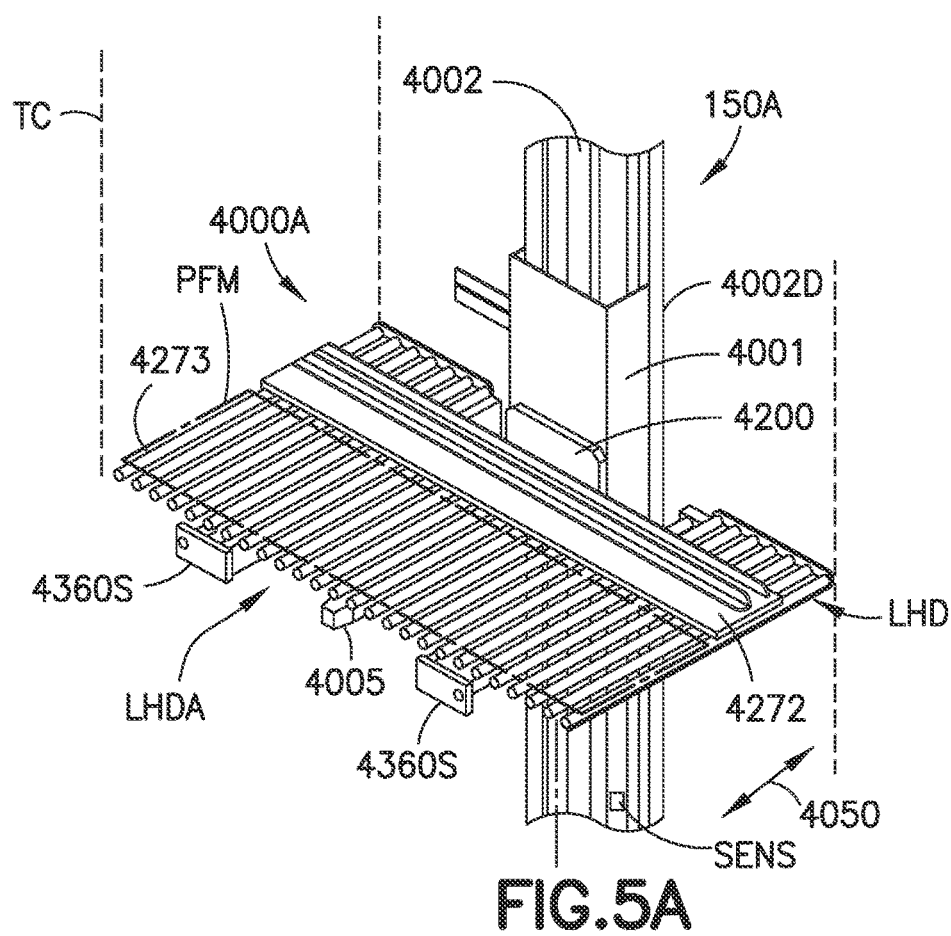
FIGS. 5A, 5B, 5C, 5D and 5E are schematic illustrations of portions of the storage and retrieval system in accordance with aspects of the disclosed embodiment.
Figure 5B:
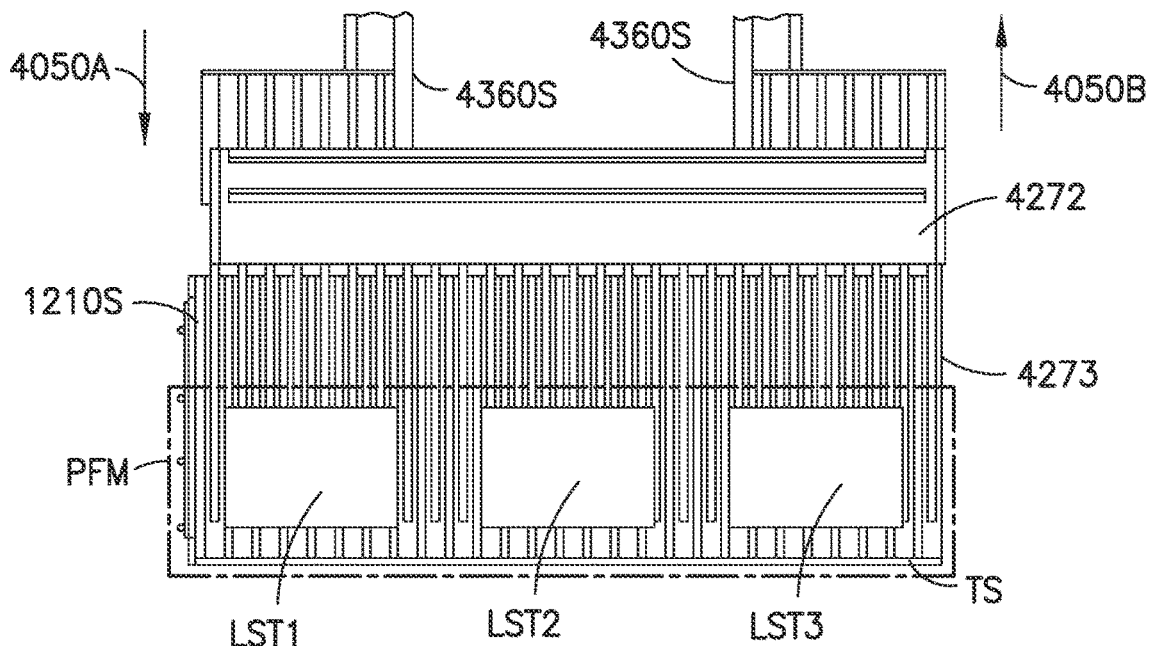
Figure 5C:
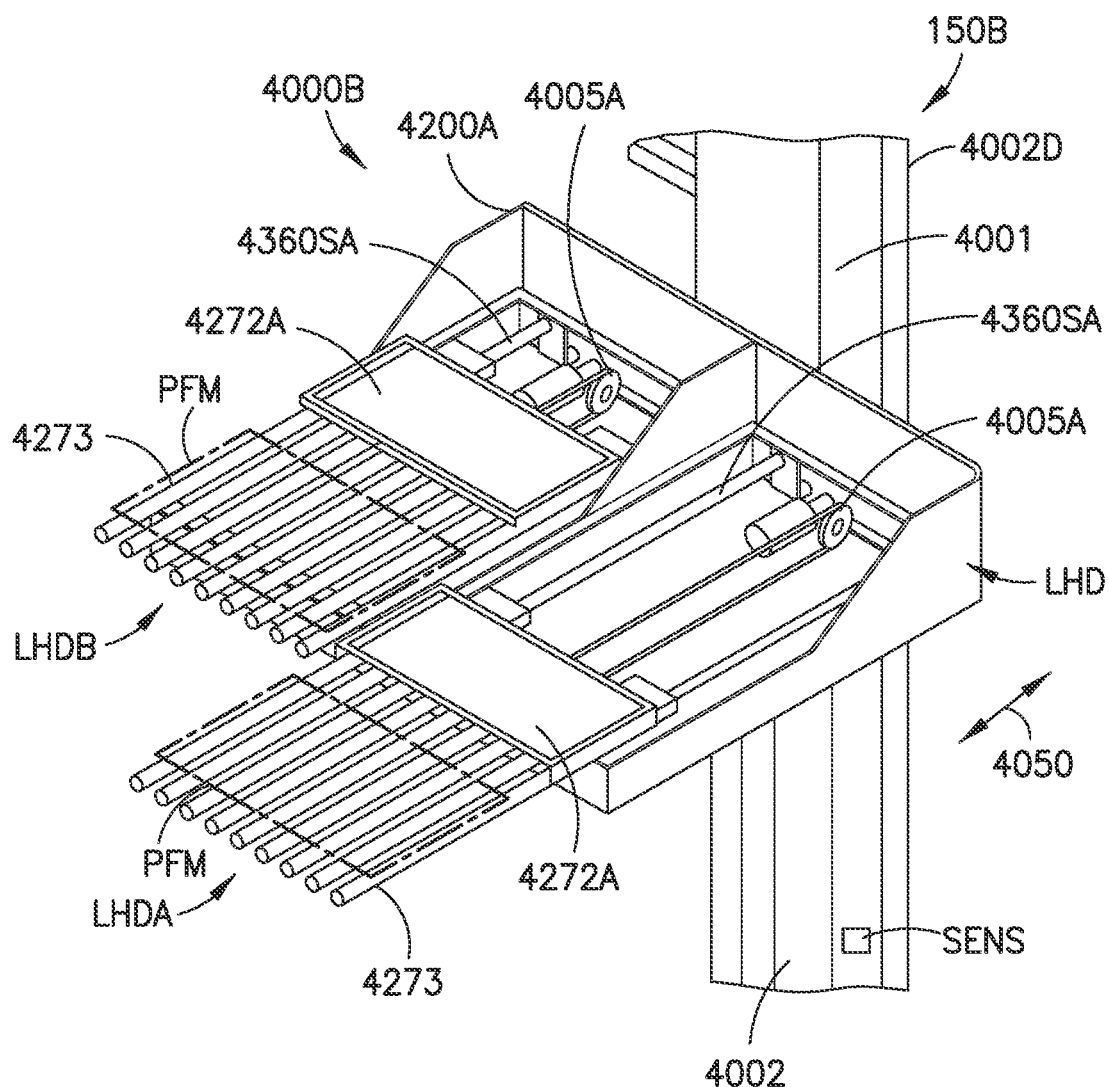

Referring now to FIGS. 5A, 5B and 5C, as described above, in one aspect the interface stations TS are passive stations and as such the load transfer device LHD of the lifts 150A, 150B have active transfer arms or pick heads 4000A, 4000B. In one aspect the lifts 150 communicating between the input and output conveyors 160CA, 160CB and one or more of the interface station(s) TS (which in one aspect include stacked transfer rack shelves RTS) of the stacked deck levels 130B are reciprocating lifts, e.g. the lifts bi-directionally travel in the Z direction (relative to a reference frame of the lift as shown in FIG. 5C) linearly along a single straight line path. The lifts 150 are unconstrained in their rate of travel in the Z direction and are high speed lifts (rather than a continuous motion or paternoster type lift) where a transfer rate or speed of the lift is not a delimiting factor in the transfer of case units to and from the storage and retrieval system. For example, a case unit transfer transaction rate of the lifts 150 is substantially equal to a case unit transfer transaction rate of the bots 110. As may be realized, while the input and output lifts 150A, 150B are described as vertically reciprocating lifts it should be understood that in other aspects the input and output lifts 150A, 150B are any suitable pickface transport system for transporting case pickfaces to and from the storage structure 130. For example, in other aspects the lift modules 150A, 150B are one or more of vertically reciprocating lifts, any suitable automated material handling systems, conveyors, bots, turntables, roller beds, multilevel vertical conveyor (e.g. paternoster conveyor) that operate synchronously or asynchronously.

As described herein, the lifts 150 traverse and connect more than one level 130L of the multilevel transfer decks 130B and are arranged for lifting and lowering a pickface from the multilevel transfer decks 130B. As also described herein, multi-loads placed at, for example, the interface stations TS are picked with load handling devices LHD of the lifts 150 and transported by the lifts 150 in a single pass/traverse of the multiple deck levels 130B to an off load conveyor station, such as outbound conveyor 160CB. As noted herein, the multi-load pick, in one aspect, is a common pick from a common interface station TS (effected with the common load handling device LHD or by multiple independent load handling devices LHD) so that the multi-load pick is effected in one lift stop. In other aspects, the multi-load is picked from different interface stations TS at different levels 130L of the multilevel transfer decks 130B, and hence with multiple lift stops, but still within a single pass/traverse of the multiple deck levels (e.g. with no change in lift travel direction and/or cyclic motion). As will be described further herein, the case loads/pickfaces delivered to the output stations 160UT by the lifts 150 are considered to form a case load stream (e.g. where each lift 150 produces one case load stream).

Referring to, for example, FIGS. 5A-5E, in one aspect, the pick heads (such as pick heads 4000A, 4000B, 4000C, 4000D) of each lift 150 include a multi-load (e.g. multiple pickfaces carried together as a single load or unit) platform (such a load handling device LHD) that is configured for a common multi-load lifting/lowering (e.g. relative to, for example, the multiple levels 130L of the storage and retrieval system). In one aspect, the pick head 4000A, 4000B, 4000C, 4000D effects a multi-load pick (e.g. from a common interface station with a common/single load handling device LHD or with multiple independently operable load handling devices LHDs). In another aspect, the pick head 4000A, 4000B, 4000C, 4000D effects multiple independent load picks (e.g. such as from different interface stations TS arranged on difference levels 130L of the storage and retrieval system) in a single pass/traverse to an off load conveyor station(s) (e.g. such as outbound conveyors 160CB—FIG. 1) or any other suitable pickface holding/transport stations. Accordingly, multi-loads are positioned at each or in other aspects, one or more, interface stations TS for picking by the lift 150(*s*). As may be realized, the multi-load(s) at each or any interface station TS is picked by a load handling device LHD of the lift 150 and transported by the lift 150 in a single pass/traversal of the pick head 4000A, 4000B relative to the levels 130L of the storage and retrieval system to, for example, the output conveyor 160CB of output station(s) 160UT or other suitable pickface holding/transport station. As noted above, the multi-load pick is, in one aspect, a common pick from a common interface station TS (effected with the common load handling device or by multiple independent load handling devices LHDs so that the multi-load pickface is effected in one stop of the pick head 4000A, 4000B). In other aspects, the multi-load pick is picked from different interface stations TS at different level 130L of the storage and retrieval system, and hence multiple stops (but still having with a single pass/traverse—e.g. no change in direction or cyclic motion of the pick head 4000A, 4000B).

In one aspect the inbound lift modules 150A and the outbound lift modules 150B have different types of pick heads (as will be described below) while in other aspects the inbound lift modules 150A and the outbound lift modules 150B have the same type of pick head similar to one of the pick heads described below (e.g. both the lifts 150A, 150B have pick head 4000A or both lifts 150A, 150B have pick head 4000B). For example, both the inbound and outbound lift modules 150A, 150B have a vertical mast 4002 (while one mast is illustrated, in other aspects there are multiple masts). The vertical mast(s) 4002 spans between a base level BL (FIG. 3B), such as where, for example, the input and output conveyors 160CA, 160CB of the input and output stations 160IN, 160UT are located, and any desired decks or storage levels 130L of the multi-level storage array. One or more carriage(s) or slide(s) 4001 travel along the vertical mast(s) 4002 under the motive force of any suitable drive unit 4002D (e.g. connected to, for example, control server 120) configured to lift and lower the slide (and the pick head 4000A, 4000B mounted thereto) between the base level BL and any desired interface station shelf at a desired storage level 130L. The drive unit 4002D is one or more of a chain drive, a belt drive, a screw drive, a linear actuator, a solid state drive or any other drive capable of linearly driving the slide(s) and pick heads 4000A, 4000B mounted thereto along the mast(s) 4002.

As may be realized, the lifts 150 include any suitable pick head positioning system for positioning the pick head(s) 4000A, 4000B relative to the interface station TS shelves. For example, any suitable encoders or position sensors SENS are provided which, along with control server 120, provide for position determination of the pick head(s) 4000A, 4000B relative to the interface station TS shelves and input/output conveyors 160CA, 160CB. For example, the control server 120 provides control signals to the lift drives 4002D, 4005, 4005A. The control server 120 also receives signals from the position sensors SENS as the pick head(s) move along the mast 4002 and determines, based on the signals a location of the pick heads relative to the interface station TS shelves. The control server 120 stops the pick head(s) at a predetermined interface station shelf based on the sensor SENS signals and effects extension of the load handling device LHD as will be described in greater detail below to pick or place one or more case unit(s) to the interface station TS shelves.

As noted above, the inbound lift module(s) 150A include a pick head 4000A that is movably dependent from the mast(s) 4002, such as by being mounted to the slide(s) 4001 so that as the slide(s) moves vertically the pick head 4000A moves vertically with the slide(s) 4001. In this aspect the pick head 4000A includes a pick head portion or effector LHDA having one or more tines or fingers 4273 mounted to a base member 4272 so as to form a platform PFM for housing loads. The fingers 4273 are configured to pass through or otherwise between the slats 1210S of the interface stations TS shelves for transferring one or more case unit(s) between the load handling device LHD and the shelves (as will be described in greater detail below). The base member 4272 is movably mounted to one or more rail 4360S of frame 4200 which in turn is mounted to the slide 4001. Any suitable drive unit 4005, such as a belt drive, chain drive, screw drive, gear drive, etc. (which is substantially similar in form but may not be similar in capacity to drive 4002D as the drive 4005 may be smaller than drive 4002D) is mounted to the frame 4200 and coupled to the base member 4272 for driving the base member 4272 (with the finger(s), i.e. the effector LHDA) in the direction of arrow 4050 (e.g. the Y direction relative to a lift reference frame REFL). The load platform PFM includes one or more load stations LST1-LST3, each being arranged for holding a case unit(s)/tote or pickface thereon. In one aspect each platform PFM is illustrated has having three load stations LST1-LST3 but in other aspects the platforms have more or less than three load stations. Each of the case unit(s)/tote or pickface in the one or more load stations LST1-LST3 is transferred to and from the lift 150 as a unit but it should be understood that where there are multiple case unit(s)/tote(s) in a load station (e.g. a pickface) the pickface, in one aspect is broken up so that one or more case units that form the pickface are distributed to a different section of the storage level 130L than other case unit(s) of that pickface while in other aspects the pickface may be placed within a storage space 130S as a unit in the manner described, for example, in U.S. patent application Ser. No. 14/997,892, filed on Jan. 18, 2016 and U.S. Provisional Patent Application No. 62,104,513 filed on Jan. 16, 2015, the disclosures of which were previously incorporated herein by reference in their entireties.

The outbound lift module(s) 150B also include a pick head 4000B mounted to the slide 4001 so that as the slide moves vertically the pick head 4000B moves vertically with the slide 4001. In this aspect the pick head 4000B includes one or more pick head portions or effectors LHDA, LHDB (which are each substantially similar to pick head 400A) each having one or more tines or fingers 4273 mounted to a respective base member 4272A. Each base member 4272A is movably mounted to one or more rail 4360SA of frame 4200A which in turn is mounted to the slide 4001. Any suitable drive unit(s) 4005A, such as a belt drive, chain drive, screw drive, gear drive, etc. is mounted to the frame 4200A and coupled to a respective base member 4272A for driving the respective base member 4272A (with the finger(s)) in the direction of arrow 4050 (each effector has a respective drive unit so that each effector is independently movable in the direction of arrow 4050). While two effectors LHDA, LHDB are illustrated on pick head 4000B the pick head 4000B includes any suitable number of effectors that correspond to a number of case unit/pickface holding locations of, for example, the interface stations TS so that case units/pickfaces are individually picked from the interface stations TS are described in greater detail below.

Figure 5D:
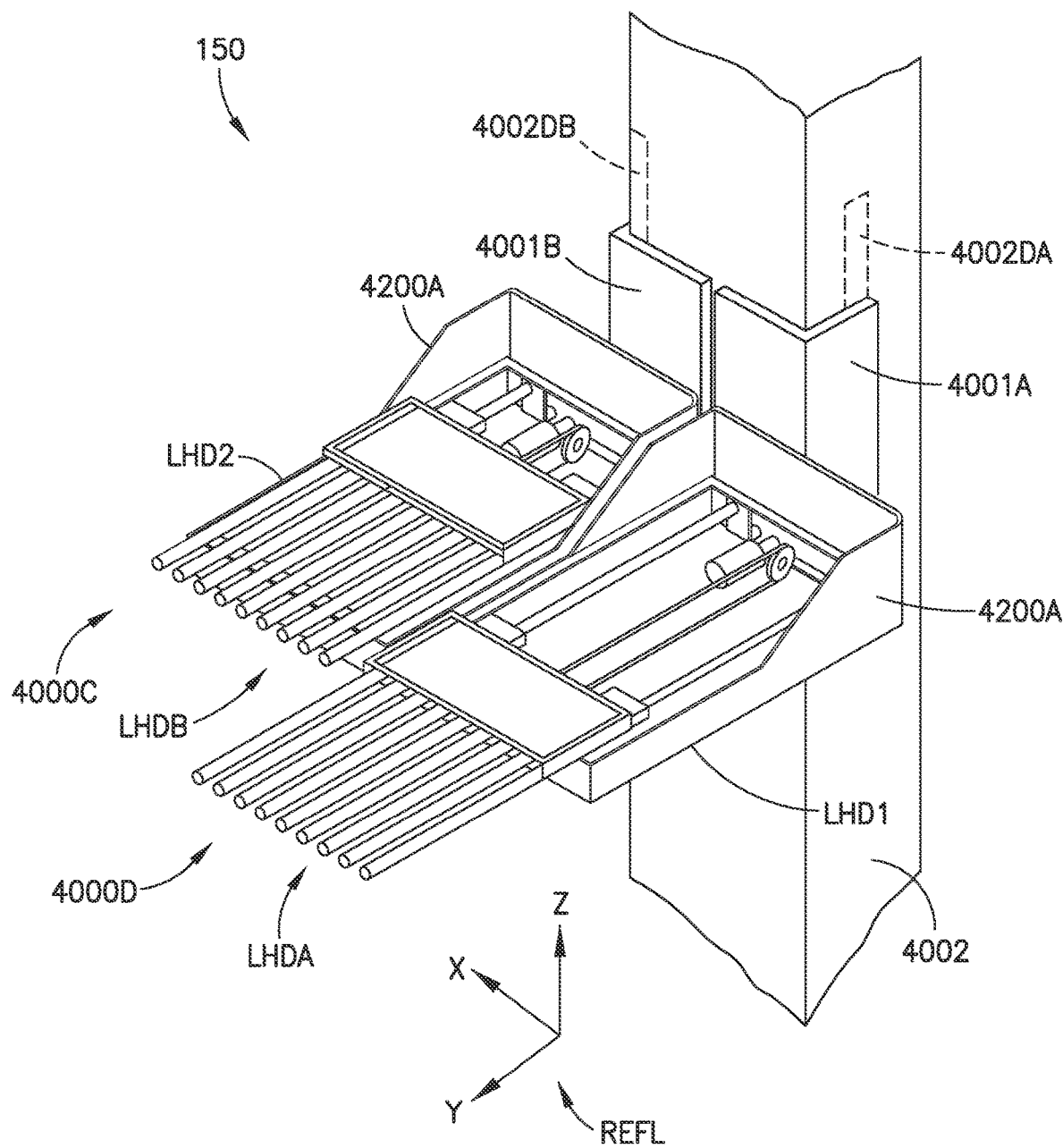

In one aspect, referring also to FIG. 5D, one or more of the input and output lifts 150 includes multiple pick heads 4000C, 4000D each mounted to a corresponding carriage or slide 4001A, 4001B. Each of the slides 4001A, 4001B (and the pick head mounted thereto) is mounted to the mast 4002 so as to be independently moveable in the Z direction by a respective drive 4002DA, 4002DB (which is substantially similar to drive 4002D described above). While each pick head 4000C, 4000D illustrated in FIG. 5D includes a single load handling device it should be understood that one or more of the pick heads, in other aspects, 4000C, 4000D includes multiple independently actuated load handling devices in a manner similar to pick head 4000B. As may also be realized, suitable clearance is provided between each of the slides 4001A, 4001B and the pick head(s) mounted thereto so that each pick head is provided with the full stroke of travel (e.g. from the base level BL (FIG. 3A) to, for example, the interface station shelves at the top storage level 130L) along the mast 4002 as desired.

In another aspect each load handling device LHD, as described above, of the lifts 150A, 150B is configured to sort one or more case units onboard the load handling device for building pickfaces on the load handling device. For example, referring to FIG. 5E the carriage 4200B includes a frame 4110F having a payload section 4110PL. The payload section 4110PL of the load handling device LHD includes a payload bed 4110PB, a fence or datum member 4110PF, a transfer arm LHDA and a pusher bar or member 4110PR. In one aspect the payload bed 4110PB includes one or more rollers 4110RL that are mounted to the frame 110F so as to be substantially parallel with the fingers 4273A-4273E where one or more case units carried within the payload section 110PL can be moved in the X direction (e.g. justified with respect to a predetermined location of the frame/payload section and/or a datum reference of one or more case units in the lift frame of reference REFL) to position the case unit at a predetermined position within the payload section 4110PL and/or relative to other case units within the payload section 4110PL (e.g. side to side justification of case units as opposed to fore/aft as defined by the direction of extension of the transfer arm LHDA as described below, e.g. in the Y direction relative to the lift frame of reference). In one aspect the rollers 4110RL may be driven (e.g. rotated about their respective axes) by any suitable motor for moving the case units within the payload section 4110PL. In other aspects the load handling device LHD includes one or more side justification movable pusher bar (not shown) for pushing the case units over the rollers 4110RL for moving the case unit(s) to the predetermined position within the payload section 4110PL along the X direction. The side justification movable pusher bar may be substantially similar to that described in, for example, U.S. patent application Ser. No. 13/326,952 filed on Dec. 15, 2011, the disclosure of which was previously incorporated by reference herein in its entirety. The pusher bar 4110PR is movable in the Y direction, relative to the lift reference frame REFL to effect, along with the fence 4110PF and or pick head 4270 of the transfer arm LDHA, a fore/aft justification of case unit(s) within the payload area 4110PL in the manner described in U.S. Provisional Patent Application No. 62/107,135 filed on Jan. 23, 2015, previously incorporated herein by reference in their entireties.

Figure 5E:
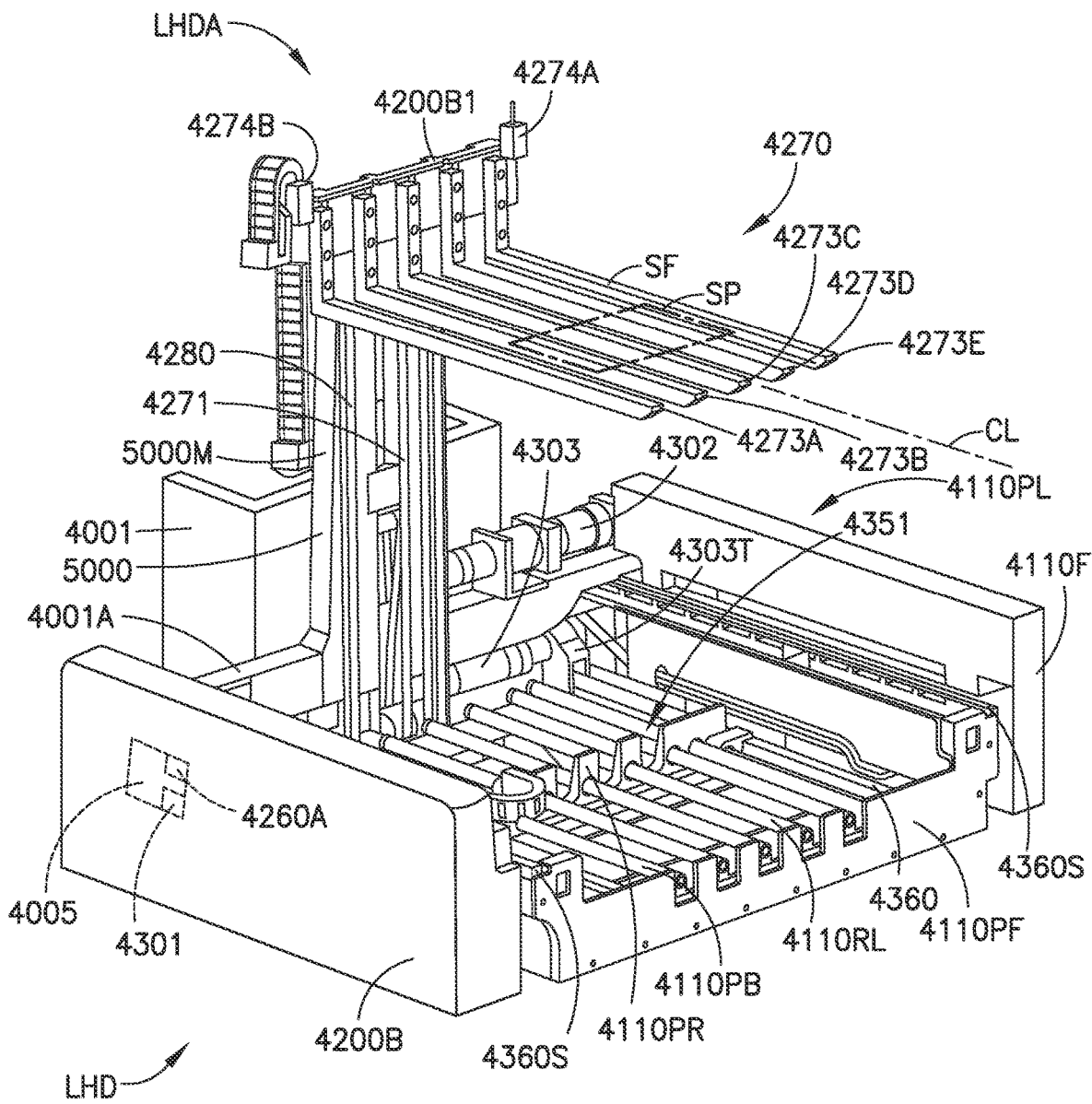

Still referring to FIG. 5E, the case units are placed on the payload bed 4110PB and removed from the payload bed 4110PB with the transfer arm LHDA. The transfer arm LHDA includes a lift mechanism or unit 5000 located substantially within the payload section 4110PL as described in, for example, U.S. Provisional Patent Application No. 62/107,135 filed on Jan. 23, 2015, previously incorporated herein by reference in their entireties. The lift mechanism 5000 provides, in addition to or in lieu of movement of the carriage 4200B in the Z direction, both gross and fine positioning of pickfaces carried by the load handling device LHD which are to be lifted vertically into position in the storage structure 130 for picking and/or placing the pickfaces and/or individual case units to and from the shelves of the interface stations TS.

The lift mechanism 5000 is configured so that combined moves are performed (e.g. combined substantially axis simultaneous movement of the pusher bar 4110PR, lift mechanism 5000, pick head extension and fore/aft justification mechanism(s)), so that different/multi-sku or multi-pick payloads are handled by the lift 150. In one aspect, the actuation of the lifting mechanism 5000 is independent of actuation of the pusher bar 4110PR as will be described below. The decoupling of the lift mechanism 5000 and pusher bar 4110PR axes provides for combined pick/place sequences effecting a decreased pick/place cycle time, increased storage and retrieval system throughput and/or increased storage density of the storage and retrieval system as described above. For example, the lift mechanism 5000 provides for lifting case units from the payload bed 4110PL of the load handling device LHD to allow for sorting and justifying case units to predetermined positions on the payload bed 41110PL and thus on the transfer arm LHDA. In one aspect the case units are lowered on the payload bed if sorting or justification is desired, otherwise the transfer arm LHDA may remain at least partially lifted to allow the arm to extend and retract for picking/placing case units to/from the interface stations TS without a secondary lifting of the transfer arm LHDA above the fence 4110PF in addition to, for example, traversal of the load handling device LHD along the mast(s) 4002.

The lifting mechanism 5000 may be configured in any suitable manner so that a pick head 4270 of the load handling device LHD bi-directionally (e.g. reciprocates) moves along the Z axis (e.g. in the Z direction). In one aspect, the lifting mechanism 5000 includes a mast 5000M and the pick head 4270 is movably mounted to the mast 4200M in any suitable manner. The mast 4200M is movably mounted to the frame 4110F in any suitable manner so as to be movable along the Y direction. In one aspect the frame includes guide rails 4360S to which the mast 4200M is slidably mounted. A transfer arm drive 4005 may be mounted to the frame for effecting at least movement of the transfer arm LHDA along the Y direction and the Z direction. In one aspect the transfer arm drive 4005 includes an extension motor 4301 and a lift motor 4302. The extension motor 4301 may be mounted to the frame 4110F and coupled to the mast 4200M in any suitable manner such as by a belt and pulley transmission 4260A, a screw drive transmission (not shown) and/or a gear drive transmission (not shown). The lift motor 4302 may be mounted to the mast 4200M and coupled to pick head 4270 by any suitable transmission, such as by a belt and pulley transmission 4271, a screw drive transmission (not shown) and/or a gear drive transmission (not shown). As an example, the mast 4200M includes guides, such as guide rails 4280, along which the pick head 4270 is mounted for guided movement in the Z direction along the guide rails 4280. In other aspects the pick head 4270 is mounted to the mast in any suitable manner for guided movement in the Z direction. With respect to the transmissions In other aspects any suitable linear actuators are used to move the pick head in the Z direction. The transmission 260A for the extension motor 301 is substantially similar to that described herein with respect to transmission 271.

Still referring to FIG. 5E the pick head 4270 of the load handling device LHD transfers case units between the load handling device LHD and interface stations TS (see e.g. FIG. 3A) and in other aspects substantially directly between the bot 110 and a lift module(s) 150. In one aspect, the pick head 4270 includes a base member 4200B1, one or more tines or fingers 4273A-4273E and one or more actuators 4274A, 4274B. The base member 4200B1 is mounted to the mast 4200M, as described above, so as to ride along the guide rails 4280. The one or more tines 4273A-4273E are mounted to the base member 4200B1 at a proximate end of the tines 4273A-4273E so that a distal end of the tines 4273A-4273E (e.g. a free end) is cantilevered from the base member 4200B1. Referring again to FIG. 1A, the tines 4273A-4273E are configured for insertion between slats 1210S that form the case unit support plane CUSP of the interface station TS shelves.

One or more of the tines 4273A-4273E is movably mounted to the base member 4200B1 (such as on a slide/guide rail similar to that described above) so as to be movable in the Z direction. In one aspect any number of tines are mounted to the base member 4200B1 while in the aspect illustrated in the figures there are, for example, five tines 4273A-4273E mounted to the base member 4200B1. Any number of the tines 4273A-4273E are movably mounted to the base member 4200B1 while in the aspect illustrated in the figures, for example, the outermost (with respect to a centerline CL of the pick head 4270) tines 4273A, 4273E are movably mounted to the base member 4200B1 while the remaining tines 4273B-4273D are immovable relative to the base member 4200B1.

In this aspect the pick head 4270 employs as few as three tines 4273B-4273D to transfer smaller sized case units (and/or groups of case units) to and from the load handling device LHD and as many as five tines 4273A-4273E to transfer larger sized case units (and/or groups of case units) to and from the load handling device LHD. In other aspects, less than three tines are employed (e.g. such as where more than two tines are movably mounted to the base member 4200B1) to transfer smaller sized case units. For example, in one aspect all but one tine 4273A-4273E is movably mounted to the base member 4200B1 so that the smallest case unit being transferred to and from the load handling device without disturbing other case units on, for example, the shelves of the interface stations has a width of about the distance X1 between slats 1210S (see FIG. 1A).

The immovable tines 4273B-4273D define a picking plane SP of the pick head 4270 and are used when transferring all sizes of case units (and/or pickfaces) while the movable tines 4273A, 4273E are selectively raised and lowered (e.g. in the Z direction with the actuators 274A, 274B) relative to the immovable tines 4273B-4273D to transfer larger case units (and/or pickfaces). Still referring to FIG. 5E an example is shown where all of the tines 4273A-4273E are positioned so that a case unit support surface SF of each tine 4273A-4273E is coincident with the picking plane SP of the pick head 4270 however, as may be realized, the two end tines 4273A, 4273E are movable so as to be positioned lower (e.g. in the Z direction) relative to the other tines 4273B-4273D so that the case unit support surface SF of tines 4273A, 4273E is offset from (e.g. below) the picking plane SP so that the tines 4273A, 4273E do not contact the one or more case units carried by the pick head 4270 and do not interfere with any unpicked case units positioned in predetermined case unit holding locations on the interface station TS shelves.

The movement of the tines 4273A-4273E in the Z direction is effected by the one or more actuators 4274A, 4274B mounted at any suitable location of the transfer arm LHDA. In one aspect, the one or more actuators 4274A, 4274B are mounted to the base member 4200B1 of the pick head 4270. The one or more actuators are any suitable actuators, such as linear actuators, capable of moving one or more tines 4273A-4273E in the Z direction. In the aspect illustrated in, for example, FIG. 5E there is one actuator 4274A, 4274B for each of the movable tines 4273A, 4273E so that each moveable tine is independently movable in the Z direction. In other aspects one actuator may be coupled to more than one movable tine so that the more than one movable tine move as a unit in the Z direction.

As may be realized, movably mounting one or more tines 4273A-4273E on the base member 4200B1 of the pick head 4270 provides for full support of large case units and/or pickfaces on the pick head 4270 while also providing the ability to pick and place small case units without interfering with other case units positioned on, for example, the shelves of interface stations TS. The ability to pick and place variably sized case units without interfering with other case units at the interface stations reduces a size of a gap G (FIG. 6) between case units on the interface stations shelves Referring again to FIG. 5E, it is again noted that the pusher bar 4110PR is movable independent of the transfer arm LHDA. The pusher bar 4110PR is movably mounted to the frame 4110F in any suitable manner such as by, for example, a guide rod and slide arrangement and is actuated along the Y direction (e.g. in direction substantially a parallel to the extension/retraction direction of the transfer arm LHDA). In one aspect at least one guide rod 4360 is mounted within the payload section 4110PL for guiding movement of the pusher 4110PR in the Y direction. In one aspect, at least the guide rod/slide arrangement holds the pusher bar 4110PR captive within the payload section 4110PL. The pusher bar 4110PR is actuated by any suitable motor and transmission, such as by motor 4303 and transmission 4303T. In one aspect the motor 4303 is a rotary motor and the transmission 4303T is a belt and pulley transmission. In other aspects the pusher bar 110PR may be actuated by a linear actuator having substantially no rotary components.

The pusher bar 4110PR is arranged within the payload section 4110PL so as to be substantially perpendicular to the rollers 4110RL and so that the pusher bar 4110PR does not interfere with the pick head 4270 (the pusher bar 4110PR includes slots 4351 into which the fingers 4273A-4273E pass when lowered into the payload bed 4110PB where the slots 4351 are sized to allow unhindered movement of the pusher bar relative to the fingers 4273A-4273E). The pusher bar 4110PR also includes one or more apertures through which the rollers 4110RL pass where the apertures are sized to allow free rotation of the rollers about their respective axes. As may be realized, the independently operable pusher bar 4110PR does not interfere with the rollers 4110PR, extension of the transfer arm LHDA in the transverse direction (e.g. Y direction) and the lifting/lowering of the pick head 4270.

As may be realized, the lift modules 150A, 150B are under the control of any suitable controller, such as control server 120, such that when picking and placing case unit(s) the pick head is raised and/or lowered to a predetermined height corresponding to a shelf of an interface station TS at a predetermined storage level 130L. At the interface stations TS the pick head 4000A, 4000B, 4270 or individual portion thereof (e.g. effector LHDA, LHDB), corresponding to one or more case unit holding location(s) of the interface station TS from which one or more case unit(s) are being picked, is extended so that the fingers 4273 are interdigitated between the slats 1210S (as illustrated in FIG. 5B) underneath the case unit(s) being picked. The lift 150A, 150B raises the pick head 4000A, 4000B, 4270 to lift the case unit(s) from the slats 1210S and retracts the pick head 4000A, 4000B, 4270 for transport of the case unit(s) to another level of the storage and retrieval system, such as for transporting the case unit(s) to output station 160UT. Similarly, to place one or more case unit(s) the pick head 4000A, 4000B, 4270 or individual portion thereof (e.g. effector LHDA, LHDB), corresponding to one or more case unit holding location(s) of the interface station TS from which one or more case unit(s) are being placed, is extended so that the fingers 4273 are above the slats. The lift 150A, 150B lowers the pick head 4000A, 4000B, 4270 to place the case unit(s) on the slats 1210S and so that the fingers 4273 are interdigitated between the slats 1210S underneath the case unit(s) being picked.

An example of a lift 150 case unit(s) transfer transaction including a case unit(s) multi-pick and place operation and on the fly sortation of the case units for creating a mixed pallet load MPL (as shown in FIG. 2) according to a predetermined order/load out sequence and/or in the predetermined order sequence (e.g. an order/load out sequence) of picked items according to, for example, an order, fulfilling one or more customer orders, in which case units CU are sequenced for placement in one or more bag(s), tote(s) or other container(s) TOT at an operator station 160EP (as shown in FIG. 14) as will be described with respect to FIGS. 5A-5E, 6 and 7-7E in accordance with aspects of the disclosed embodiment. In one aspect, the control server 120 is configured to one or more of command the bot 110, and effect with the bot 110 outbound flow (e.g. fulfillment stream) sortation of case order(s) independent of the pick order of cases from the storage area by the bot 110 forming a pickface (as described in U.S. patent application Ser. No. 14/997,892, filed on Jan. 18, 2016, previously incorporated by reference herein by reference), and command the lift(s) 150 and effect with the lift(s) 150 outbound flow (e.g. fulfillment stream) sortation of case orders independent of the order in which the case units were placed at, for example the transfer station(s) IS (or buffer stations BS) by the bot 110 (as described in U.S. patent application Ser. No. 14/997, 902, filed on Jan. 18, 2016, previously incorporated herein by reference). In one aspect, the bot controller 110C is configured to command the bot 110, and effect with the bot 110 outbound flow sortation of case order(s) independent of the pick order of cases from the storage area by the bot 110 forming a pickface. In still other aspects, the control server 120 and the bot controller 110C are both configured to command the bot 110, and effect with the bot 110 outbound flow sortation of case order(s) independent of the pick order of cases from the storage area by the bot 110 forming a pickface. Thus, in one aspect, the control server 120 and/or the bot controller 110C is/are configured to set the outbound case flow, at least in part with bot 110 sortation of the cases carried in common by the bot 110 and decoupled from the pick order of the cases by the bot 110 from storage. This may be referred to for description purposes as outbound flow sortation with the bot at transfer stations (and/or at buffer stations). In another aspect, the control server 120 and/or the lift(s) 150 is/are configured to set the outbound case flow, at least in part with lift 150 sortation of the cases carried in common by the lift 150 and decoupled from the pick order of the cases by the lift from the transfer stations TS (or buffer stations BS). This may be referred to for description purposes as outbound flow sortation with the lift at transfer stations (and/or at buffer stations).

In one aspect, multiple transfer decks 130B are provided and arrayed at different levels so as to define multilevel decks in the manner described above (FIG. 6A, Block 900). One or more bots 110 are disposed on each of the multilevel decks 130B, as described above, for holding and transporting pickfaces on each deck 130B (FIG. 6A, Block 910). The pickfaces are lifted and/or lowered from the multilevel decks 130B in accordance with a load out sequence, in a manner substantially similar to that described below, with at least one outbound lift 150B that traverses and connects more than one level of the multilevel decks 130B (FIG. 6A, Block 920). As may be realized, each load out (truck load, pallet load, etc. filled with cases from the storage and retrieval system 100) from the distribution center or warehouse, e.g. in which the storage and retrieval system 100 is located, has a predetermined sequence or order of caseloads (of single cases or combined cases) in which the case loads are integrated to fill the load out (e.g. the load out order sequence which is defined in any suitable manner such as that described in U.S. patent application Ser. No. 13/654,293 filed on Oct. 17, 2012 (now U.S. Pat. No. 8,965,559), previously incorporated herein by reference in its entirety, and/or a rules based system that is based on customer criteria, off load criteria or any other suitable criteria. As will be described below, transfer of the pickfaces (e.g. case loads) between the bot 110 and the at least one outbound lift 150B is effected with at least one transfer station IS (or buffer station BS) on each deck that interfaces between the bot 110 on a respective transfer deck 130B and the at least one outbound lift 150B (FIG. 6A, Block 930). In one aspect, each outbound lift 150B defines at least one case load stream of an order fulfillment stream (which may also be referred to as an outbound stream/flow or order fulfillment) that includes mixed case pickfaces outbound from the multilevel decks 130B to a load out fill or load fill where at least one case load stream of the fulfillment stream is arranged in an ordered sequence of streaming pickfaces related to the predetermined sequence of the load out fill (e.g. the individual case load streams of the lifts 150B form an order fulfillment stream corresponding to the load out fill) (FIG. 6A, Block 940). As may be realized, the at least one transfer station TS (or buffer station BS) on at least one of the multilevel decks commonly supports more than one of the mixed case pickfaces (e.g. that define a portion of the streaming pickfaces in the ordered sequence of streaming pickfaces) based on, for example, a predetermined sequence of the load out fill. In one aspect the interface station TS (or buffer station BS) forms a common pickface transfer interface for the at least one outbound lift 150B, so that the commonly supported pickfaces are picked in common with the at least one outbound lift 150B. In one aspect, the interface stations TS (or buffer stations BS) commonly support more than one of the mixed case pickfaces in an ordered sequence based on the predetermined sequence of the load out fill. As may be realized, any suitable controller, such as controller 120 is in communication with the one or more bots 110 and is configured to effect placement of pickfaces on the at least one transfer station IS (or buffer station BS) based on the ordered sequence of streaming pickfaces. In one aspect the ordered sequence of streaming pickfaces is based on another fulfillment stream of, for example, another outbound lift 150B. As may be realized, if there is more than one case load stream (e.g. from multiple outbound lifts 150B), the case loads of each case load stream are in a corresponding order sequence related to the predetermined sequence of the load out fill, as well as to each other, to provide a coordinated and harmonized integration of the case loads in each stream in the load out fill (e.g. the individual case load streams are combined according to the predetermined sequence of the load out fill to form the order fulfillment stream where the first ordered sequence of streaming pickfaces from a first lift complements the second ordered sequence of streaming pickfaces from a second lift) (FIG. 6A, Block 950). In one aspect, the ordered sequence of the case loads in each case load stream is defined by the ordered sequence of the multi-case loads of each load out (e.g. outbound) stroke of the outbound lift 150B generating/feeding the case load stream (e.g. see FIG. 1B where the sequencing 174 is performed by the vertical case transport 173 of the outbound lifts 150B). In one aspect, the fulfillment stream sortation for each sortation system/method, as described herein, is based, at the sortation itself, on another fulfillment stream so that the sortation with the bot 110 at the transfer station TS (or buffer station BS) is dependent on a sequence of another fulfillment stream (such as by another bot at the same or a different transfer station TS), and the sortation by the lift 150 is dependent on another fulfillment stream (such as by another lift 150).

Figure 6:
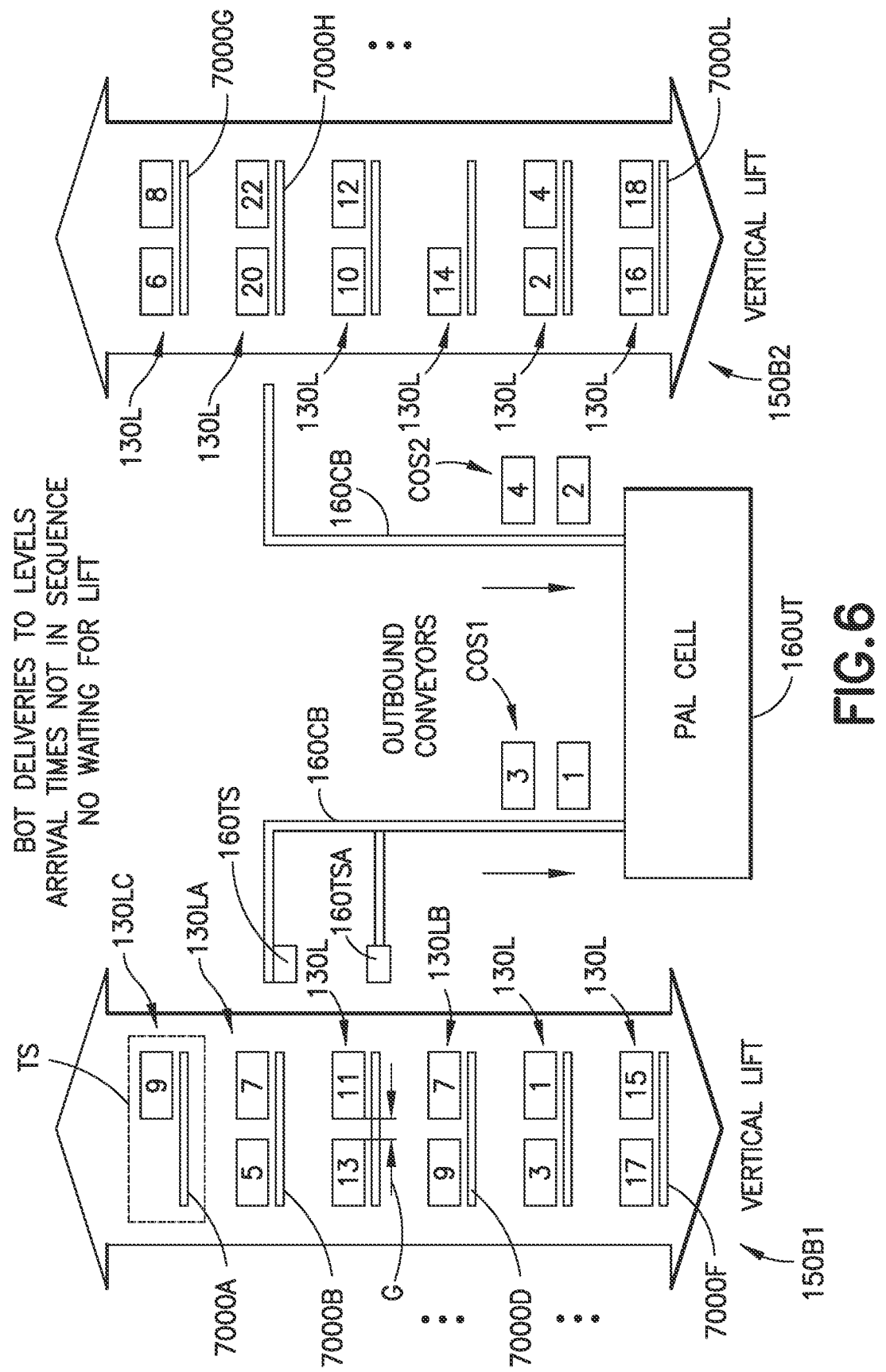
FIG. 6 is a schematic illustration of a portion of the storage and retrieval system in accordance with aspects of the disclosed embodiment.
Figure 6A:
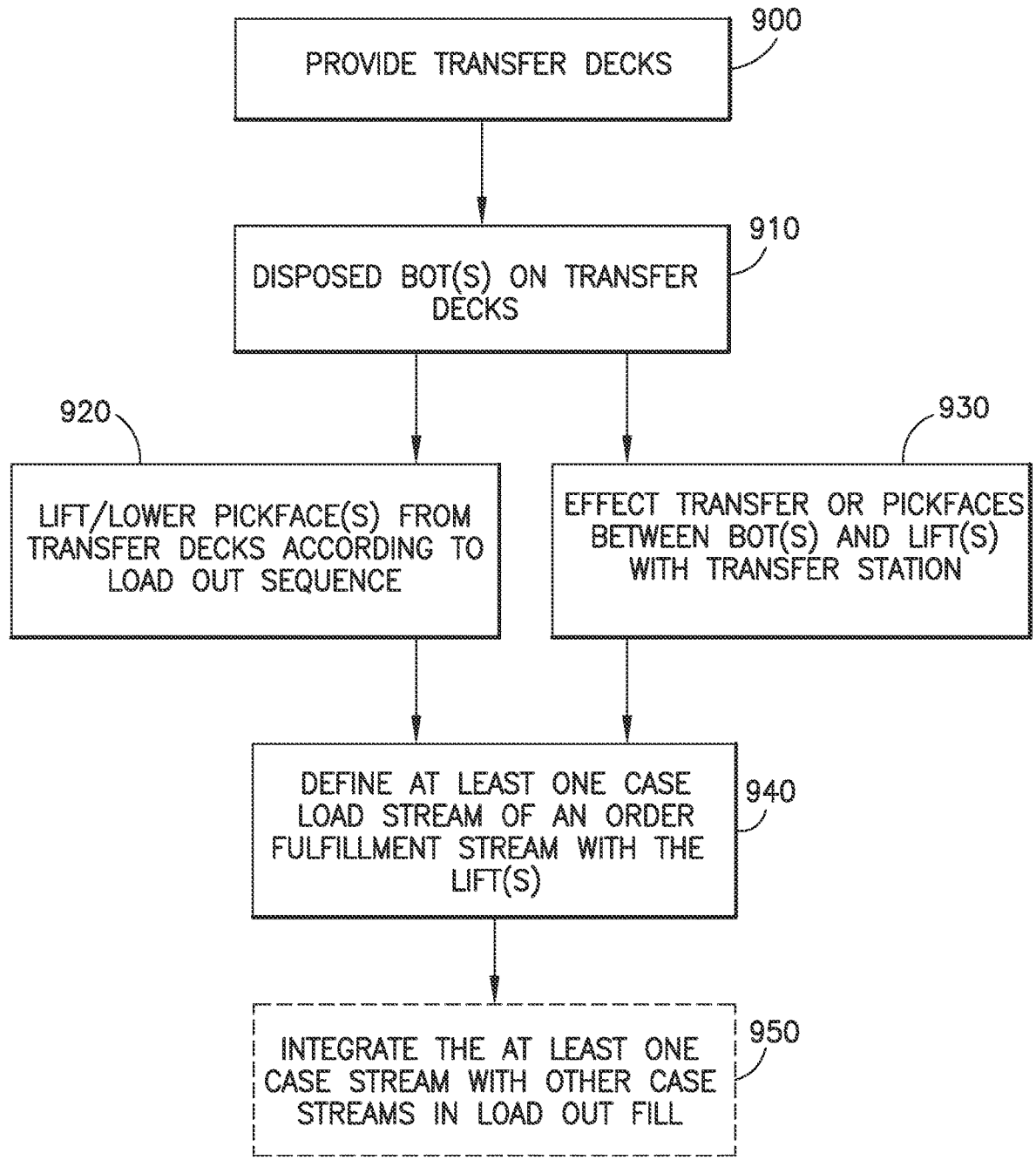
FIG. 6A is a flow diagram in accordance with aspects of the disclosed embodiment.
Figure 7:
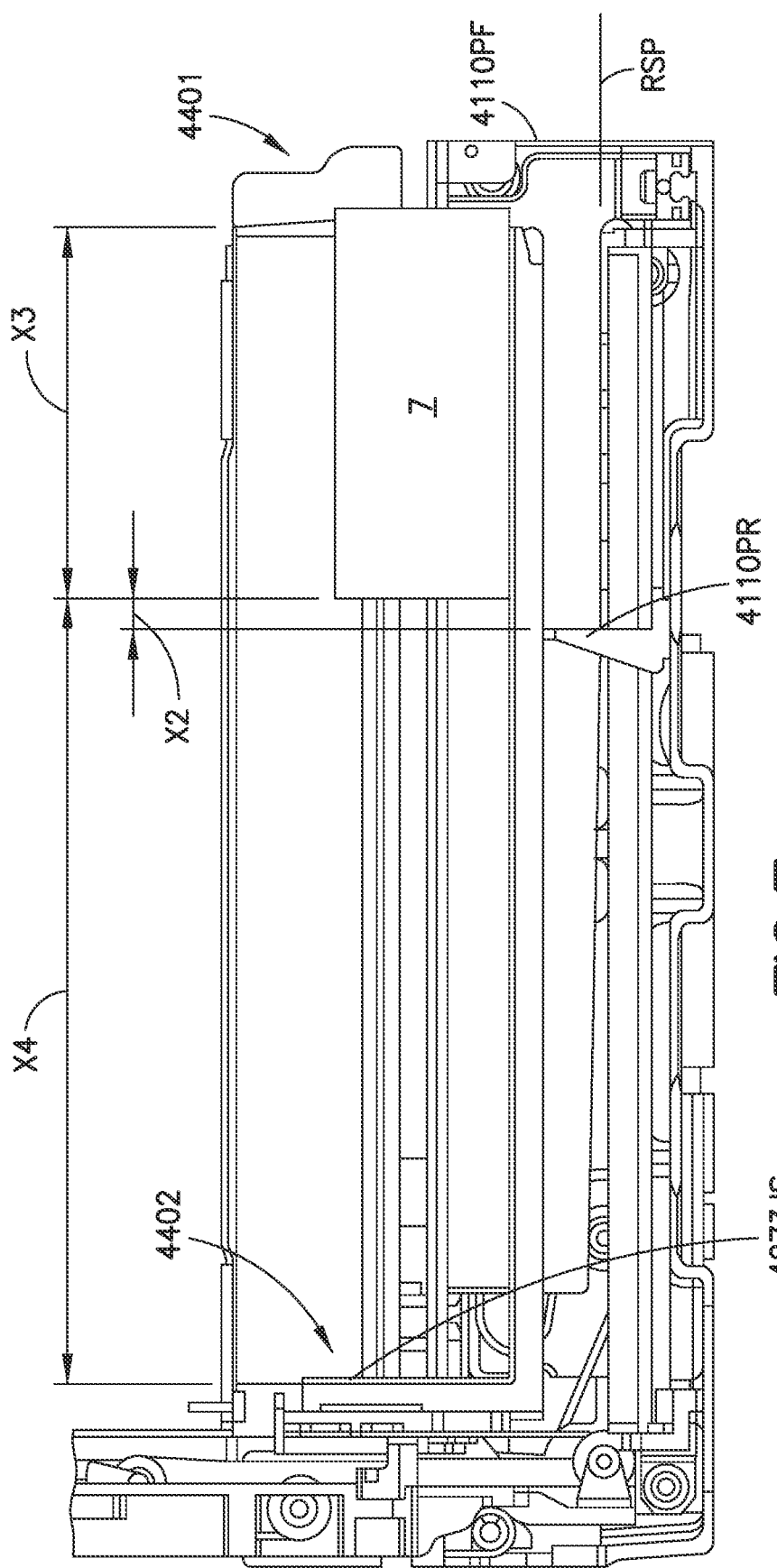
Figure 7A:
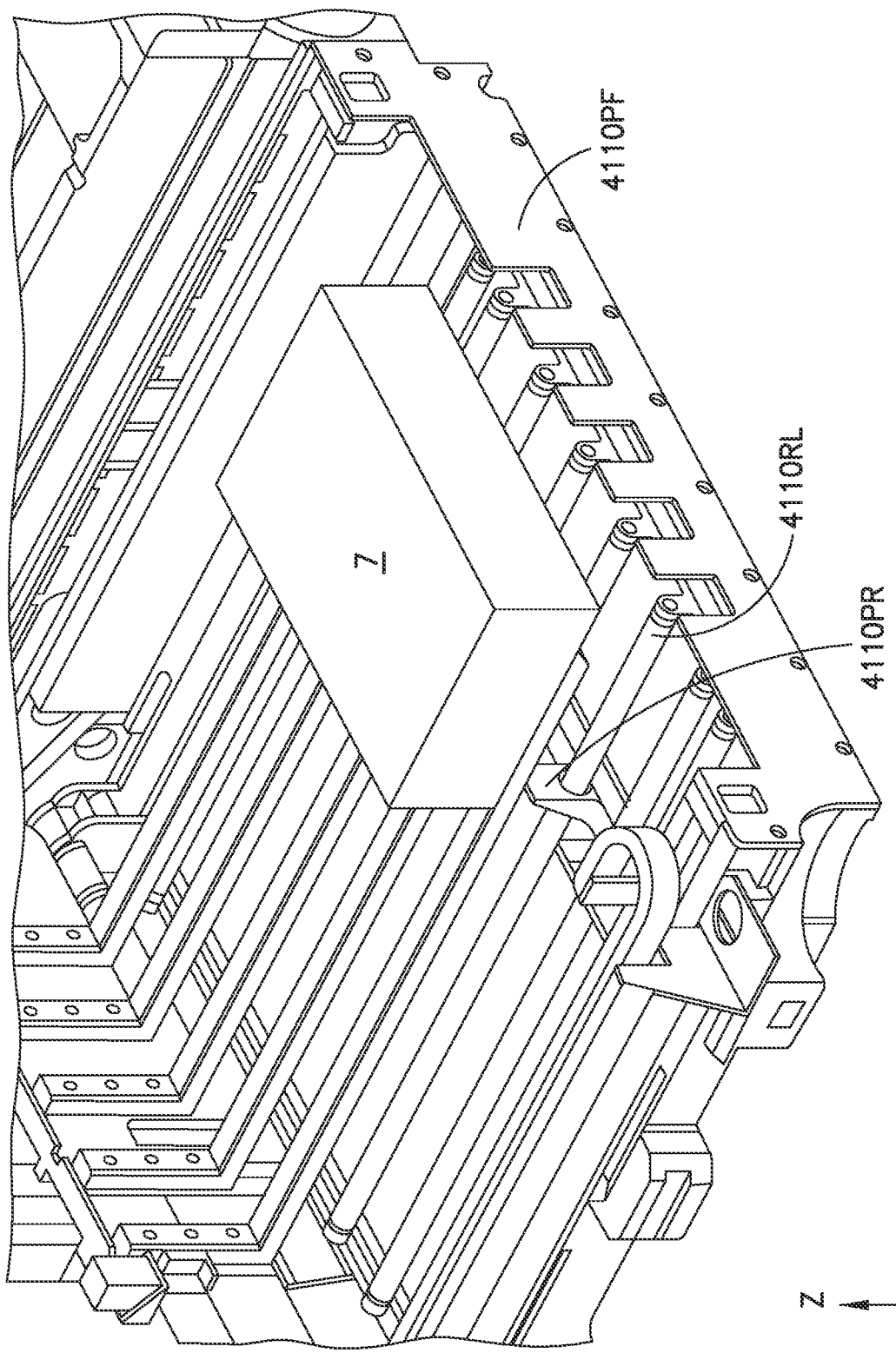
Figure 7B:
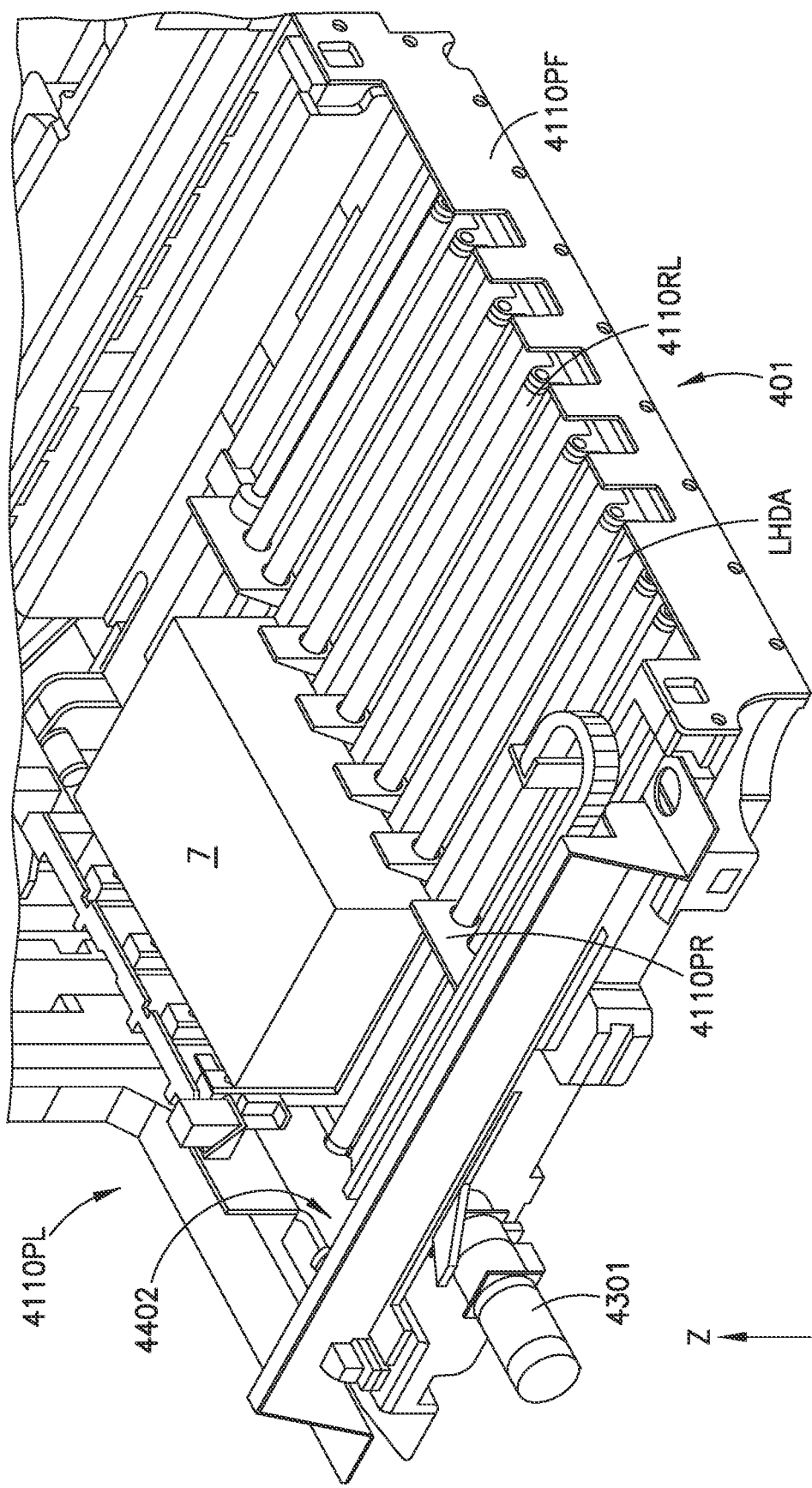
Figure 7D:
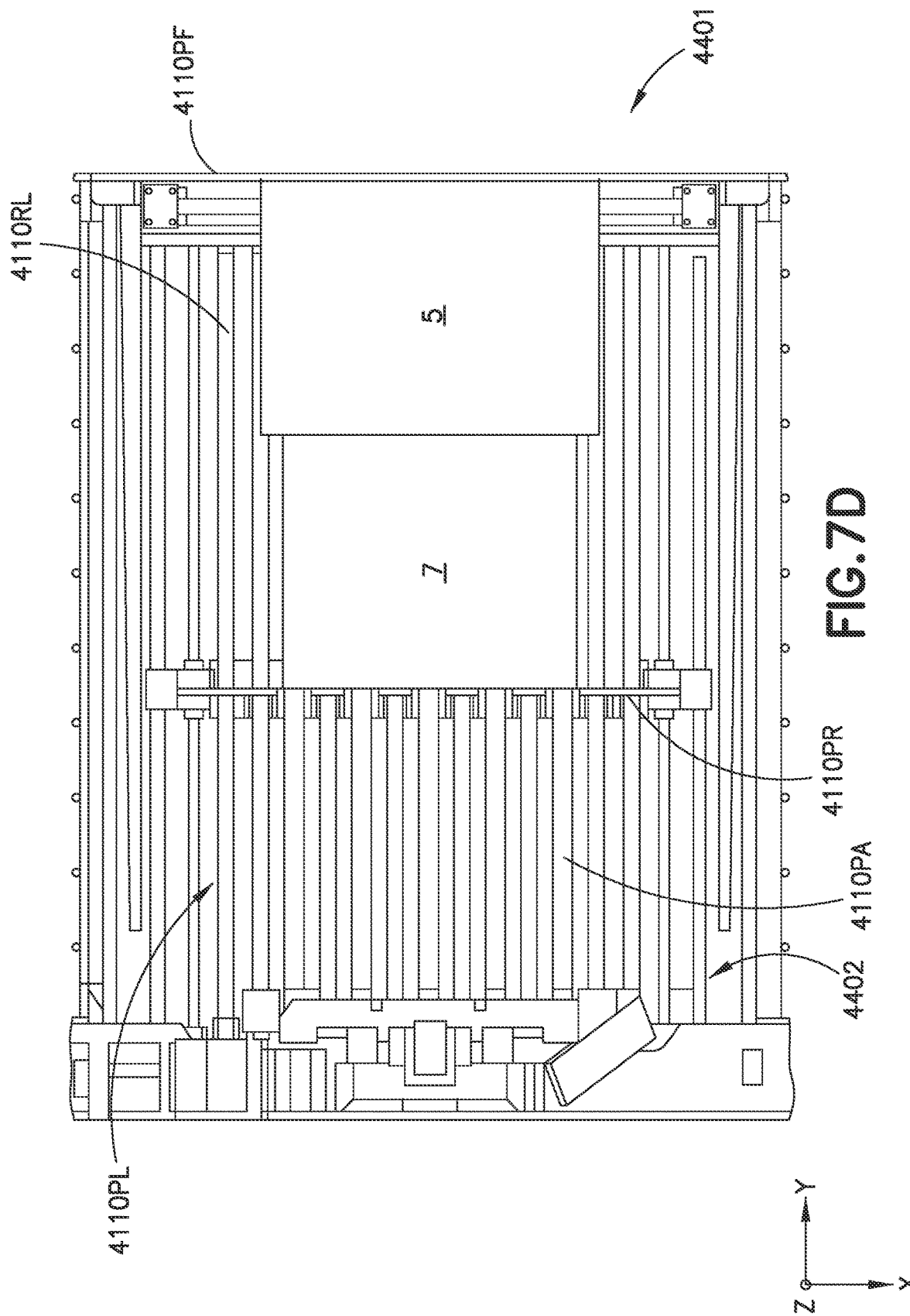

As an example, of case load streams, referring to FIG. 6, there are two outbound lifts 150B1, 150B2, each lift having a respective case load stream COS1, COS2 which is transferred to the outbound conveyors 160CB through transfer stations 160TS, 160TSA (in other aspects there is any suitable number of outbound lifts with any suitable corresponding number of case load streams being provided to a load out fill). For example, the ordered sequence of the case loads in each case load stream COS1, COS2 is defined by the ordered sequence of the multi-caseloads of each load out (outbound) stroke of the respective lift 150B1, 150B2 generating/feeding the case load stream COS1, COS2 (e.g. the multi-loads of each lift load out stroke are arranged in the ordered sequence related to the fill sequence). Here the order fulfillment stream is defined by the two lifts 150B1, 15B2 however, in other aspects the order fulfillment stream is defined by one of the lifts 150B1, 150B2 independent of other ones of the lifts 150B1, 150B2.

In one aspect, the sorting of the multi-loads to the ordered/fill sequence is effected both prior to lift pick and/or during lift pick. For example, sorting prior to lift pick includes case units/pickfaces (e.g. multi-case loads) being delivered by the bots 110 to interface station shelves 7000A-7000L of the transfer stations TS of the different transfer deck levels 130B. In one aspect the case load delivery timing of the case loads by the bots 110 to the transfer stations TS is not in sequence however, the case loads delivered correspond to the predetermined sequence of the case load stream COS1, COS2 output by the respective outbound lift 150B1, 150B2 for effecting the ordered fill sequence. For example, the multi-case loads are placed on the interface stations TS (of one or more deck levels) in a sorted arrangement (even though the delivery timing is not in sequence) so as to be in an ordered sequence (e.g. at least the case units needed for the ordered sequence are placed on the interface stations TS in a known relationship with the respective interface stations TS) per the load out fill sequence. As will be described below, in one aspect, the lift 150 picks the multi-case loads from the interface stations TS located at one or more deck levels to feed the respective case load stream COS1, COS2.

In one aspect the load out fill sequence of each lift 150B is consecutive (n) (e.g. such as where a single stream COS1, COS2 forms the load out fill) or a consecutive skip sequence (n+i where i=1 to m and i corresponds to the number of load streams COS1, COS2 integrated to the load out fill) where there are multiple streams COS1, COS2 forming the load out fill. In the latter case, the ordered sequence of each lift interface station IS (or buffer station BS) is matched or related to the ordered sequence of other load streams converging to the load out fill.

As an example, FIG. 6 illustrates a load out fill in which two case load streams COS1, COS2 are integrated to form a load out fill for a customer order. Here at least one of the case load streams COS1, COS2 are related to the predetermined pickface load order sequence for the load out fill. For exemplary purposes, the customer order may require case unit(s) 1-8 which are provided by the two lifts 150B1, 150B2. Here case units 1 and 3 are output by the lift 150B1 in case load stream COS1 while case units 2 and 4 are output to case load stream COS2 so that the cases arrive at the output station 160US in an alternating manner defined by the ordered sequence of the fulfillment stream. In accordance with the ordered sequence case loads 7 and 5 are to be delivered to output conveyor 160CB such that case units are carried and transferred by a common load handling device LHD of lift 150B1 from different holding locations of one or more interface station shelves 7000A-7000F in a single pass of the stack of interface stations TS. To efficiently use each lift 150 in the storage and retrieval system 100 the controller, such control as server 120, determines on which interface stations(s) case units 5, 7 are located. The controller sends commands to a lift, such as lift 150B1 associated with the interface stations TS where case units 5, 7 are located to pick one or more of the outbound case units.

Figure 8:
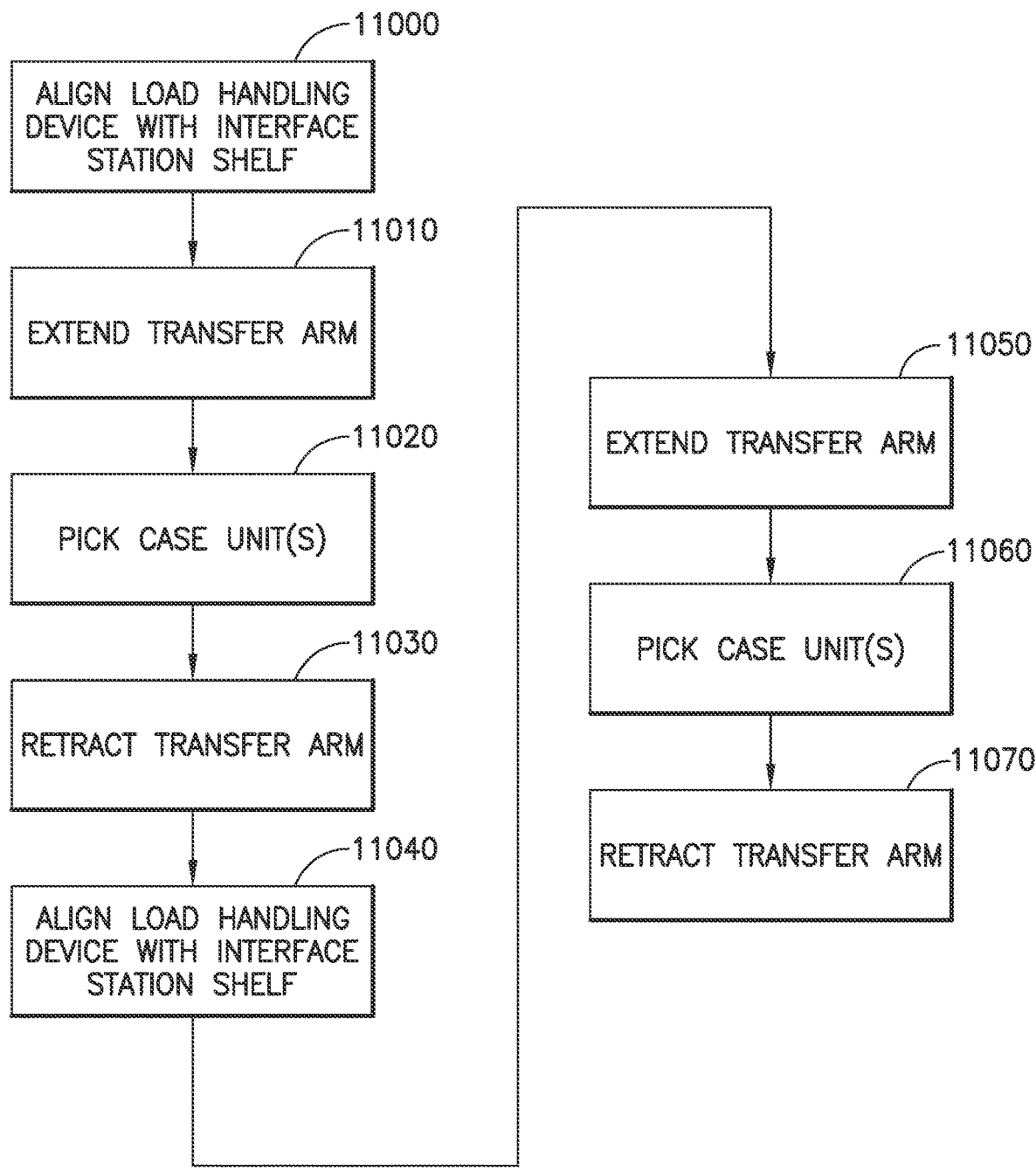
FIGS. 8-13 are flow diagrams in accordance with aspects of the disclosed embodiment.

In one aspect where the lift 150B1 picks case units 5, 7 from a common shelf 7000B of an interface station TS the lift 150B1 moves one or more load handling devices LHD, LHD1, LHD2 of the lift (and the pick head 4000A, 4000B, 4000C, 4000D, 4270 thereon) in the Z direction so that the transfer arm LHDA, LHDB is located substantially at a level of the interface station shelf 7000B (FIG. 8, Block 11000). The transfer arm LHDA, LHDB of the one or more load handling devices LHD, LHD1, LHD2 is extended (e.g. extension of a common transfer arm as in FIG. 5A or the substantially simultaneous extension of two transfer arms as in FIGS. 5C and 5D) in the Y direction so that the fingers 4273 are disposed between the slats 1210S below the case units 5, 7 (FIG. 8, Block 11010). The lift 150B1 moves the one or more load handling devices LHD, LHD1, LHD2 in the Z direction so that the fingers 4273 pass through the slats 1210S to lift/pick the case units 5, 7 from the interface station shelf 7000B (FIG. 8, Block 11020). The transfer arm LHDA, LHDB is retracted in the Y direction so as to place the case units 5, 7 within a transfer column TC (e.g. an area of open space in which the load handling device travels along the Z direction free from interference from the interface stations and outbound conveyors) of the lift 150B1 (FIG. 8, Block 11030). The lift 150B1 moves the one or more load handling devices LHD, LHD1, LHD2 in the Z direction so that the transfer arm LHDA, LHDB is located substantially at a level of an interface station 160TS of the conveyor 160CB (FIG. 8, Block 11040). The transfer arm LHDA, LHDB of the one or more load handling devices LHD, LHD1, LHD2 is extended in the Y direction so as to place the case units 5, 7 substantially above the interface station 160TS (FIG. 8, Block 11050) and the lift 150B1 moves the one or more load handling devices LHD, LHD1, LHD2 in the Z direction so that the fingers 4273 pass through the slats of the interface station 160TS (in a manner similar to that illustrated in FIG. 5B) to lower/place the case units 5, 7 on a shelf of the interface station 160TS (FIG. 8, Block 11060). The transfer arm LHDA, LHDB is retracted in the Y direction so as to place the transfer arm LHDA, LHDB within the transfer column TC of the lift 150B1 (FIG. 8, Block 11070). Here case units carried at all load stations LST1-LST3 (e.g. case unit holding locations) n platform PFM (e.g. as in FIG. 5A and as in FIGS. 5C, 5D where the simultaneous extension/retraction of transfer arms LHDA, LHDB effects a common platform) are picked, transferred and placed in unison with the lift platform at a common elevation. Case units 6, 8 are transferred to the outbound conveyors 160CB by the lift 150B1 in a manner substantially similar to that described above with respect to the transfer of case units 5, 7 by lift 150B1. As may be realized, the load fill formed by the case load streams COS1, COS2 include mixed case pickfaces arranged in a predetermined pickface load order sequence. In one aspect, the ordered sequence of streaming pickfaces 1, 3, 5, 7 (e.g. case load stream COS1) is combined with a pickface 2, 4, 6, 8 from the other case load stream COS2 to fill the load fill in the predetermined pickface load order sequence 1, 2, 3, 4, 5, 6, 7, 8. In one aspect, at least one pickface from the other case load stream COS2 in combination with the ordered sequence of streaming pickfaces from the case load stream COS1 forms a portion of consecutive ordered pickfaces (e.g. pickfaces 1, 2, 3, 4, . . . as shown in FIG. 6) of the predetermined pickface load order sequence.

Figure 9:
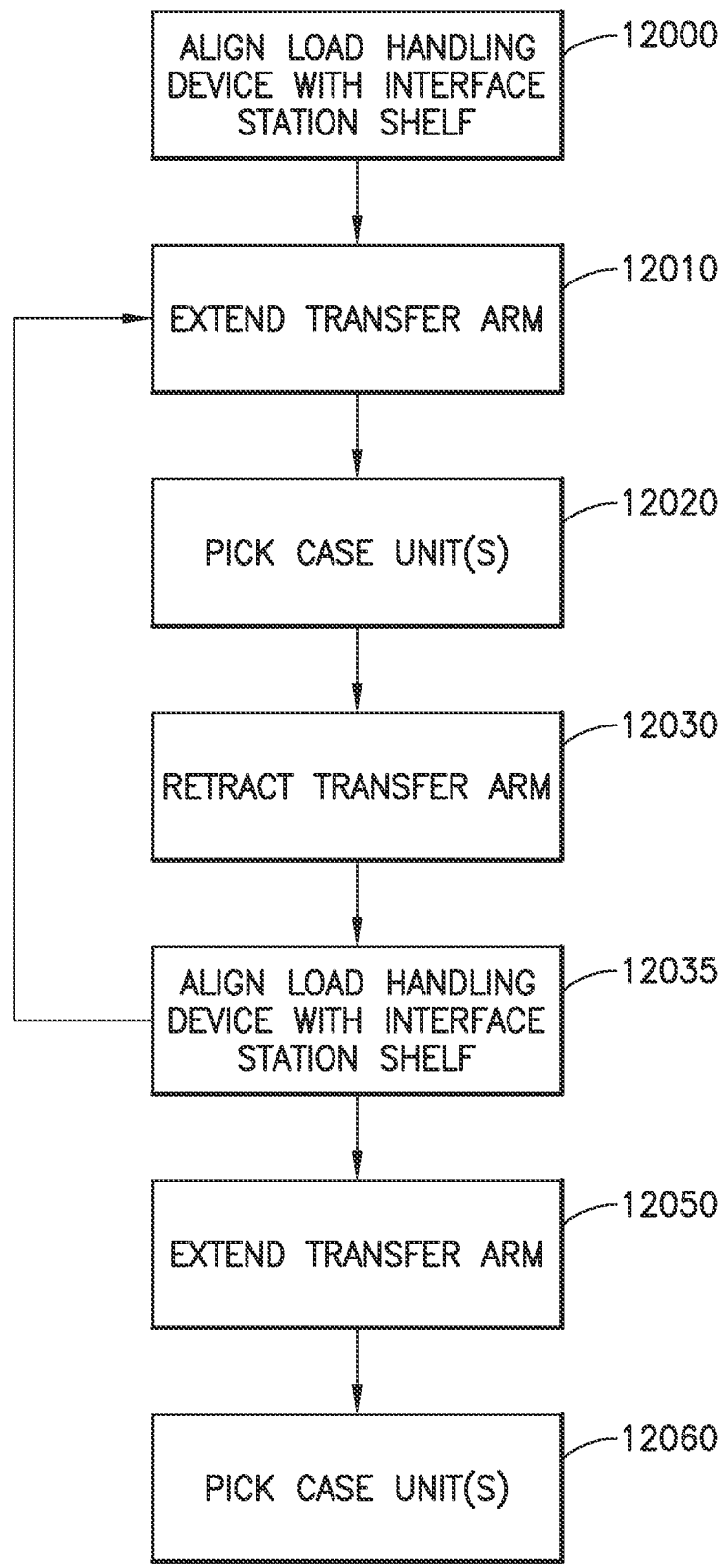

In one aspect, as noted above, the lift 150 sorts the multi-load cases when picking the multi-load cases from interface stations TS located as different deck levels where the sorting sequence corresponds to the ordered sequence of streaming pickfaces (e.g. case load streams COS1, COS2). For example, a multiple transfer arm load handling device LHD as in FIG. 5C (and also the individually operable load handling devices LHD1, LHD2 of FIG. 5D) picks and places case units from more than one interface station TS at different storage levels 130LA, 130LB and transfers the case units to the same or different outbound conveyor transfer stations TS (e.g. such as when the transfer stations TS of one or more the outbound conveyors serving a common lift 150 are stacked one above the other). For exemplary purposes only, a customer order may require case units 5, 7 to be delivered to conveyor 160CB. Again, to efficiently use each lift 150 in the storage and retrieval system 100 the controller, such as control server 120, determines on which interface stations(s) case units 5, 7 are located. The controller sends commands to a lift, such as lift 150B1 associated with the interface stations TS where case units 5, 7 are located to pick one or more of the outbound case units in a single pass of the load handling device LHD. Here, case units 5, 7 are located on different shelves 7000A-7000F of different interface stations TS such that the lift 150B1 moves one or more load handling devices LHD, LHD1, LHD2 of the lift (and the pick head 4000A, 4000B, 4000C, 4000D, 4270 thereon) in the Z direction so that the transfer arm LHDA, LHDB is located substantially at a level 130LA, 130LB of one of the interface station shelves 7000B, 7000D (FIG. 9, Block 12000). The transfer arm LHDA, LHDB of the one or more load handling devices LHD, LHD1, LHD2 is extended in the Y direction so that the fingers 4273 are disposed between the slats 1210S below one of the case units 5, 7 (FIG. 9, Block 12010) such as case unit 7 when case unit 7 is being picked on an upstroke of the lift 150B before picking case unit 5 or case unit 5 when case unit 5 is being picked on a down stroke of the lift 150B before picking case unit 7. The lift 150B1 moves the one or more load handling devices LHD, LHD1, LHD2 in the Z direction so that the fingers 4273 pass through the slats 1210S to lift/pick one of the case units 5, 7 (which is some aspects may be a pickface including more than one case unit) from the interface station shelf 7000B (FIG. 9, Block 12020). The transfer arm LHDA, LHDB is retracted in the Y direction so as to place the case units 5, 7 within a transfer column TC (e.g. an area of open space in which the load handling device travels along the Z direction free from interference from the interface stations and outbound conveyors) of the lift 150B1 (FIG. 9, Block 12030). The lift 150B1 moves the one or more load handling devices LHD, LHD1, LHD2 in the Z direction so that the transfer arm LHDA, LHDB is located substantially at a level of interface station shelf 7000A, 7000B where the other case unit 5, 7 is located (FIG. 9, Block 12035) for picking the other case unit in the manner described above (FIG. 9, Blocks 12010, 12020, 12030). The lift 150B1 moves the one or more load handling devices LHD, LHD1, LHD2 in the Z direction so that the transfer arm LHDA, LHDB s located substantially at a level of an interface station 160TS of the conveyor 160CB (FIG. 9, Block 12035). The transfer arm LHDA, LHDB of the one or more load handling devices LHD, LHD1, LHD2 is extended in the Y direction so as to place the case units 5, 7 substantially above the interface station 160TS (FIG. 9, Block 12050) and the lift 150B1 moves the one or more load handling devices LHD, LHD1, LHD2 in the Z direction so that the fingers 4273 pass through the slats of the interface station 160TS (in a manner similar to that illustrated in FIG. 5B) to lower/place the case units 5, 7 on a shelf of the interface station 160TS (FIG. 9, Block 12060). In one aspect the case units 5, 7 are placed on the interface station 160TS substantially simultaneously as a unit while in other aspects the case units 5, 7 are placed on the interface station 160TS sequentially at different times, such as one after another and/or placed to different outbound conveyors interface stations 160TS (e.g. such as when the transfer stations TS of one or more the outbound conveyors serving a common lift 150 are stacked one above the other) according to a predetermined order out sequence for building the mixed pallet MPL (FIG. 2). The transfer arm LHDA, LHDB is retracted in the Y direction so as to place the transfer arm LHDA, LHDB within the transfer column TC of the lift 150B1 (FIG. 9, Block 12070).

Figure 10:
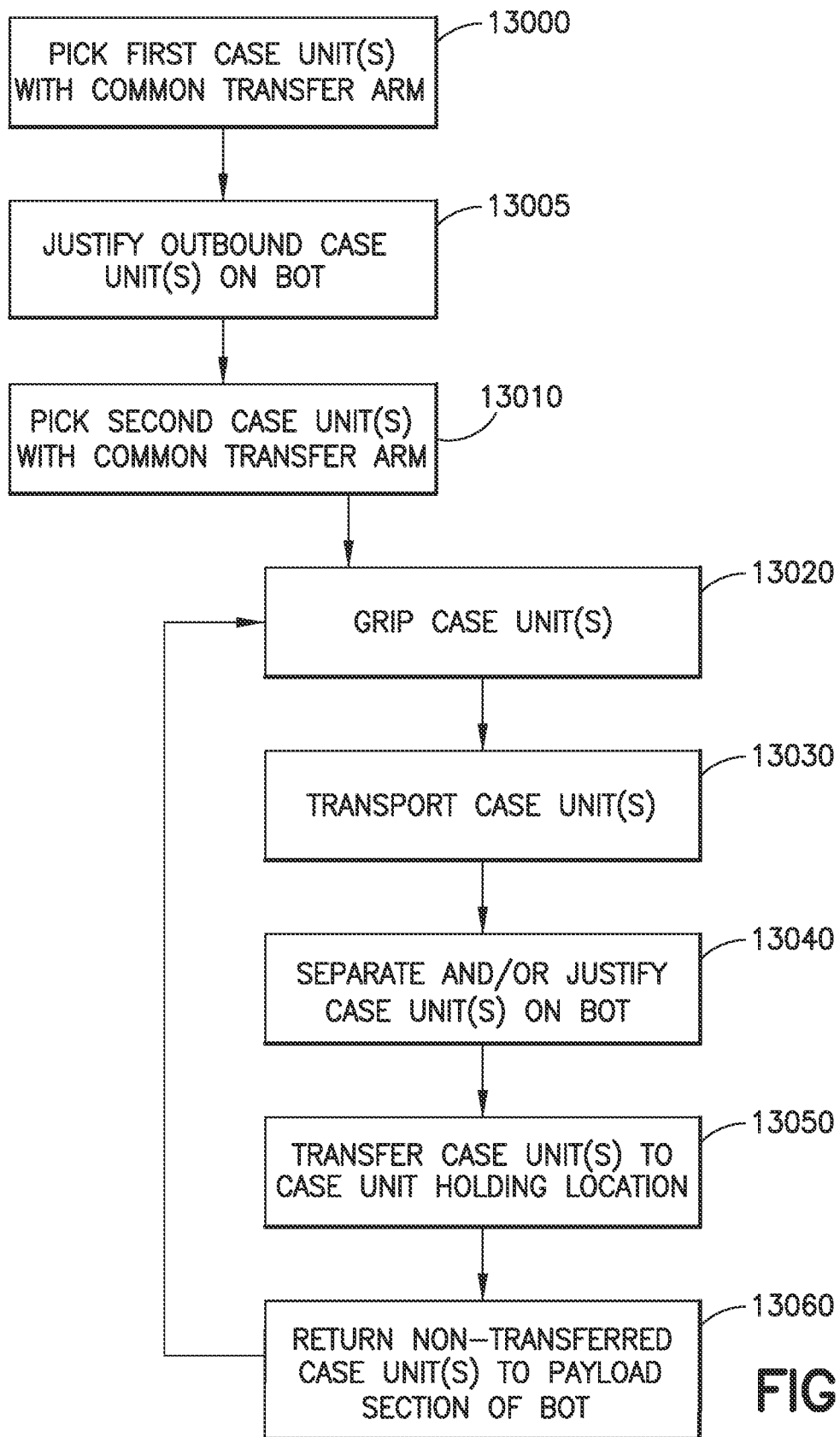

In one aspect a common load handling device LHD, LHD1, LHD2 is configured to pick/place one or more case units from multiple interface station TS shelves with a common transfer arm where the case units are sorted on the fly (e.g. during transport on the lift) and/or justified on the load handling device LHD, LHD1, LHD2. For example, the outbound case units 5, 7 are located on interface station shelves 7000B, 7000D of different storage levels 130LA, 130LB. Again, to efficiently use each lift 150 in the storage and retrieval system 100 the controller, such as control server 120, determines on which interface stations(s) case units 5, 7 are located. The controller sends commands to a lift, such as lift 150B1 associated with the interface stations TS where case units 5, 7 are located to pick one or more of the outbound case units in a single pass of the load handling device LHD. Here For example, referring to FIGS. 6, 7 and 7A-7E the load handling device LHD, LHD1, LHD2 of lift 150B1 picks case unit 7 (which may be a pickface of more than one case unit) from interface station shelf 7000B in the manner described above (FIG. 10, Block 13000). The case unit(s) 7 is justified on the load handling device towards the rear of the payload section 4110PL as will be described in greater detail below (FIG. 10, Block 13005). The load handling device LHD, LHD1, LHD2 continues to travel along the mast 4002 in a common pass of the vertical stack of interface stations TS and picks case unit 5 from a different interface station shelf 7000D with the common transfer arm LHDA so that both case unit(s) 7, 5 are located adjacent one another on the common transfer arm LHDA (FIG. 10, Block 13010). As may be realized, in one aspect, the controller 120 is configured to effect picking of the case unit(s) 5, 7 in any suitable order such as, for example, an order that is opposite an order in which the case unit(s) are placed at the interface station 160TS of the conveyor 160CB according to the predetermined order out sequence for forming the mixed pallet MPL.

Here the load handling device LHD, LHD1, LHD2 grips both case units 7, 5 within the payload section 4110PL in the manner described below (FIG. 10, Block 13020). The load handling device LHD, LHD1, LHD2 travels along the mast 4002 and interfaces with one or more output lifts 150B1 (FIG. 10, Block 13030). The load handling device LHD, lHD1, LHD2 separates the case units 7, 5 within the payload section 4110PL, as will be described in greater detail below, so that case unit(s) are separated in any suitable manner such as, for example, so that case unit(s) 5 is justified towards the front of the payload section 4110PL and case unit(s) 7 is justified towards the back of the payload section 4110PL (FIG. 10, Block 13040). At least the case unit 5 is transferred to the interface station 160TS (FIG. 10, Block 13050). The load handling device LHAD, LHD1, LHD2 retracts the transfer arm LHDA, LHDB to return the case unit(s) 7 to the payload section 4110PL (FIG. 10, Block 13060) and grips the case unit 7 (FIG. 10, Block 13020). The case unit(s) 7 is transported to another interface station 160TSA of output lift 150B1 (or placed at the same interface station 160TS sequentially after placement of case unit(s) 5 at interface station 160TS) (FIG. 10, Block 13030), justified toward the front of the payload section 4110PL (FIG. 10, Block 13040), and transferred to interface station 160TS, 160TSA, as described above (FIG. 10, Block 13050). In other aspects, depending on the predetermined case unit output sequence, the load handling device LHD, LHD1, LHD2 places both case unit(s) 7, 5 at a common location/position, such as simultaneously at a single interface station of lifts 150B1.

Figure 11:
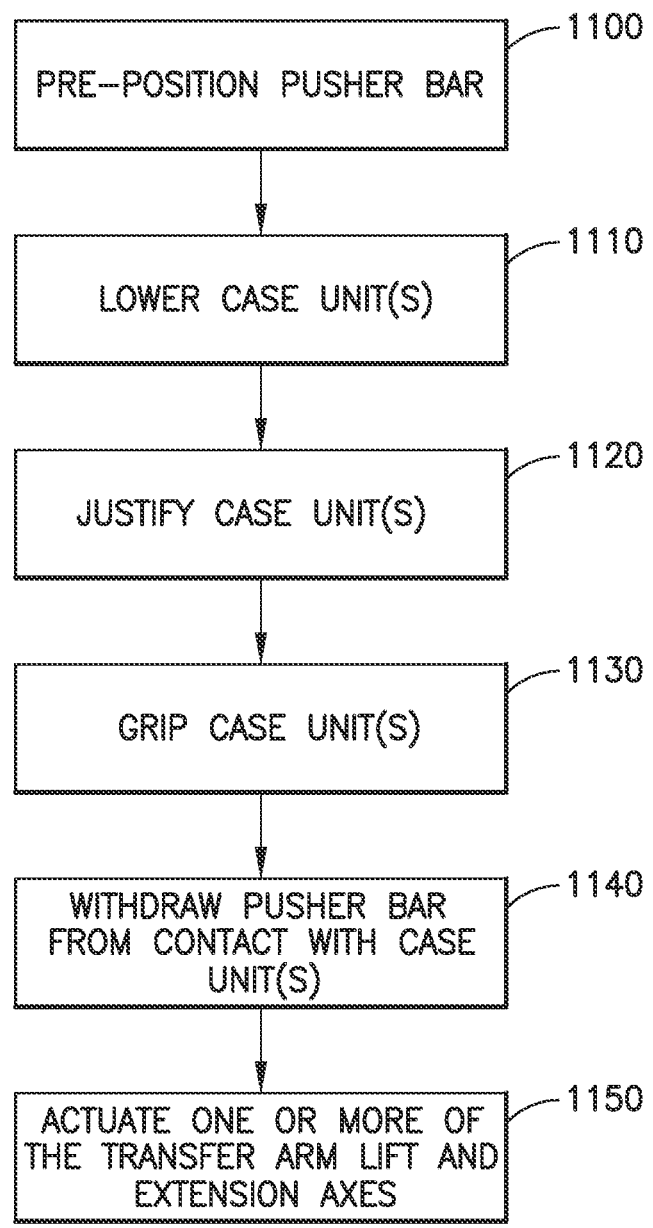

As noted above, because the pusher bar 4110PR is a separate, standalone axis of the load handling device LHD, LHD1, LHD2 that operates free of interference from the pick head 4270 extension and lift axes, the pusher bar 4110PR can be operated substantially simultaneously with the lifting and/or extension of the transfer arm LHDA, LHDB. The combined axis moves (e.g. the simultaneous movement of the pusher bar 4110PR with the transfer arm LHDA, LHDB extension and/or lift axes) provides for increased payload handling throughput and effects the ordered (e.g. according to the predetermined load out sequence) multi-pick of two or more case units from one or more interface station shelves 7000A-7000F, in one common pass of the vertical stack of interface stations TS. For example, referring again to FIGS. 7-7E during a transfer arm LHDA, LHDB multi-pick/place sequence the pusher bar 4110PR is prepositioned (as the case unit(s) and/or pickface are being picked and transferred into the payload section 4110PL) to a location that is a predetermined distance X2 away from the contact depth X3 (e.g. the depth of the tines occupied by the case unit(s) and/or pickface 7 when being picked/placed from interface station shelf 7000D or other case unit holding location) (FIG. 11, Block 1100). The distance X2 is a minimized distance that only allows sufficient clearance between pusher bar 110PR and the case unit(s) to allow the case unit(s) to be seated on the rollers 4110RL. As the case unit(s) 7 are lowered onto the rollers 4110RL (FIG. 11, Block 1110) the distance travelled by the pusher bar 4110PR to contact the case unit(s) 7 is a shorter distance X2 when compared to moving back side 4402 (relative to the Y direction and an access side 4401 of the payload section 4110PL) of the payload section 4110PL a distance X4 as with conventional transport vehicles. When the case unit(s) 7 are lowered by the transfer arm LHDA, LHDB and transferred to the rollers 4110RL so as to be solely supported by the rollers 4110RL, the pusher bar 4110PR is actuated to forward (relative to the lateral direction and an access side 4401 of the payload section 110PL) justify the case unit(s) 7 (FIG. 11, Block 1120). For example, the pusher bar 4110PB may push the case unit(s) 7 in the Y direction so that the case unit(s) contact the fence 4110PF (which is located at the access side 4401 of the payload section 4110PL) so that a case unit reference datum may be formed through contact between the case unit(s) 7 and the fence 4110PF. In one aspect the pusher bar 4110PR may engage or otherwise grip the case unit(s) 7 during transport of the case units (e.g. so as to hold the case unit(s) against the fence 4110PF) for maintaining the case unit(s) 7 in a predetermined spatial relationship with each other and the reference frame REFL (FIG. 5E) of the load handling device LHD, LHD1, LHD2 (FIG. 11, Block 1130). When placing the case unit(s) the pusher bar 4110PR, after justifying the case unit(s) 7 against the fence 4110PF, is withdrawn (e.g. in the Y direction) from contact with the case unit(s) 7 (FIG. 11, Block 1140). Substantially immediately after the pusher bar 4110PR disengages the case unit(s) 7 one or more of the lift axis (e.g. in the Z direction) and extension axis (e.g. in the Y direction) of the transfer arm LHDA, LHDB are actuated substantially simultaneously with the withdrawing movement of the pusher bar 4110PR (FIG. 11, Block 1150). In one aspect both the lift and extension axes are actuated when the pusher bar is withdrawn from contact with the case unit(s) 7 while in other aspect one of the lift and extension axes is actuated. As may be realized, the simultaneous movement of the transfer arm 4110PA lift axis and/or extension axis with the withdrawal of the pusher bar 4110PR as well as the decreased distance the pusher moves to justify the case unit(s) 7 decreases the time needed to transfer case unit(s) 7 (e.g. that are sorted on the load handling device LHD, LHD1, LHD2) to and from the load handling device and increases throughput of the storage and retrieval system 100.

Figure 12:
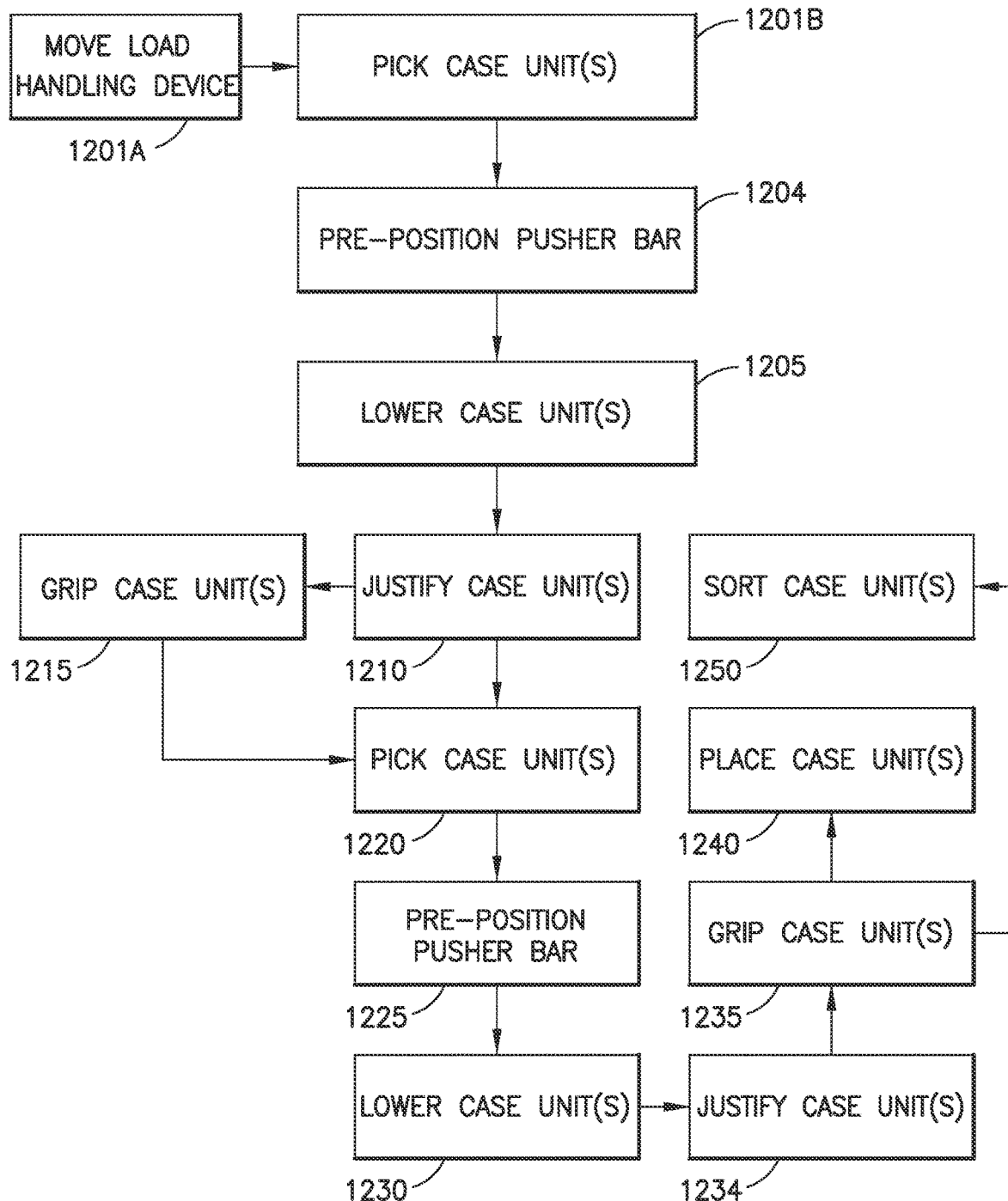

In another aspect of the disclosed embodiment, as may be realized, in the multi-pick/place sequence multiple case units are substantially simultaneously carried and manipulated within the payload section 4110PL to further increase throughput of the storage and retrieval system 100 and to effect the multi-pick/place sequence in accordance with a predetermined order out sequence. Referring also to FIG. 1, the lift 150B receives pick and place commands from, for example, control server 120 (and/or warehouse management system 2500) and executes those commands (e.g. under the control of control server 120 (or a lift controller) for forming the ordered multi-pick. Here the lift moves the load handling device LHD, LHD1, LHD2 in the Z-direction to pick two or more case units according to the predetermined order out sequence (FIG. 12, Block 1201A). In one aspect the manipulation of the case units 7, 5 is a sorting of the case units (in other words picking and placing of case units according to the predetermined load out sequence) where the cases are positioned on the transfer arm LHDA, LHDB for picking/placement of the case units and/or positioned so that the case units are not transferred and remain on the transfer arm LHDA, LHDB while other case units are transferred to and from the transfer arm LHDA, LHDB. Here, the load handling device LHD, LHD1, LHD2 travels in the Z direction and stops at a predetermined shelf 7000A-7000F of an interface station TS, according to the predetermined order out sequence, where the load handling device LHD, LHD1, LHD2 picks one or more case units from the predetermined shelf 7000A-700F of the interface station TS with a common transfer arm LHDA, LHDB where placement of the case units on the common transfer arm LHDA, LHDB corresponds to the predetermined order out sequence as will be described in greater detail below (e.g. the case units are sorted on-the-fly, e.g. during transport, with the lift 150).

As an example of case manipulation on the bot 110, still referring to FIGS. 5E, 7, 7A-7E, case unit(s) 7 may be picked from a case unit holding location (e.g. such as interface station shelf 7000D for effecting the ordered multi-pick (FIG. 12, Block 1201B). As the case unit(s) 7 is being transferred into the payload section 4110PL the pusher bar 4110PR may be pre-positioned (FIG. 12, Block 1204) adjacent the fence 4110PF so that the pusher bar 4110PR is positioned between the case unit(s) 7 and the fence 4110PF when the case unit(s) 7 is lowered for transfer to the rollers 4110RL (FIG. 12, Block 1205). The pusher bar 4110PR is actuated to push the case unit(s) 7 (resting on the rollers 4110RL) in the Y direction towards the back (e.g. rear) 4402 of the payload section 4110PL so that the case unit(s) 7 contacts a justification surface 4273JS (FIG. 7) of the tines 4273A-4273E and is justified to the back 4402 of the payload section 4110PL (FIG. 12, Block 1210).

Figure 13:
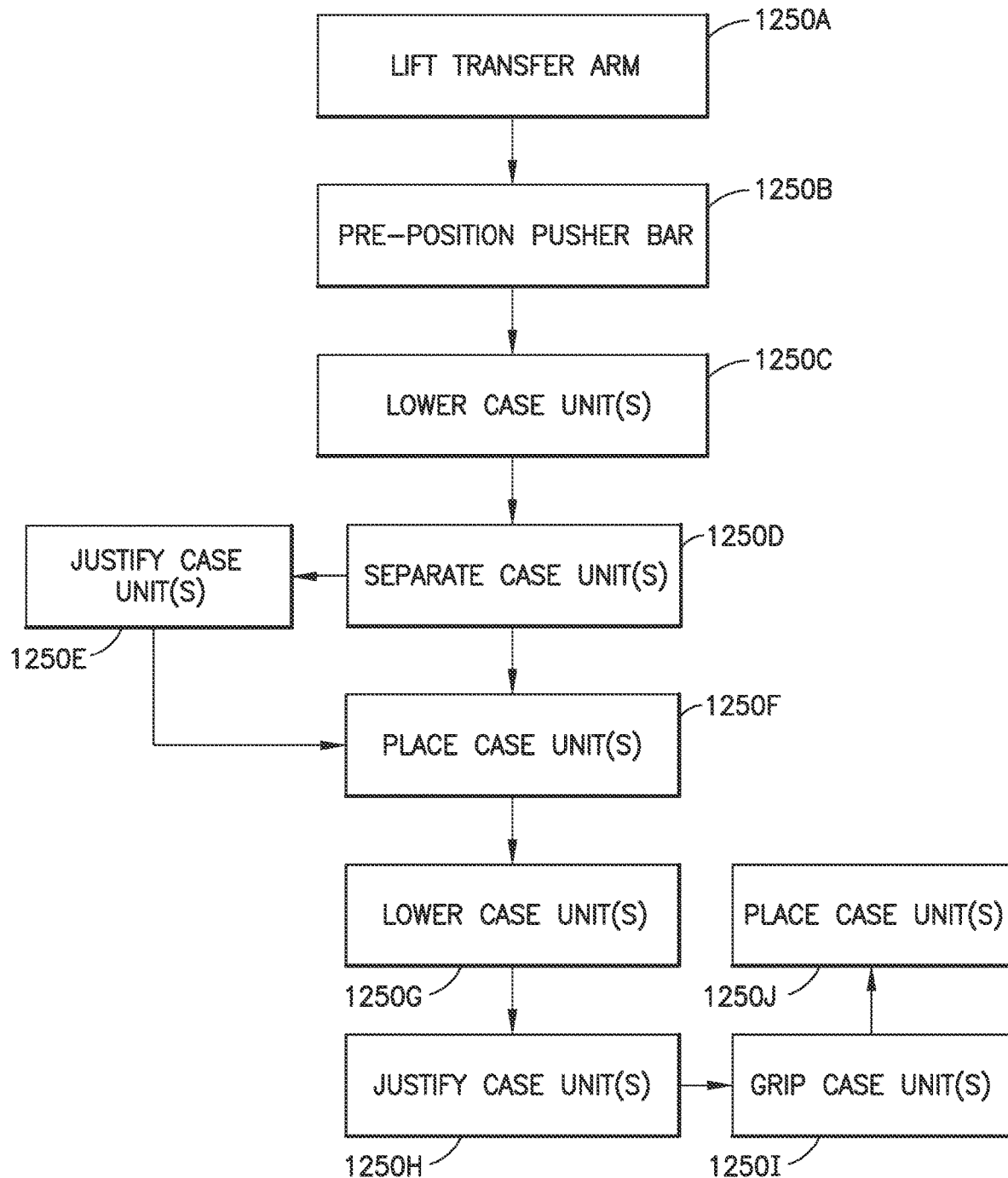

In one aspect, the load handling device LHD, LHDA, LHD2 continues to traverse mast 4002 in the same direction (e.g. so that all of the case units in the ordered multi-pick are picked in the common pass of the vertical stack of interface stations TS with the load handling device LHD, LHD1, LHD2 travelling in a single direction) and stops at another different predetermined shelf 7000A-7000F of a different interface station TS according to the predetermined order out sequence. As noted above, the pusher bar 4110PR remains in contact with (e.g. grips) the case unit(s) 7 during transport of the case unit(s) between interface station shelves 7000A-7000F so that the case unit(s) 7 remains in a predetermined location at the back 4402 of the payload section 4110PL (and/or a predetermined location in the X direction) relative to the reference frame REFL of the lift 150B1 (FIG. 12, Block 1215). To pick subsequent case units, from for example, the another interface station shelf 7000B the pusher bar 4110PR is moved in the Y direction to disengage the case unit(s) 7 and the lift and extension axes of the transfer arm LHDA, LHDB are actuated to retrieve another case unit(s) 5 from the other interface station shelf 7000B (FIG. 12, Block 1220). While the case unit(s) 5 are being picked the pusher bar 4110PR is positioned in the Y direction adjacent the back 4402 of the payload section 4110PL 7 and the so as to be located between the case units justification surface 4273JS of the tines 4273A-4273E (FIG. 12, Block 1225). The case unit(s) 5 are transferred into the payload section and lowered/placed on the rollers 4110RL (FIG. 12, Block 1230) so that the case units 7, 5 are arranged relative to each other along the Y axis. The pusher bar 4110PR is actuated in the Y direction to push the case units 7, 5 towards the fence 4110PF to forward justify the case units 7, 5 (FIG. 12, Block 1234) and grip/hold the case units 7, 5 for transport (FIG. 12, Block 1235). As may be realized, in one aspect the case units 7, 5 are placed at the interface station 160TS together as a unit while in other aspects the case units 7, 5 are sorted, e.g. transported to and placed at different interface stations 160TS, 160TSA (FIG. 12, Block 1240).

Where the case units 7, 5 are sorted (FIG. 12, Block 1250) for placement at a common interface station 160TS, 160TSA (such as for sequential but chronologically spaced apart, placement of case unit) or at different interface stations 160TS, 160TSA, the case units 7, 5 are separated from each other in the payload section 4110PL. For example, the pick head 4270 of the transfer arm LHDA, LHDB may be moved in the Z direction to lift the case units 7, 5 from the rollers 4110RL by an amount sufficient to allow the pusher bar 4110PR to pass beneath the case unit(s) (FIG. 13, Block 1250A). As the case units 7, 5 are lifted the pusher bar 4110PR is positioned along the Y direction so as to be located between the case units 7, 5 (see FIG. 7E) (FIG. 13, Block 1250B). The pick head 4270 is lowered so that the case units 7, 5 are transferred to the rollers 4110RL and so that the pusher bar is inserted between the case units 7, 5 (FIG. 13, Block 1250C). The pusher bar 4110PR is moved in the Y direction (e.g. to separate the case unit(s)) to move case unit(s) 7 towards the back 402 of the payload section 4110PL (e.g. against the justification surface 4273JS of the tines 4273A-4273E or any other suitable position) while the case unit(s) 5 remain at the front of the payload section 4110PL adjacent the fence 4110PF (e.g. as shown in FIG. 7C) (FIG. 13, Block 1250D). As may be realized, where the case units are held against the justification surface 4273JS of the tines during transport, the pusher bar is moved in the Y direction (e.g. to separate the case unit(s)) to move case unit(s) 5 towards the front 4401 of the payload section 4110PL (e.g. against the fence 4110PF or any other suitable position) while the case unit(s) 7 remain at the back of the payload section 4110PL adjacent the justification surface 4273JS. The pusher bar 4110PR may also be moved in the Y direction to re-justify the case unit(s) 5 against the fence 4110PF to position the case unit(s) on the tines 4273A-4273E for placement at the interface station 160TS, 160TSA (FIG. 13, Block 1250E). As may be realized, with the case unit(s) 7 being positioned substantially against the justification surface 4273JS of the tines 4273A-4273E (e.g. of the pick head 4270) the case unit(s) 5 can be placed at the interface station 160TS, 160TSA substantially without interference from the case unit(s) 7 (FIG. 13, Block 1250F), e.g. the case unit 7 is free from contacting case units disposed at the case unit holding location. The case unit(s) 7 is lowered/transferred back into the payload section 4110PL (e.g. by retracting and lowering the transfer arm 4110PA) (FIG. 13, Block 1250G). The pusher bar 4110PR, which is pre-positioned between the justification surface 4273JS and the case unit(s) 7, pushes the case unit(s) 7, which s disposed on the rollers 4110RL, against the fence 4110PF to forward justify the case unit(s) 7 for placement at the same or another interface station 160TS, 160TSA (e.g. different than the holding location that case unit(s) 5 were placed) (FIG. 13, Block 1250H). The pusher bar 4110PR remains against the case unit(s) 7 for gripping (e.g. with the fence) the case unit(s) during transport to the other interface station 160TS, 160TSA (FIG. 13, Block 1250I). The pusher bar 4110PR moves away from the case unit(s) 7 and the transfer arm is actuated to lift and extend the pick head 4270 for placing the case unit(s) 7 at the other interface station 160TS, 160TSA (FIG. 13, Block 1250J).

In one aspect, referring again to FIG. 5D, a lift with multiple individually operable load handling devices LHD1, LHD2 picks and places case units from more than one interface station TS at different storage levels 130LA, 130LB and transfers the case units to the same or different outbound conveyor interface stations TS (e.g. such as when the transfer stations TS of one or more the outbound conveyors serving a common lift 150 are stacked one above the other). Here, each of the individually operable load handling devices LHD1, LHD2 picks and places case units from the interface station shelves 7000A-7000F and delivers the picked case units to the outbound conveyor 160CB in a manner substantially similar to the manner described above with respect to FIGS. 8, 9 and 10. It is noted that in one aspect each load handling device LHD1, LHD2 includes a single transfer arm LHDA, LHDB (see FIGS. 5A, 5D) or more than one transfer arm LHDA, LHDB (see FIG. 5C) (e.g. one load handling device include a single transfer arm while the other load handling device includes more than one transfer arm; both load handling devices include a single transfer arm; both load handling devices include more than one transfer arm). The load handling devices LHD1, LHD2 in one aspect include the sorting and justification mechanisms described above with respect to FIG. 5E.

The output lifts 150B1, 150B2 transfer the ordered multipick(s) placed on the shelves 7000A-7000L by the bots 110 to the output station 160UT also in accordance with the predetermined order out sequence. For example, referring again to FIG. 6, the pickfaces 1-22 are picked by the lifts 150B1, 150B2 in sequenced order so that the pickfaces 1-22 are delivered to the output station 160UT in the predetermined order (indicated by, for example, the number associated with each case unit/pickface illustrated in FIG. 6) needed to form the mixed pallet load MPL (FIG. 2) and/or in the predetermined order sequence (e.g. an order out sequence) of picked items according to, for example, an order, fulfilling one or more customer orders, in which case units CU are sequenced for placement in one or more bag(s), tote(s) or other container(s) TOT at an operator station 160EP. As such, each of the interface stations TS of each lift 150B1, 150B2 forms a buffer that holds one or more case unit(s) until the case unit(s) are needed and picked by the respective lift 150B1, 150B2 for forming the mixed pallet load.

Figure 15:
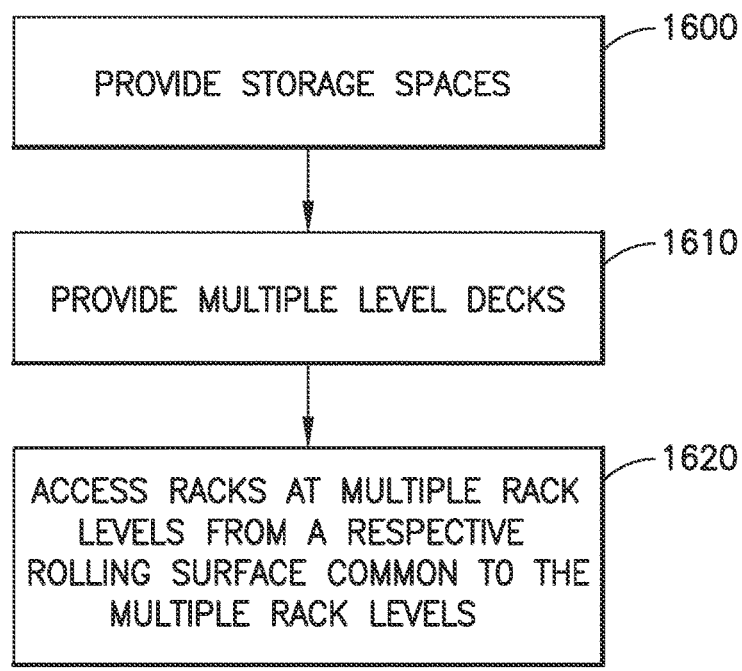
FIG. 15 is an exemplary flow diagram in accordance with aspects of the disclosed embodiment.

Referring to FIG. 15, in accordance with aspects of the disclosed embodiment, storage spaces arrayed on racks along picking aisles are provided (FIG. 15, Block 1600). Multiple level decks are also provided (FIG. 15, Block 1610), where at least one deck level of the multiple level decks communicates with each aisle, where the multiple level decks and aisles define a rolling surface for an autonomous transport vehicle at each level of the multiple level decks. Racks at multiple rack levels are accessed from a respective rolling surface that is common to the multiple rack levels (FIG. 15, Block 1620), where the racks are disposed along at least one aisle at each level of the multiple level decks. In one aspect, a vertical pitch between rack levels varies for a portion of a respective aisle. In one aspect, the vertical pitch between at least two rack levels of the portion of the respective aisle is related to another vertical pitch between at least two other rack levels of another aisle portion of the respective aisle so that the autonomous transport vehicle effects multiple picks in an ordered sequence in a common aisle pass. In one aspect, the vertical pitch between at least two rack levels of the portion of the respective aisle is related to another vertical pitch between at least two other rack levels of another aisle portion of the respective aisle so that the vertical pitch and the other vertical pitch effects substantially filling a vertical space between the multiple deck levels with stored items.

In accordance with one or more aspects of the disclosed embodiment, a product order fulfillment system includes multiple decks arrayed at different levels and defining multilevel decks; at least one autonomous transport vehicle disposed on each of the multilevel decks, and configured for holding and transporting a pickface on each deck; at least one lift, traversing and connecting more than one level of the multilevel decks, and arranged for lifting and lowering the pickface from the multilevel decks; and at least one pickface transfer station on each deck interfacing between the autonomous transport vehicle on the deck and the at least one lift to effect transfer of the pickface between the autonomous transport vehicle and the at least one lift; wherein the at least one lift defines a fulfillment stream of mixed case pickfaces outbound from the multilevel decks to a load fill, and at least one stream of the fulfillment stream has an ordered sequence of streaming pickfaces wherein the ordered sequence of streaming pickfaces is based on another fulfilment stream.

In accordance with one or more aspects of the disclosed embodiment, the load fill comprises mixed case pickfaces arranged in a predetermined pickface load order sequence.

In accordance with one or more aspects of the disclosed embodiment, the ordered sequence of streaming pickfaces from the at least one stream is related to the predetermined pickface load order sequence.

In accordance with one or more aspects of the disclosed embodiment, the ordered sequence of streaming pickfaces from the at least one stream is combined with a pickface from the other fulfillment stream to fill the load fill in the predetermined pickface load order sequence.

In accordance with one or more aspects of the disclosed embodiment, at least one pickface from the other fulfillment stream in combination with the ordered sequence of streaming pickfaces from the at least one stream forms a portion of consecutive ordered pickfaces of the predetermined pickface load order sequence.

In accordance with one or more aspects of the disclosed embodiment, the at least one lift includes a first lift and the other fulfillment stream is defined by another of the at least one lift independent from the first lift.

In accordance with one or more aspects of the disclosed embodiment, the first lift has a lift platform arranged to support more than one pickface on the lift platform and is configured so that the first lift effects picking or placing of the more than one pickface, corresponding to the ordered sequence of streaming pickfaces, with the lift platform at a common lift elevation.

In accordance with one or more aspects of the disclosed embodiment, the first lift effects picking or placing of the more than one pickface substantially simultaneously.

In accordance with one or more aspects of the disclosed embodiment, the product order fulfillment system further includes a storage array with storage racks having pickface storage locations in multiple levels arranged corresponding to the different levels of the multilevel decks.

In accordance with one or more aspects of the disclosed embodiment, a product order fulfillment system includes multiple decks arrayed at different levels and defining multilevel decks; at least one autonomous transport vehicle disposed on each of the multilevel decks, and configured for holding and transporting a pickface on each deck; a first lift, traversing and connecting more than one level of the multilevel decks, and arranged for lifting and lowering the pickface from the multilevel decks; a second lift, traversing and connecting more than one level of the multilevel decks, and arranged for lifting and lowering the pickface from the multilevel decks; and at least one pickface transfer station on each deck interfacing between the autonomous transport vehicle on the deck and the first and second lifts to effect transfer of the pickface between the autonomous transport vehicle and the first and second lifts; wherein the first lift defines a first fulfillment stream of mixed case pickfaces outbound from the multilevel decks to a load fill, the second lift defines a second fulfillment stream of mixed case pickfaces outbound from the multilevel decks to the load fill, and the first fulfillment stream has as first ordered sequence of streaming pickfaces and the second stream has a second ordered sequence of streaming pickfaces, the first ordered sequence of streaming pickfaces complementing the second ordered sequence of streaming pickfaces and being related to a load fill ordered sequence.

In accordance with one or more aspects of the disclosed embodiment, the load fill comprises mixed case pickfaces arranged in a predetermined pickface load order sequence.

In accordance with one or more aspects of the disclosed embodiment, at least one of the first ordered sequence of streaming pickfaces from the first fulfillment stream and the second ordered sequence of streaming pickfaces from the second fulfillment stream is related to the predetermined pickface load order sequence.

In accordance with one or more aspects of the disclosed embodiment, the first ordered sequence of streaming pickfaces from the first fulfillment stream is combined with a pickface from the second ordered sequence of streaming pickfaces from the second fulfillment stream to fill the load fill in the predetermined pickface load order sequence.

In accordance with one or more aspects of the disclosed embodiment, at least one pickface from the second fulfillment stream in combination with the first ordered sequence of streaming pickfaces from the first fulfillment stream forms a portion of consecutive ordered pickfaces of the predetermined pickface load order sequence.

In accordance with one or more aspects of the disclosed embodiment, the at least one lift includes a first lift and the second fulfillment stream is defined by another of the at least one lift independent from the first lift.

In accordance with one or more aspects of the disclosed embodiment, the first lift has a lift platform arranged to support more than one pickface on the lift platform and is configured so that the first lift effects picking or placing of the more than one pickface, corresponding to the first ordered sequence of streaming pickfaces, with the lift platform at a common lift elevation.

In accordance with one or more aspects of the disclosed embodiment, the first lift effects picking or placing of the more than one pickface substantially simultaneously.

In accordance with one or more aspects of the disclosed embodiment, the product order fulfillment system further includes a storage array with storage racks having pickface storage locations arranged in multiple levels corresponding to the different levels of the multilevel decks.

In accordance with one or more aspects of the disclosed embodiment, a method for product order fulfillment includes providing multiple decks arrayed at different levels and defining multilevel decks; disposing at least one autonomous transport vehicle on each of the multilevel decks and holding and transporting, with the at least one autonomous transport vehicle, a pickface on each deck; lifting and lowering the pickface from the multilevel decks with at least one lift that traverses and connects more than one level of the multilevel decks; effecting transfer of the pickface between the autonomous transport vehicle and the at least one lift with at least one pickface transfer station on each deck that interfaces between the autonomous transport vehicle on the deck and the at least one lift; and defining, with the at least one lift, a fulfillment stream of mixed case pickfaces outbound from the multilevel decks to a load fill, where at least one stream of the fulfillment stream has an ordered sequence of streaming pickfaces and where the ordered sequence of streaming pickfaces is based on another fulfilment stream.

In accordance with one or more aspects of the disclosed embodiment, the load fill comprises mixed case pickfaces, the method further includes arranging the mixed case pickfaces in a predetermined pickface load order sequence.

In accordance with one or more aspects of the disclosed embodiment, the ordered sequence of streaming pickfaces from the at least one stream is related to the predetermined pickface load order sequence.

In accordance with one or more aspects of the disclosed embodiment, the method further includes combining the ordered sequence of streaming pickfaces from the at least one stream with a pickface from the other fulfillment stream to fill the load fill in the predetermined pickface load order sequence. In accordance with one or more aspects of the disclosed embodiment, the method further includes forming a portion of consecutive ordered pickfaces of the predetermined pickface load order sequence with at least one pickface from the other fulfillment stream in combination with the ordered sequence of streaming pickfaces from the at least one stream.

In accordance with one or more aspects of the disclosed embodiment, the at least one lift includes a first lift, the method further comprising defining the other fulfillment stream by another of the at least one lift independent from the first lift.

In accordance with one or more aspects of the disclosed embodiment, the first lift has a lift platform arranged to support more than one pickface on the lift platform, the method further comprising effecting, with the first lift, picking or placing of the more than one pickface, corresponding to the ordered sequence of streaming pickfaces, with the lift platform at a common lift elevation.

In accordance with one or more aspects of the disclosed embodiment, the method further includes effecting, with the first lift, picking or placing of the more than one pickface substantially simultaneously.

In accordance with one or more aspects of the disclosed embodiment, the method further includes providing a storage array with storage racks having pickface storage locations arranged in multiple levels corresponding to the different levels of the multilevel decks.

In accordance with one or more aspects of the disclosed embodiment, a product order fulfillment system includes multiple decks arrayed at different levels and defining multilevel decks; at least one autonomous transport vehicle disposed on each of the multilevel decks, and configured for holding and transporting a pickface on each deck; at least one lift, traversing and connecting more than one level of the multilevel decks, and arranged for lifting and lowering the pickface from the multilevel decks; and at least one pickface buffer station on each deck interfacing between the at least one autonomous transport vehicle on the deck and the at least one lift to effect transfer of the pickface between the autonomous transport vehicle and the at least one lift; wherein the at least one lift defines a fulfillment stream of mixed case pickfaces streaming outbound from the multilevel decks to a load fill, and wherein the at least one pickface buffer station, of at least one of the multilevel decks, commonly supports more than one of the mixed case pickfaces defining a portion of the streaming pickfaces in an ordered sequence of streaming pickfaces based on a predetermined sequence of the load fill.

In accordance with one or more aspects of the disclosed embodiment, the at least one pickface buffer station forms a common pickface transfer interface for the at least one lift, so that the commonly supported pickfaces are picked in common with the at least one lift.

In accordance with one or more aspects of the disclosed embodiment, the at least one pickface buffer station on more than one of the multilevel decks each commonly support more than one of the mixed case pickfaces defining a portion of the streaming pickfaces in an ordered sequence of streaming pickfaces based on the predetermined sequence of the load fill.

In accordance with one or more aspects of the disclosed embodiment, the mixed case pickfaces defining the portion of the streaming pickfaces in the ordered sequence commonly supported on the buffer station is based on an ordered sequence of pickfaces on another buffer station of another fulfillment stream.

In accordance with one or more aspects of the disclosed embodiment, the product order fulfillment system further includes a controller in communication with the at least one autonomous transport vehicle, the controller being configured to effect placement of pickfaces on the at least one pickface buffer station based on the ordered sequence of streaming pickfaces.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A product order fulfillment system comprising:
at least one elevated deck with an array of product storage locations distributed along the at least one elevated deck;
at least one autonomous transport vehicle disposed on each of the at least one elevated deck, and configured for holding and transporting a pickface on each deck;
more than one lift, traversing and connecting the at least one elevated deck and a base level, and arranged for lifting and lowering the pickface from the at least one elevated deck; and
at least one pickface buffer station on each deck interfacing each lift of the more than one lift to effect transfer of the pickface between the buffer station on and off a selected lift of the more than one lift;
wherein the selected lift defines a fulfillment sequence of mixed case pickfaces lifted and lowered with the selected lift and sequenced outbound at the base level from the at least one elevated deck to a load fill, and wherein the at least one pickface buffer station, of the at least one elevated deck at the selected lift, supports one of the mixed case pickfaces so that the transfer of the pickface between the buffer station on and off each lift defines a portion of the sequenced pickfaces in an ordered sequence of sequenced pickfaces based on a predetermined sequence of the load fill.

2. The product order fulfillment system of claim 1, wherein the at least one pickface buffer station forms a common pickface transfer interface at each deck for the fulfillment sequence defined by the more than one lift, so that the pickfaces are transferred on and off the more than one lift within the fulfillment sequence.

3. The product order fulfillment system of claim 1, wherein the at least one pickface buffer station on each of the at least one elevated deck each supports one or more of the mixed case pickfaces so that the transfer of the pickface between the buffer station on and off the selected lift of the more than one lift defines a portion of the sequenced pickfaces in an ordered sequence of sequenced pickfaces based on the predetermined sequence of the load fill.

4. The product order fulfillment system of claim 1, wherein transfer of the mixed case pickfaces between the buffer station on and off each lift defining the portion of the sequenced pickfaces in the ordered sequence is based on an ordered sequence of pickfaces on another buffer station of another fulfillment sequence.

5. The product order fulfillment system of claim 1, further comprising a controller in communication with the at least one autonomous transport vehicle, the controller being configured to effect placement of pickfaces on the at least one pickface buffer station based on the ordered sequence of sequenced pickfaces.

6. The product order fulfillment system of claim 1, further comprising a storage array with storage racks having pickface storage locations arranged in multiple levels corresponding to the different levels of the at least one elevated deck.

7. The product order fulfillment system of claim 1, wherein transfer of the mixed case pickfaces between the buffer station on and off the selected lift changes a buffered order of pickfaces supported at the buffer station at the selected lift of the at least one elevated deck to the ordered sequence of the portion of sequenced pickfaces.

8. The product order fulfillment system of claim 7, further comprising a controller configured to effect placement of pickfaces on the at least one pickface buffer station based on the buffered order.

9. A method for product order fulfillment, the method comprising:
providing at least one deck with an array of product storage locations distributed along the at least one elevated deck;
disposing at least one autonomous transport vehicle on each of the at least one elevated deck and holding and transporting, with the at least one autonomous transport vehicle, a pickface on each deck;
lifting and lowering the pickface from the at least one elevated deck with more than one lift that traverses and connects the at least one elevated deck and a base level;
effecting transfer of the pickface between at least one pickface buffer station on and off a selected lift of the more than one lift; and
defining, with the selected lift, a fulfillment sequence of mixed case pickfaces lifted and lowered with the selected lift and sequenced outbound at the base level from the at least one elevated deck to a load fill, where the at least one pickface buffer station, of the at least one elevated deck at the selected lift, supports at least the mixed case pickfaces so that the transfer of the pickface between the buffer station on and off the lift defines a portion of the sequenced pickfaces in an ordered sequence of sequenced pickfaces based on a predetermined sequence of the load fill.

10. The method of claim 9, wherein the at least one pickface buffer station forms a common pickface transfer interface at each deck for the fulfillment sequence defined by the more than one lift, so that the pickfaces are transferred on and off the more than one lift within the fulfillment sequence.

11. The method of claim 9, wherein the at least one pickface buffer station on each of the at least one elevated deck each supports one or more of the mixed case pickfaces so that the transfer of the pickface between the buffer station on and off each lift defines a portion of the sequenced pickfaces in an ordered sequence of sequenced pickfaces based on the predetermined sequence of the load fill.

12. The method of claim 11, wherein the transfer of the mixed case pickfaces between the buffer station on and off each lift defining the portion of the sequenced pickfaces in the ordered sequence is based on an ordered sequence of pickfaces on another buffer station of another fulfillment sequence.

13. The method of claim 9, further comprising effecting, with a controller in communication with the at least one autonomous transport vehicle, placement of pickfaces on the at least one pickface buffer station based on the ordered sequence of sequenced pickfaces.

14. The method of claim 9, further comprising providing a storage array with storage racks having pickface storage locations arranged in multiple levels corresponding to the different levels of the at least one elevated deck.

15. The method of claim 9, wherein transfer of the mixed case pickfaces between the buffer station on and off the selected lift changes a buffered order of pickfaces supported at the buffer station at the selected lift of the at least one elevated deck to the ordered sequence of the portion of sequenced pickfaces.

16. The method of claim 15, further comprising effecting, with a controller, placement of pickfaces on the at least one pickface buffer station based on the buffered order.

* * * * *